(12) United States Patent
Moran

(10) Patent No.: US 7,787,131 B1
(45) Date of Patent: Aug. 31, 2010

(54) SENSITIVITY MODULATED IMAGING SYSTEMS WITH SHEARING INTERFEROMETRY AND RELATED METHODS

(75) Inventor: Steven E. Moran, Oro Valley, AZ (US)

(73) Assignee: Alpha Technology, LLC, Oro Valley, AZ (US)

(*) Notice: Subject to any disclaimer, the term of this patent is extended or adjusted under 35 U.S.C. 154(b) by 81 days.

(21) Appl. No.: 12/027,263

(22) Filed: Feb. 6, 2008

Related U.S. Application Data

(60) Provisional application No. 60/899,469, filed on Feb. 6, 2007.

(51) Int. Cl.
*G01B 9/02* (2006.01)

(52) U.S. Cl. .................... 356/520; 356/5.03

(58) Field of Classification Search .......... 356/3.01–22, 356/520
See application file for complete search history.

(56) References Cited

U.S. PATENT DOCUMENTS

| | | | |
|---|---|---|---|
| 3,923,400 A * | 12/1975 | Hardy | ............. 356/521 |
| 4,139,302 A | 2/1979 | Hung et al. | |
| 4,913,547 A | 4/1990 | Moran | |
| 5,091,776 A | 2/1992 | Tyson | |
| 5,579,103 A | 11/1996 | Tachikawa | |
| 5,608,514 A | 3/1997 | Stann et al. | |
| 5,696,577 A | 12/1997 | Settner et al. | |
| 6,175,411 B1 | 1/2001 | Telschow et al. | |
| 6,654,401 B2 | 11/2003 | Cavalheiro Vieira et al. | |
| 6,714,286 B1 | 3/2004 | Wheel | |
| 7,016,519 B1 * | 3/2006 | Nakamura et al. | .......... 382/106 |
| 7,027,353 B2 | 4/2006 | Melese et al. | |
| 7,164,787 B1 | 1/2007 | Nevis et al. | |
| 7,164,788 B1 | 1/2007 | Nevis et al. | |
| 7,203,339 B1 | 4/2007 | Nevis | |
| 7,215,826 B1 | 5/2007 | Nevis et al. | |
| 2002/0118352 A1 | 8/2002 | Ohzu et al. | |
| 2003/0179382 A1 | 9/2003 | Peterson et al. | |
| 2007/0024840 A1 | 2/2007 | Fetzer et al. | |

OTHER PUBLICATIONS

Belongie et al (Shape Matching and Object Recognition Using Shape Contexts, IEEE transaction on pattern analysis and machine intelligence, vol. 24, No. 24, Apr. 2002).*

Masahiro Kawakita et al., Gain-modulated Axi-Vision Camera (high speed high-accuracy depth-mapping camera), Optical Society of America, Nov. 1, 2004; vol. 12 No. 22; pp. 5336-5344.

Steven E. Moran et al., "Acoustic Mine Detection Using a Laser Doppler Vibrometer", Kaman Aerospace Corporation, Electro-Optics Development Center, presented at Mine Warfare Conference, Mar. 2000, Naval Postgraduate School, Monterey California, pp. 1-12.

\* cited by examiner

*Primary Examiner*—Tarifur Chowdhury
*Assistant Examiner*—Jonathon D Cook
(74) *Attorney, Agent, or Firm*—Booth Udall, PLC

(57) ABSTRACT

An imaging system. Implementations of imaging systems may include a laser light source, at least one imaging detector coupled to the laser light source, a shearing interferometer coupled to at least one imaging detector, and a timing system coupled to the at least one imaging detector and the laser light source. A ranging detector may be coupled to the laser light source and the timing system, and at least on sensitivity modulator may be coupled with the at least one imaging detector and with the timing system.

8 Claims, 42 Drawing Sheets

SM3D USING DETECTOR AMPLIFIER GAIN MODULATION

SM3D USING DETECTOR RECEIVER TRANSMISSION MODULATION

SM3D IMAGE FORMATION USING A SM3D DETECTOR INCORPORATING TWO ELECTRICALLY INDEPENDENT PHOTOCATHODE SEGMENTS

SM3D IMAGING SYSTEM USING A SM3D DETECTOR INCORPORATING
INDEPENDENTLY GATEABLE PHOTOCATHODE SEGMENTS

SM3D DETECTOR INCORPORATING FOUR ELECTRICALLY
INDEPENDENT PHOTOCATHODE SEGMENTS

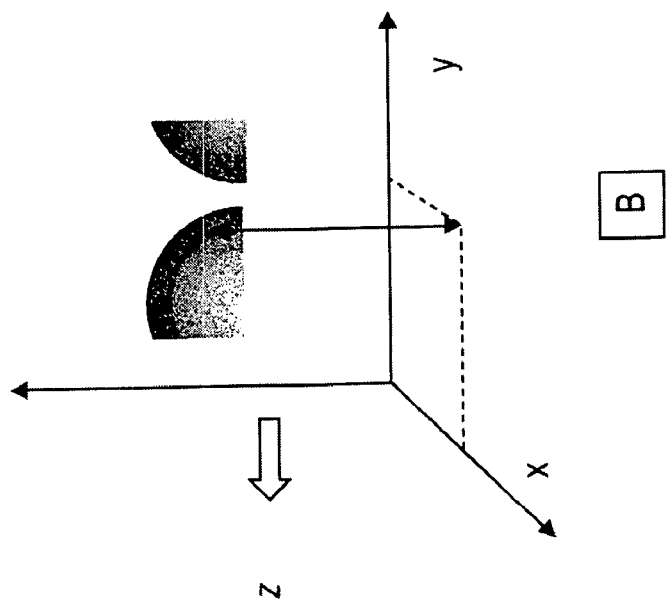
$RRPDF_1 \; z \approx RRPDF_2 \; z$
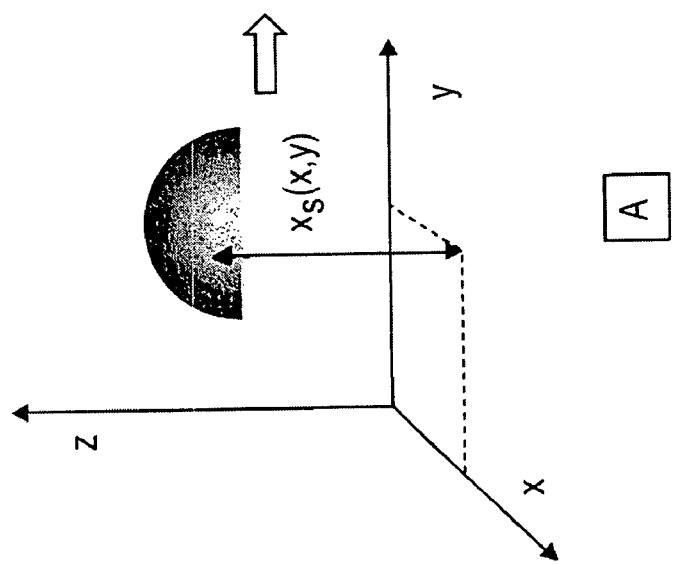
FIG. 33

SENSITIVITY MODULATED IMAGING SYSTEMS WITH SHEARING INTERFEROMETRY AND RELATED METHODS

CROSS REFERENCE TO RELATED APPLICATIONS

This document claims the benefit of the filing date of U.S. Provisional Patent Application 60/899,469, entitled "Sensitivity-Modulated Three-Dimensional Imaging and Intensified Range-Gated Shearography" to Steven E. Moran which was filed on Feb. 6, 2007, the disclosure of which is hereby incorporated entirely herein by reference.

BACKGROUND

1. Technical Field

Aspects of this document relate generally to imaging systems.

2. Background Art

Conventional imaging systems vary depending upon the characteristics of the target and the desired image output. For example, camera imaging systems collect visible light reflected and/or emitted from a target and convert the light to an electronic signal using a photodetector. Some conventional imaging systems operate by illuminating a target with a light source and measuring properties of the illuminating light reflected back from the target. Among these are many conventional light detection and ranging systems (LIDAR), sometimes referred to as laser radar (LADAR) systems. Conventional LIDAR systems utilize various methods of receiving, converting, and processing reflected light to generate a desired image of the target. Interferometric techniques utilized in other imaging systems, like shearography, measure properties of imaged objects by observing surface vibrations and/or deformations.

SUMMARY

Implementations of imaging systems may include a laser light source, at least one imaging detector coupled to the laser light source, a shearing interferometer coupled to at least one imaging detector, and a timing system coupled to the at least one imaging detector and the laser light source. A ranging detector may be coupled to the laser light source and the timing system, and at least on sensitivity modulator may be coupled with the at least one imaging detector and with the timing system.

Implementations of imaging systems may include one, all, or some of the following:

The laser light source may be a pulsed laser.

The at least one imaging detector may be an SM3D detector.

The shearing interferometer may include a shearing wedge.

The shearing interferometer may include a Michelson interferometer and a second imaging detector may be coupled to the Michelson interferometer and to the timing system.

The at least one sensitivity modulator may include a gain modulator configured to temporally modulate the gain of the at least one imaging detector.

A second imaging detector may be coupled with the timing system.

A second sensitivity modulator may be coupled with the second imaging detector and with the timing system.

The at least one sensitivity modulator may include a transmission modulator configured to temporally modulate the transmission of light to the at least one imaging detector.

Implementations of imaging systems may utilize implementations of a method of imaging an object. The method may include emitting laser light toward an object, collecting at least one SM3D image of the object, and collecting at least one shearographic image of the object.

Implementations of a method of imaging an object may include one, all, or some of the following:

Collecting at least one 2D grayscale image.

Jointly processing the at least one SM3D image, the at least one shearographic image, and the at least one 2D grayscale image.

Jointly processing the at least one SM3D image and the at least one shearographic image.

In implementations of the method, jointly processing may further include applying feature-based and matched filtering algorithms to the at least one SM3D image and the at least one shearographic image.

Calculating a calculated RRPDF of the object included in the SM3D image and matching the calculated RRPDF with a known RRPDF of a known object.

Jointly processing the at least one SM3D image, the at least one shearographic image, the at least one 2D grayscale image, and the calculated RRPDF of the object.

Implementations of an imaging system may utilize a method of jointly producing an SM3D image, a 2D grayscale image, and a shearography image. The method may include storing a ramped gain SM3D image in an image buffer, storing a dark frame SM3D image in an image buffer, storing a first constant gain SM3D image in an image buffer and a second constant gain SM3D image in an image buffer. The method may further include creating a corrected ramped gain SM3D image by using the second constant gain SM3D image and the dark frame SM3D image and creating a corrected constant gain image by subtracting the dark frame SM3D image from the second constant gain image, the corrected constant gain image being a 2D grayscale image. Implementations of the method may include creating a shearography image by subtracting the first constant gain SM3D image from the corrected constant gain image and outputting the corrected SM3D image, the 2D grayscale image, and the shearography image to an image display.

Implementations of a method of jointly producing an SM3D image, a 2D grayscale image, and a shearography image may include one, all, or some of the following.

Outputting the corrected SM3D image, the 2D grayscale image, and the shearography image to an image display may further include outputting at a laser PRF.

Outputting the corrected SM3D image, the 2D grayscale image, and the shearography image to an image display may further include outputting at half of a laser PRF.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and:

FIG. 33 illustrates a particular implementation of a relative range probability distribution function (RRPDF) illustrating how x and y displacements of a portion of the calculated range data do not vary the ultimate shape of a given object type's RRPDF;

DESCRIPTION

Figure 1:
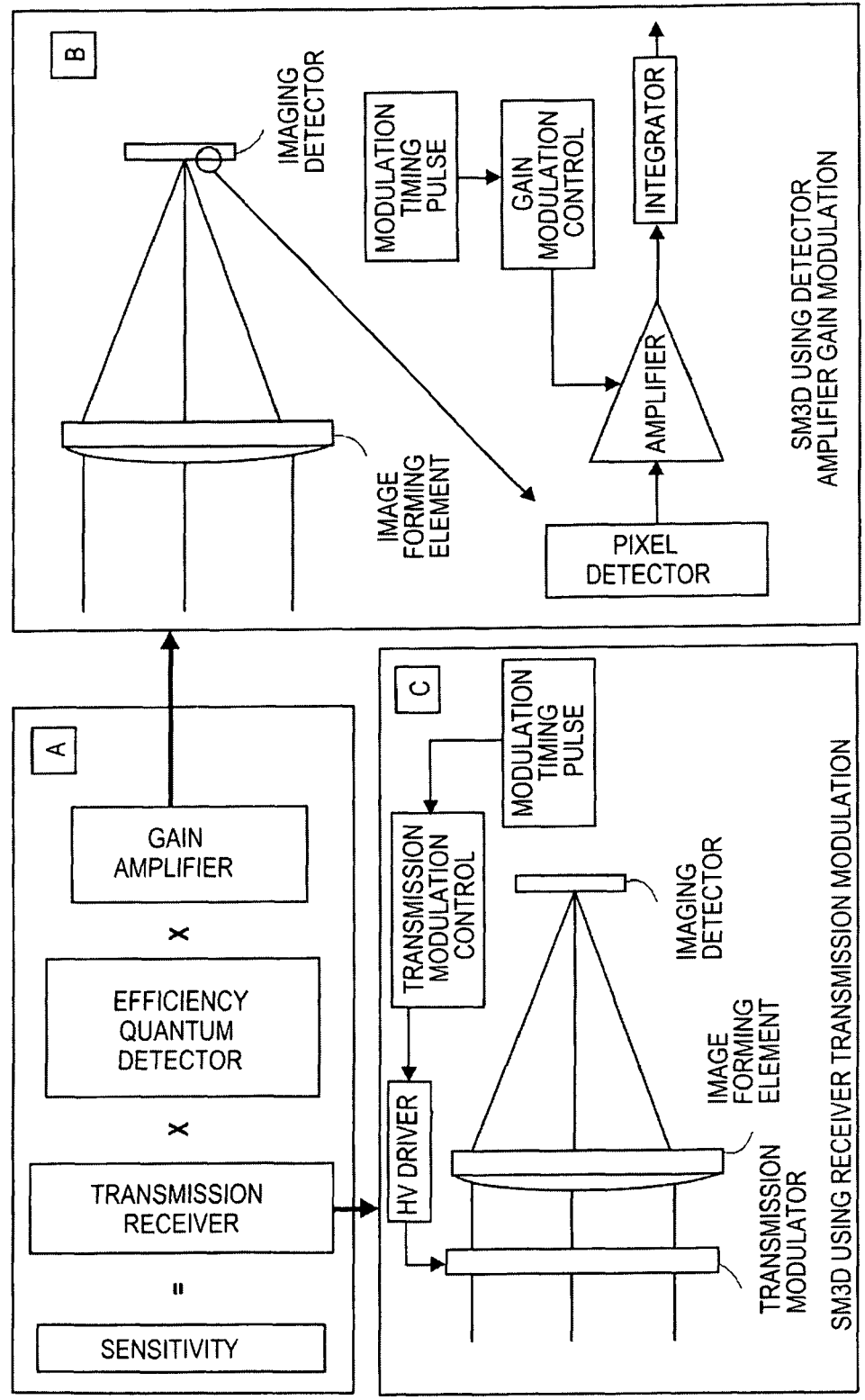
FIG. 1 is a diagram indicating the components that governing sensitivity modulation and two block diagrams of systems that modulate sensitivity by adjusting two of those components, amplifier gain and transmission modulation.

This disclosure, its aspects and implementations, are not limited to the specific components or assembly procedures disclosed herein. Many additional components and assembly procedures known in the art consistent with the intended imaging systems and/or assembly procedures for an imaging system will become apparent for use with particular implementations from this disclosure. Accordingly, for example, although particular implementations are disclosed, such implementations and implementing components may comprise any shape, size, style, type, model, version, measurement, concentration, material, quantity, and/or the like as is known in the art for such imaging systems and implementing components, consistent with the intended operation.

Imaging systems may utilize a wide variety of systems, structures, and analysis techniques when seeking to identify an object within a particular field of view. For example, an imaging system seeking to identify underwater mines on a beach may seek to use various visual imaging systems to collect images and a number of image processing methods to attempt to reliably and consistently find mines at long ranges in the presence of the distorting effects of the ocean surface. Implementations of imaging systems utilizing combined sensitivity modulated imaging systems and shearography systems along with various implementations of methods of image processing are disclosed in this document.

Relevant teachings regarding implementations of sensitivity modulated three-dimensional (SM3d) imaging systems like those disclosed in this document are described in U.S. patent application Ser. No. 12/026,503 to Moran, entitled "Light Detection and Ranging Systems and Related Methods," filed Feb. 5, 2008, the disclosure of which is incorporated entirely herein by reference. This reference describes the structure and use of SM3D systems, SM3D detectors, and various methods of SM3D image collection and processing. Relevant teachings regarding implementations of range-gated shearography systems like those disclosed in this document are described in U.S. patent application Ser. No. 12/026,511 to Moran, entitled "Range Gated Shearography Systems and Related Methods," filed Feb. 5, 2008, the disclosure of which is incorporated entirely herein by reference. This reference describes the structure and use of range-gated shearography systems, relevant imaging detectors, and methods of shearographic image production and analysis.

Implementations of imaging systems include implementations of SM3D LIDAR systems (SM3D systems) which are used to develop a 3D image of a scene within the field of the view of the system with the image being composed of pixels of varying brightness. The variation in the pixel brightness depends upon the distance between object surfaces in the scene and the SM3D system. In implementations of SM3D systems, the pixel brightness may not be a function of the varying reflectances of the objects in the field of view. Implementations of SM3D systems may be incorporated in standalone implementations or may be coupled with any device, human, animal, robot, vehicle, aircraft, weapon, or spacecraft, depending upon design requirements and desired use conditions.

Referring to FIG. 1, in the section identified as A, the sensitivity of an optical receiver system is illustrated as being equal to the product of the receiver optical transmission, the quantum efficiency of the detector that serves to converts photons to photo-electrons, and the gain of the amplifier that amplifies the detector photocurrent. Temporal modulation of the sensitivity of an optical receiver system can therefore be achieved by temporally modulating receiver transmission, amplifier gain, or both in a simultaneous and/or sequential fashion.

Referring to FIG. 1, in the section identified as B, sensitivity modulation using receiver temporal gain modulation is illustrated. A light detection system including an image-forming element receives optical radiation from an object and forms an image of the object on an imaging detector. The imaging detector includes an array or plurality of picture elements (pixels), with each pixel having a sensitivity modulator in the form of a photo-current, voltage, or transimpedance amplification system consisting of a gain modulation control configured to temporally modulate the gain of an amplifier and to produce a gain modulated electronic signal. The amplifier sends the gain modulated electronic signal to an integrator to produce a pixel electronic signal output. The time at which the gain modulation control is activated is determined by a modulation timing pulse that is sent by a timing system coupled to the light detection system.

Referring to FIG. 1, in the section identified as C, sensitivity modulation using receiver optical temporal transmission modulation is illustrated. A light detection system is provided that includes an optical transmission modulator placed in front of an image-forming element. Optical radiation from an object passes through the transmission modulator and the image-forming element to form an image on the imaging detector. In response to a modulation timing pulse from a timing system coupled to the light detection system, the transmission modulation control element generates and provides an electronic control waveform that becomes the temporal modulation characteristic of a high-voltage (HV) driver. The HV driver amplifies the electronic waveform to an amplitude that enables operation of the transmission modulator and allows the transmission modulator to temporally alter the optical radiation being received by the imaging detector.

Figure 2:
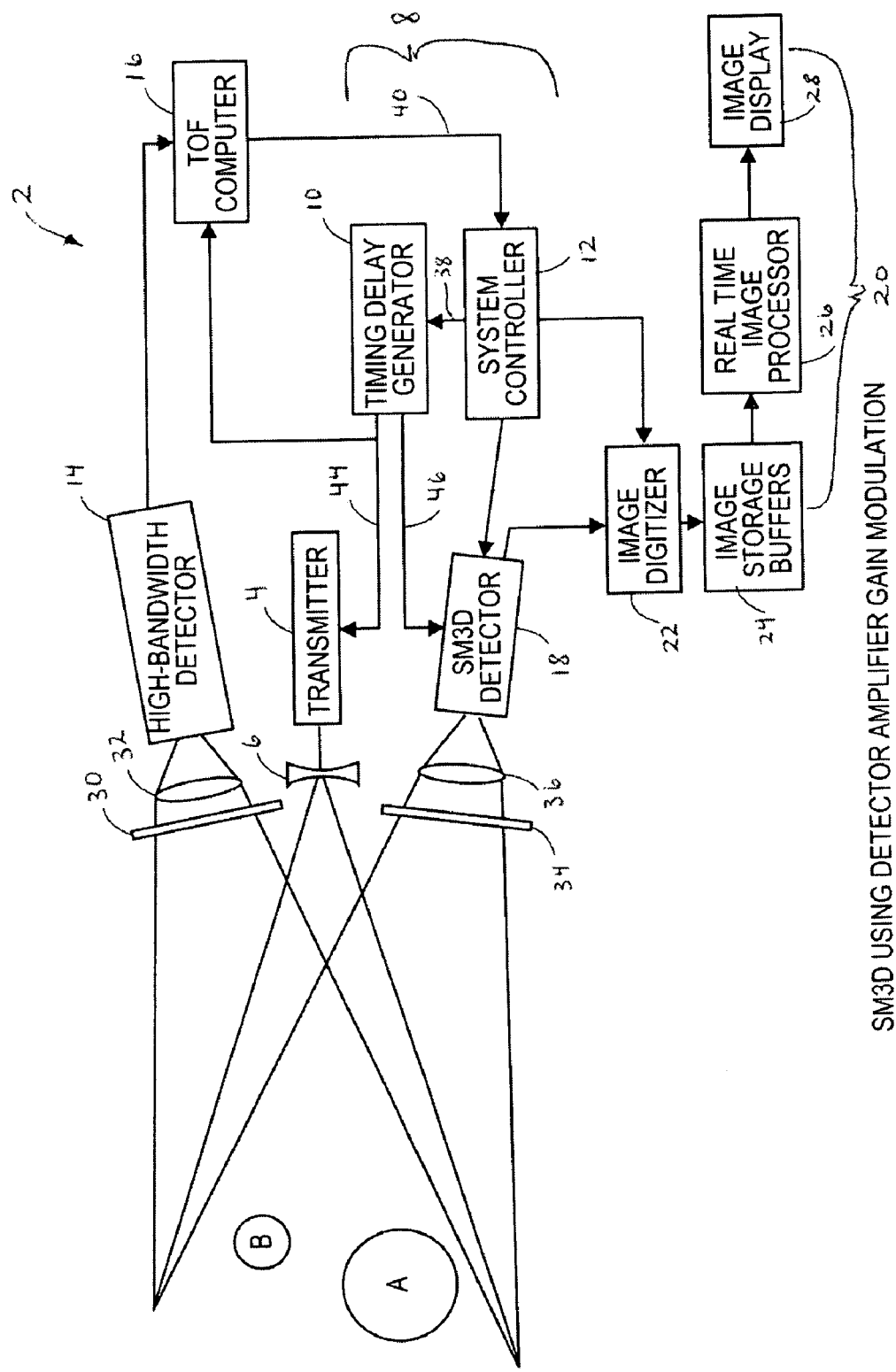
FIG. 2 is a block diagram of a three dimensional (3D) light detection and ranging (LIDAR) system that utilizes receiver sensitivity modulation (a sensitivity modulated three dimensional imaging system, SM3D) by using amplifier gain modulation.

An implementation of an SM3D system 2 utilizing sensitivity modulation is illustrated in FIG. 2. A pulsed laser transmitter (pulsed laser) 4 is coupled to an optical element 6 that is configured to diverge light. The pulsed laser is coupled to a timing system 8 which includes a timing delay generator 10 coupled to a system controller 12. A light detection system including a high-bandwidth detector 14 and an SM3D detector 18 is coupled to the timing system 8 and a time of flight (TOF) computer 16 which is coupled to the timing system 8. The high-bandwidth detector 14 is coupled to an optical band-pass filter 30 and an optical imaging element 32 and the TOF computer 16. The SM3D detector 18 is also coupled to the timing system 8 and with an optical band-pass filter 34 and an optical imaging element 36. The SM3D detector 18 includes at least one imaging detector and at least one sensitivity modulator. The pass-bands of the optical band-pass filters 30, 34 are centered at the pulsed lasers 4's wavelength and serve to reject ambient background light that would otherwise introduce shot noise into the light detection system. The SM3D detector 18 is coupled to an imaging system 20 that includes an image digitizer 22 coupled to image storage buffers 24, a real time image processor 26, and an image display 28.

When the particular implementation of an SM3D system 2 illustrated in FIG. 2 is in use, the pulsed laser 4 is triggered to emit a pulse of laser radiation which is diverged using the optical element 6 to flood-illuminate a region of interest containing objects A and B. The time at which the laser pulse is emitted is recorded by the system controller 12. The high-bandwidth detector 14 then receives reflected laser radiation from objects A and B through the optical band-pass filter 30 and the optical imaging element 32. The signal from the high-bandwidth detector 14 is then applied to the TOF computer 16. Using the difference between the time the laser pulse was emitted and the time a signal was received from the high-bandwidth detector 14, the TOF computer 16 computes the time of flight from the pulsed laser 4 to the objects and back to the high-bandwidth detector 14. This time difference 40 is then provided to the system controller 12 which calculates a corresponding time delay required between the triggering of a laser pulse and application of a temporal gain modulation waveform at the SM3D detector 18.

The system controller 12 receives the time difference 40 from the TOF computer 16 and sends the time difference 40 to the timing delay generator 10 using bus 38. Using the time difference 40, the timing delay generator 10 uses the time difference 40 to send a delayed trigger pulse 46 to the SM3D detector 18 after the timing delay generator 10 has triggered the pulsed laser 6 to emit a pulse of laser light using trigger pulse 44. The timing of the delayed trigger pulse 46 ensures that the SM3D detector 18 initiates receiver gain modulation as the optical imaging element 36 is collecting reflected laser radiation from a pulse of laser light and is forming a corresponding image on the SM3D detector 18.

After the timing between the laser pulse and the initiation of receiver gain modulation has been determined by use of the high-bandwidth detector 14 and the SM3D detector 18, and at least one gain modulated image has been generated by the SM3D detector, the at least one image is passed to the image digitizer 22 where it is digitized and subsequently stored in image storage buffers 24. A real-time image processor 26 accesses images in the image storage buffers 24 and performs the calculations required for computation of 3D images. The resulting 3D images are then displayed on the image display 28.

In summary, for implementations of SM3D systems like those illustrated in FIG. 2, the first pulse of laser light is used with the high-bandwidth detector 14 to calculate the required delay to allow sensitivity modulation to occur at the SM3D detector 18 (through temporal adjustment of the gain of the at least one imaging detector by the at least one sensitivity modulator) when reflected light from the second pulse of laser light is received by the SM3D detector 18. While the use of a high-bandwidth detector is illustrated in FIG. 2, any detector type may be utilized, including, by non-limiting example, an intensified detector, and SM3D detector, or any other imaging detector disclosed in this document or conventionally available.

Figure 3:
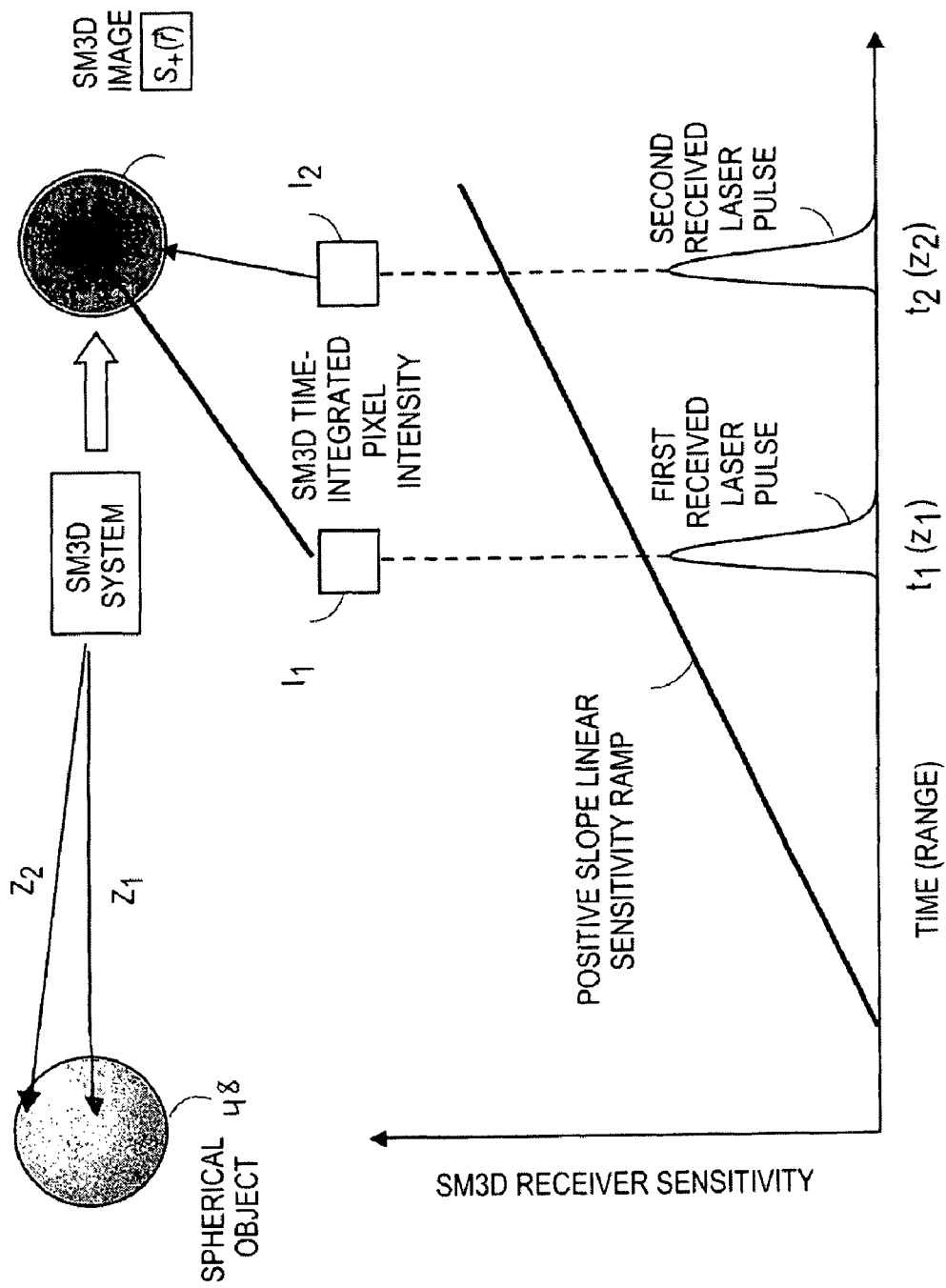
FIG. 3 illustrates positive slope linear receiver sensitivity modulation and corresponding SM3D image grayscale encoding.

Implementations of SM3D systems 2 like the one illustrated in FIG. 2 may utilize methods of encoding 3D object range information as intensity grayscale like those illustrated in FIG. 3. In FIG. 3, a spherical object 48 is used as an example. The graph shows a positive-slope linear SM3D detector sensitivity ramp and two received laser pulses, a first received laser pulse and a second received laser pulse. The first received laser pulse originates from a portion of the spherical object 48 that is a distance $Z_1$ from the SM3D receiver system. The second received laser pulse originates from a portion of the spherical object that is a distance $Z_2$ from the SM3D receiver system (in this example, $Z_1$ is closer than $Z_2$ to the SM3D receiver system, being higher up on the spherical object 48). The time, $\Delta t = t_2 - t_1$, between the arrival of the two laser pulses is equal to $\Delta t = 2(Z_2 - Z_1)n/c$, where c is the speed of light, and n is the index of refraction of the medium that occupies the space between the spherical object 48 and the SM3D receiver.

As illustrated in FIG. 3, the intensity of a particular pixel in the SM3D detector array is equal to the temporal integral of the product of the positive slope linear sensitivity ramp and the shape of the received laser pulse. For the first received laser pulse, the integral results in a pixel intensity $I_1$. Because the second received laser pulse arrives a time $\Delta t$ later than the first received laser pulse (because $Z_1$ is closer than $Z_2$ to the SM3D system), a higher-gain portion of the gain ramp is applied to the second received laser pulse than to the first received laser pulse. This results in a pixel intensity $I_2$, where $I_2 > I_1$. Repeating the foregoing method will produce an SM3D image with pixels with intensities that depend on the range between the SM3D receiver and the portion of the sphere that is conjugate to a particular pixel in the SM3D detector array. For the SM3D image of the spherical object, the method using a positive slope linear sensitivity ramp results in a radial shading of the image with lower-intensity, darker pixels closer to the SM3D system near the center of the image, and higher-intensity, brighter pixels further way from the SM3D system near the edge of the image.

Figure 4:
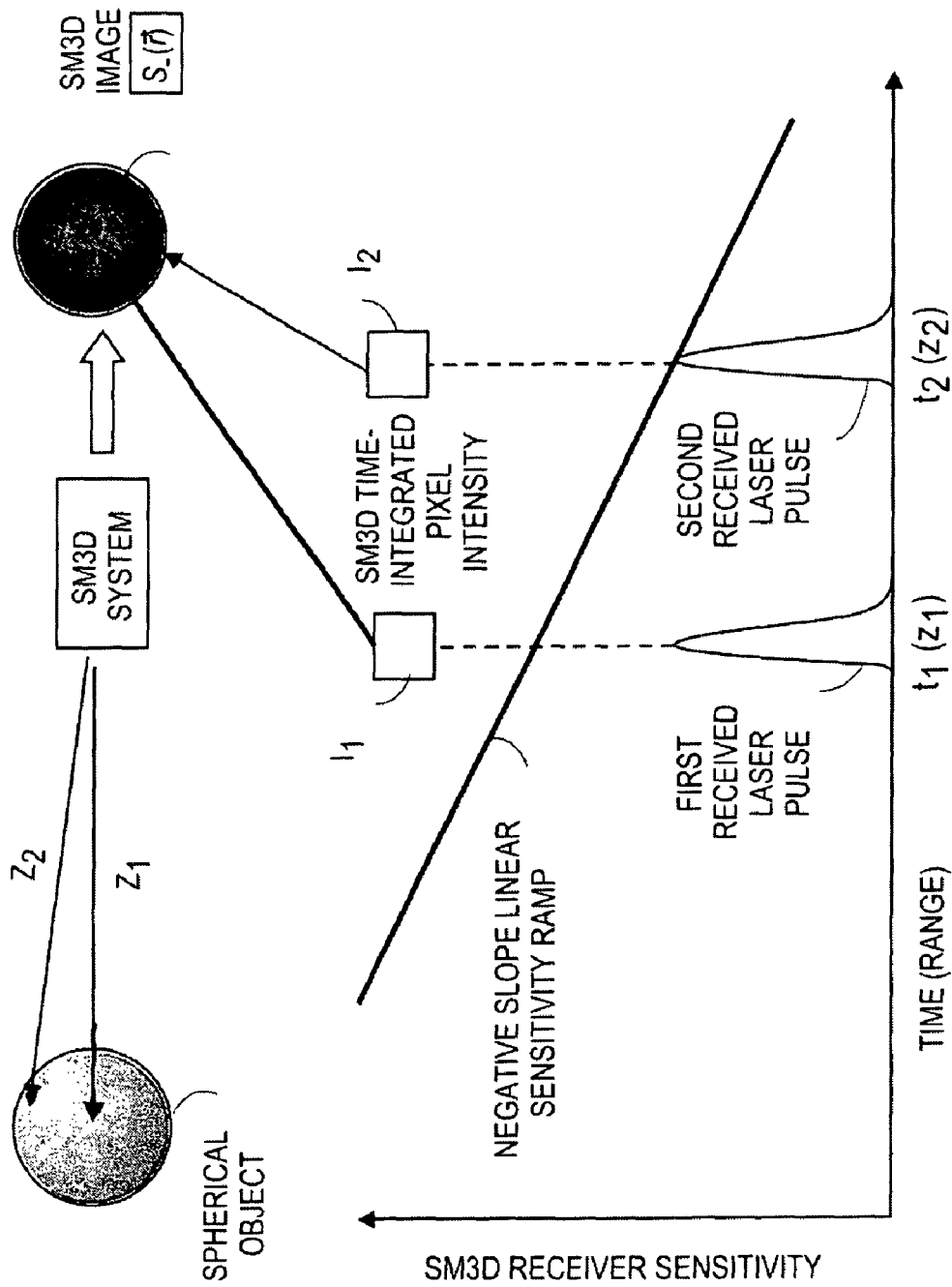
FIG. 4 illustrates negative slope linear receiver sensitivity modulation and corresponding SM3D image grayscale encoding.

In FIG. 4, an implementation of a method of range-grayscale encoding using implementations of SM3D detectors utilizing a negative slope linear sensitivity ramp is illustrated. In this case the SM3D range-grayscale encoding results in a radial shading of the image with lower-intensity, darker pixels further from the SM3D detector near the edge of the image, and higher-intensity, brighter pixels closer to the SM3D detector near the center of the image.

In addition to the range-dependent shading described in the foregoing explanation of the SM3D range-grayscale encoding, there may also exist pixel intensity variations due to spatial reflectance variations over the surface of the sphere as well as transmission variations in the optical path between the SM3D detector 18 and various locations on the spherical surface. In a single SM3D image, the effects of the foregoing error mechanisms may be coupled via a multiplicative process to affect pixel intensity. In addition, the imaging detector within an implementation of an SM3D detector 18 may contribute an additive intensity term due to pixel dark and readout-noise currents.

Figure 5:
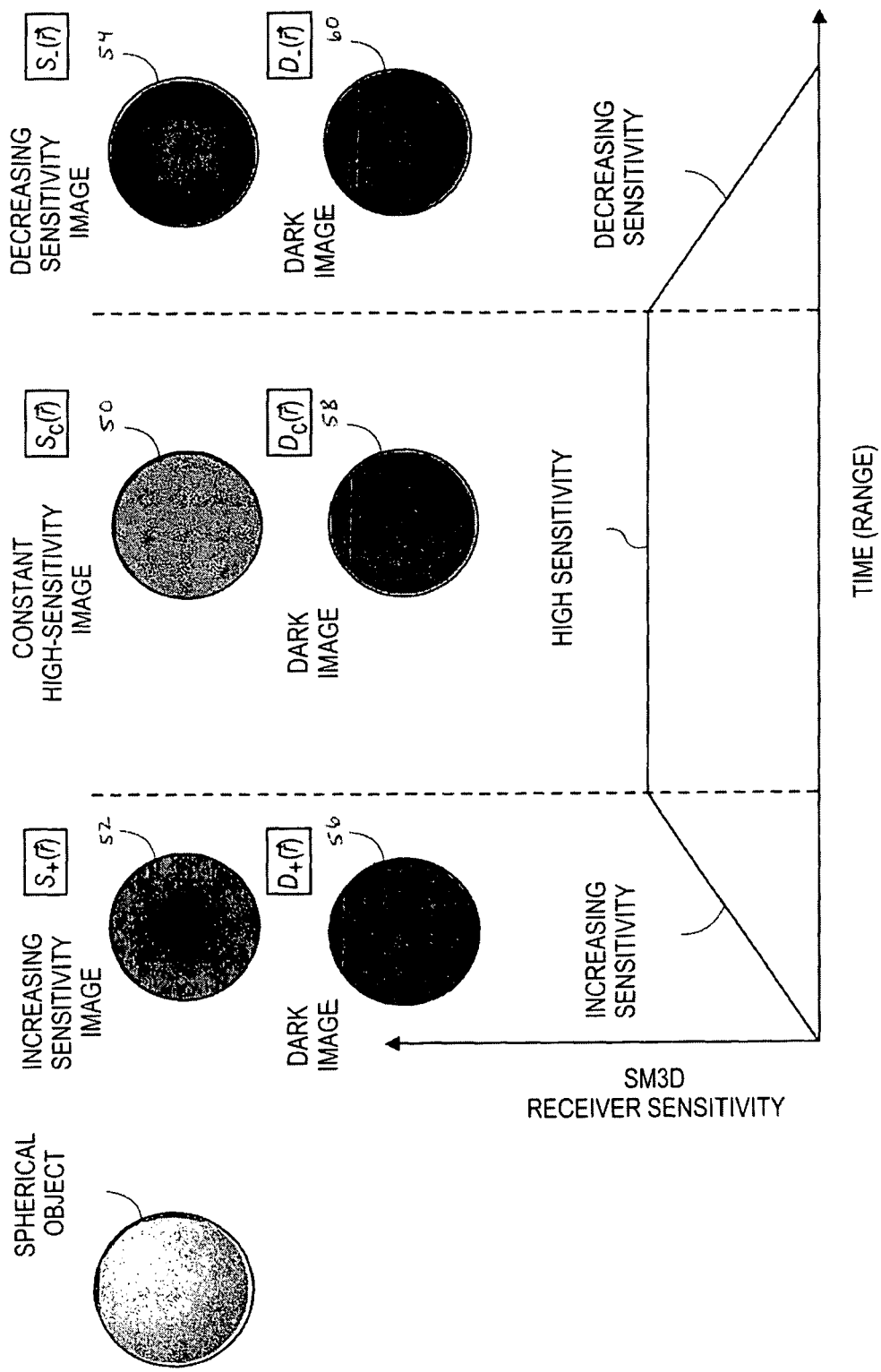
FIG. 5 is a diagram illustrating SM3D image grayscale encoding under conditions of temporally increasing, fixed high-sensitivity, and temporally decreasing receiver sensitivity.

Implementations of SM3D systems 2 may utilize methods of cancelling non-range-dependent intensity variations from SM3D images to leave only range-dependent intensity variations. The cancellation is achieved by forming three additional SM3D images, examples of which are illustrated in FIG. 5. The first additional image 50 is generated by operating the SM3D detector in a temporally constant high-sensitivity mode to produce a conventional reflectance gray-scale image. Because the "slope" of the sensitivity ramp is zero, there is no range-grayscale encoding for this image, and all elements of the spherical object receive the same, range-independent gain. Any shading of the image of the sphere will likely depend only on spatial variations in object reflectance and variations in the transmission of the optical path between the SM3D receiver and portions of the spherical surface. The SM3D images to be corrected are shown in FIG. 5 as a positive-slope sensitivity ramp image 52 and a negative-slope sensitivity ramp image 54. The additional SM3D images are taken without the laser in operation and are dark images, 56, 58, and 60, collected on the positive-slope, constant high-sensitivity, and negative-slope portions of the SM3D detector temporal sensitivity characteristic, respectively. These images are used in implementations of SM3D image processing methods illustrated in FIGS. 6 and 7 to cancel non-range-dependent variations.

Figure 6:
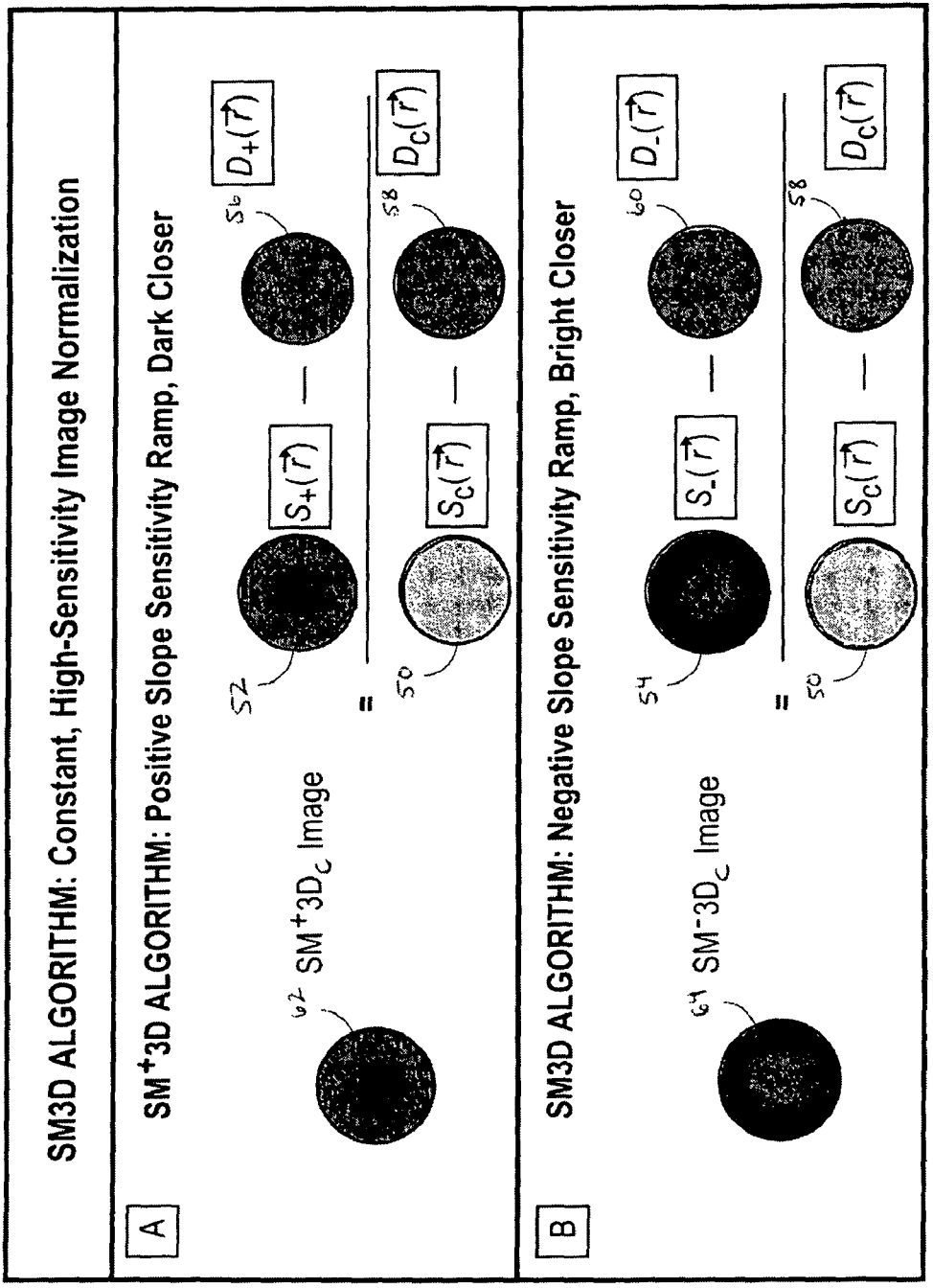
FIG. 6 illustrates a method of image processing an SM3D image using a fixed-sensitivity image for range-image normalization.

FIG. 6, section A illustrates an implementation of an $SM^+3D_C$ image processing using the positive-slope sensitivity ramp image 52 and constant high-sensitivity image 50. The $SM^+3D_C$ image 62 is computed as a pixel-by-pixel division of two images. The numerator of the ratio is computed by subtracting dark image 56 from the positive-slope ramp image 52. The subtraction process removes the image offset contributed by the SM3D detector dark current and readout noise current. The denominator of the ratio is computed by subtracting dark image 58 from the constant high-sensitivity image 50. Because the multiplicative terms that cause the non-range-dependent spatial intensity variations are common to both the numerator and denominator, they are cancelled by the pixel-by-pixel division process. The $SM^+3D_C$ image displays object surface elements that are closer to the SM3D system as darker than those object surface elements that are farther from the SM3D system.

Referring to FIG. 6, section B illustrates an implementation of a $SM^-3D_C$ image processing method using the negative-slope sensitivity ramp image 54 and constant high-sensitivity image 50. The $SM^-3D_C$ image 64 is computed as a pixel-by-pixel ratio of two images. The numerator of the ratio is computed by subtracting dark image 60 from the negative-slope ramp image 54. The denominator of the ratio is the same as that previously described for section A. The $SM^-3D_C$ image 64 displays object surface elements that are closer to the SM3D system as brighter than those object surface elements that are farther from the SM3D system.

Figure 7:
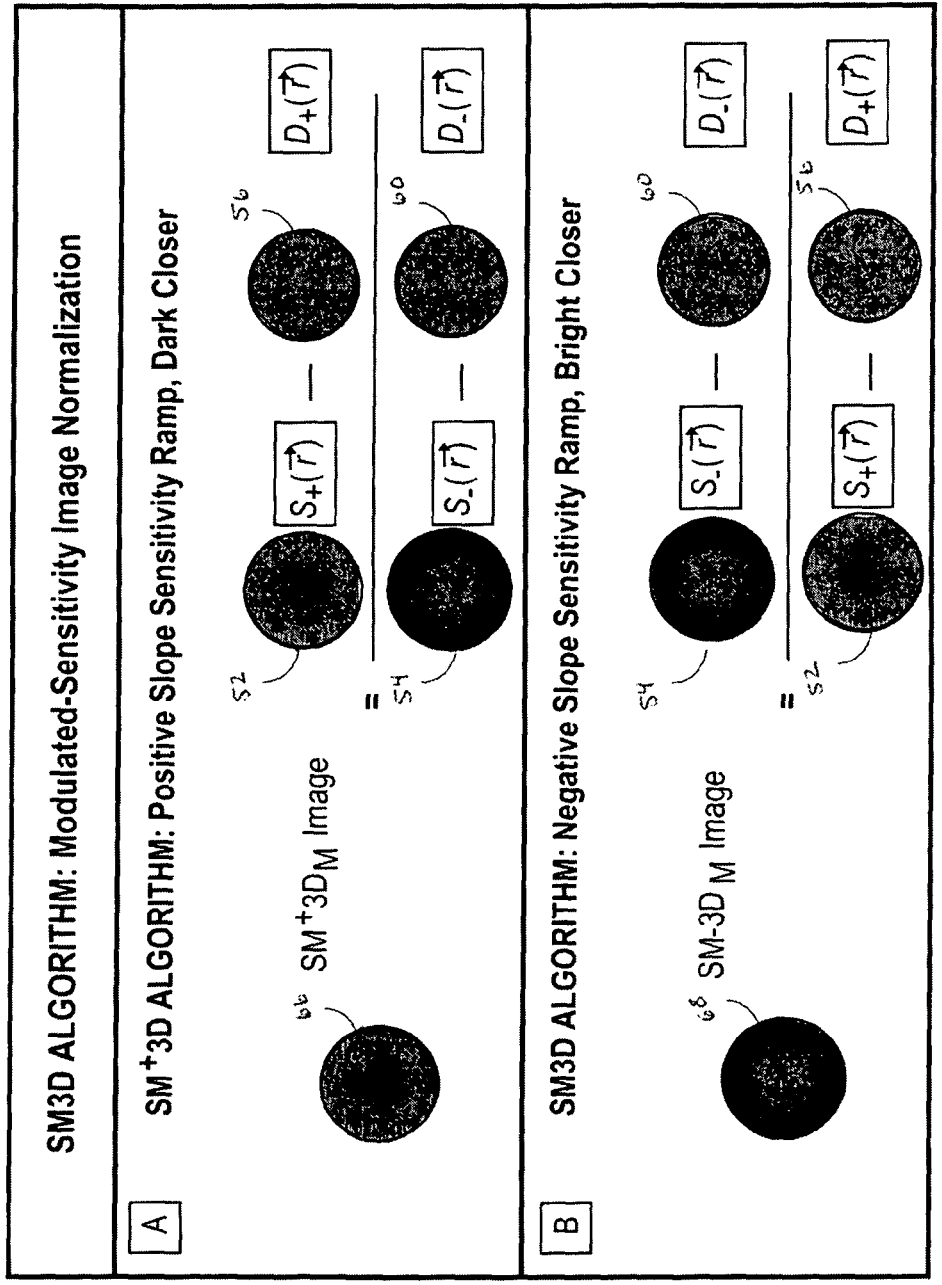
FIG. 7 illustrates a method of image processing an SM3D image using a modulated sensitivity image for range-image normalization.

FIG. 7, section A, illustrates an implementation of an $SM^+3D_M$ image processing method using the positive-slope sensitivity ramp image 52 and negative-slope sensitivity ramp image 54. As with the $SM^+3D_C$ algorithm, the $SM^+3D_M$ image 66 is computed as a pixel-by-pixel division of two images. The numerator is the same as that used for the $SM^+3D_C$ method illustrated in FIG. 6, section A. The denominator of the ratio is computed by subtracting dark image 60 from the negative-slope ramp image 54. As with the $SM^+3D_C$ algorithm, the dark image subtraction process removes the image offset contributed by the SM3D detector dark current and readout noise current. As with the $SM^+3D_C$ algorithm, the multiplicative terms that form the non-range-dependent spatial intensity variations that are common to both the numerator and denominator are cancelled by the pixel-by-pixel division process. The $SM^+3D_M$ image 66 displays object surface elements that are closer to the SM3D system as darker than those object surface elements that are farther from the SM3D system.

FIG. 7, section B, illustrates an implementation of an $SM^-3D_M$ image processing method using the negative-slope sensitivity ramp image 54 and positive-slope sensitivity ramp image 52. As with the $SM^-3D_C$ algorithm, the $SM^-3D_M$ image 68 is computed as a pixel-by-pixel division of two images. The numerator is the same as that used for the $SM^-3D_C$ algorithm of FIG. 6, section B. The denominator of the ratio is computed by subtracting dark image 60 from the negative-slope ramp image 54. The $SM^-3D_M$ image displays object surface elements that are closer to the SM3D system as brighter than those object surface elements that are farther from the SM3D system.

A consequence of the SM3D range-grayscale coding methods illustrated in FIGS. 3 and 4 and the image processing computations used to generate 3D images illustrated in FIGS. 6 and 7, is that the SM3D images produced may contain range noise that is a function of the range of the pixels from the object to the SM3D detector. Specifically, the 3D image of objects or object portions whose range corresponds to the lower-gain portion of the gain ramp may have lower range-noise than objects whose range corresponds to the higher-gain portion of the gain ramp. Because the sensitivity ramps linearly over time, any range noise in the received laser pulse corresponding to the more intense part of the ramp will be amplified relative to the range noise in the received laser pulse received in the less intense part of the ramp. This fact is the basis of a SM3D imaging method for allocating the lower range-noise SM3D imaging performance to certain objects of interest by timing the gain modulation so that the lower-gain portion of the modulation occurs when reflected laser light from the object of interest arrives at the SM3D receiver.

The foregoing implementations of SM3D image processing methods use positive-slope or negative slope linear sensitivity ramp images in encoding 3D object information as grayscale. Without being bound by any theory, in particular implementations of SM3D systems, the depth-of-field (DOF) over which implementations of SM3D systems may perform encoding may be given by $\Delta z = \Delta t_R c/2$, where $\Delta z$ is the DOF, $\Delta t_R$ is the temporal duration of the sensitivity modulation linear ramp, and c is the speed of light. From this equation, it can be seen that the DOF can be increased or decreased by increasing or decreasing the temporal duration of the sensitivity modulation linear ramp. However, because the SM3D detector may have a fixed grayscale dynamic range and noise floor, SM3D image range precision may be a decreasing function of both the DOF and the temporal duration of the sensitivity modulation linear ramp.

Figure 8:
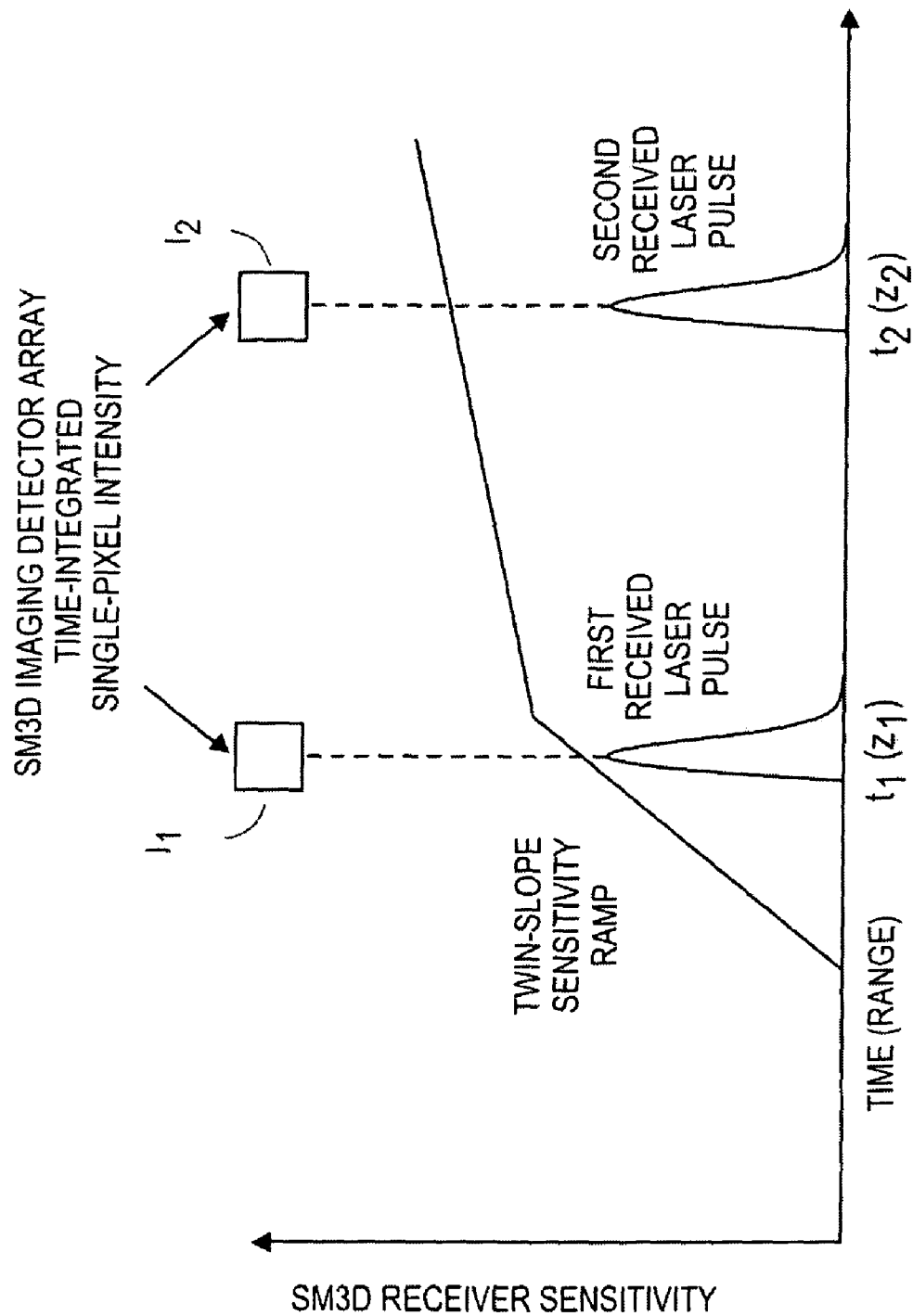
FIG. 8 illustrates a method of increasing the depth of field (DOF) of the range-grayscale encoding using two positive slope linear receiver sensitivity modulation segments.
Figure 9:
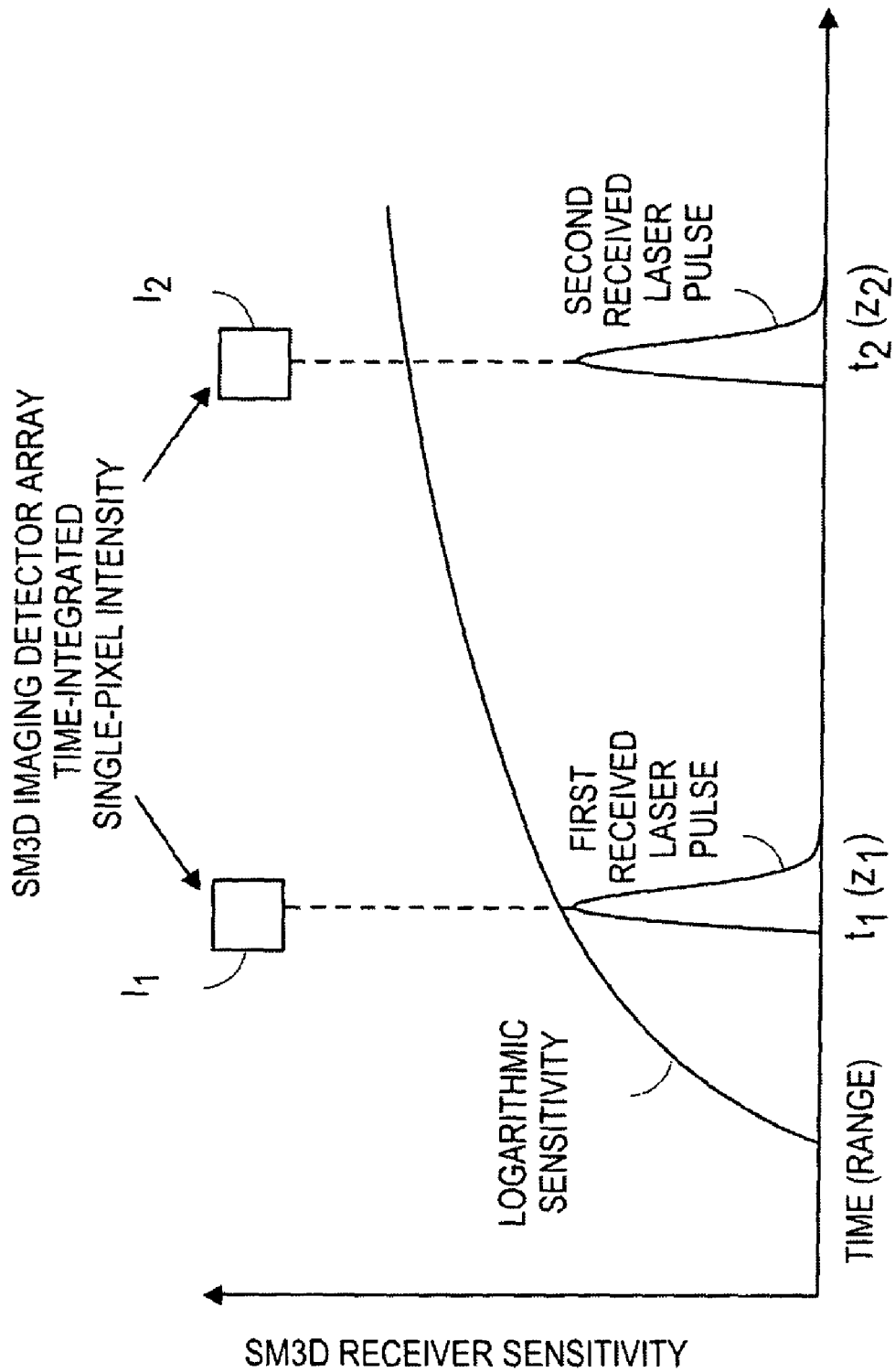
FIG. 9 illustrates a method of increasing the DOF of the range-grayscale encoding using a logarithmic receiver sensitivity normalization function.

To aid in improving SM3D image precision, among other things, implementations of SM3D systems may utilize methods of allocating range precision over a desired DOF by utilizing various forms of the sensitivity modulation function. Two implementations of such methods are illustrated in FIG. 8 and FIG. 9, respectively. FIG. 8 illustrates an implementation of a sensitivity modulation function with a twin-slope linear sensitivity ramp. The higher-slope portion of the sensitivity modulation function may produce a higher range precision and lower DOF region. The lower-slope portion of the sensitivity modulation function may produce a lower range-precision and higher DOF region. The DOF region encompassed by the higher-slope portion the sensitivity modulation function covers portions of the DOF closest to the SM3D system, while the DOF region encompassed by the lower-slope portion of the sensitivity modulation function covers portions of the DOF farthest from the SM3D system. FIG. 9 illustrates an implementation of a logarithmic sensitivity modulation function of the form $S(t)=S_0+\log(bt)$. For a logarithmic sensitivity modulation function of this form, the slope, and accordingly the range precision, may be a smoothly decreasing function of range and the DOF may be adjusted by changing the values of the parameters a and b. While implementations of linear, two-slope linear, and logarithmic forms of the sensitivity modulation function are illustrated in this document, many other forms of the sensitivity modulation function may be utilized in particular implementations of methods of allocating range precision over a desired DOF to achieve desired precision and DOF effects, including, by non-limiting example, natural logarithmic, polynomial, hyperbolic, trigonometric, impulse, transcendental, continuous, discontinuous, and any other function of time or any other variable influencing an SM3D system which function is capable of effecting a desired precision and DOF distribution.

Figure 10:
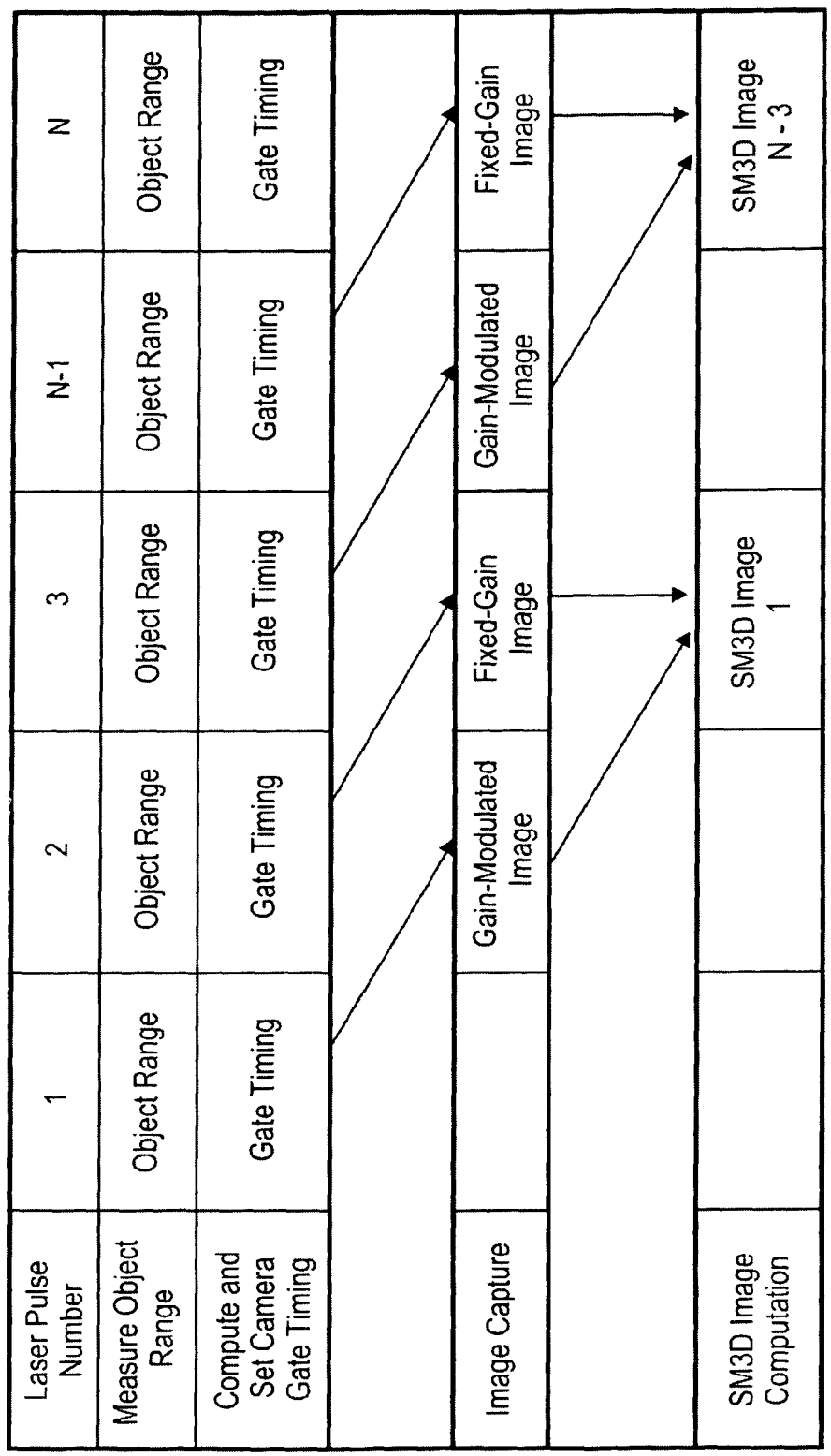
FIG. 10 is a signal processing timing diagram for the implementation of an SM3D system illustrated in FIG. 2.
Figure 11:
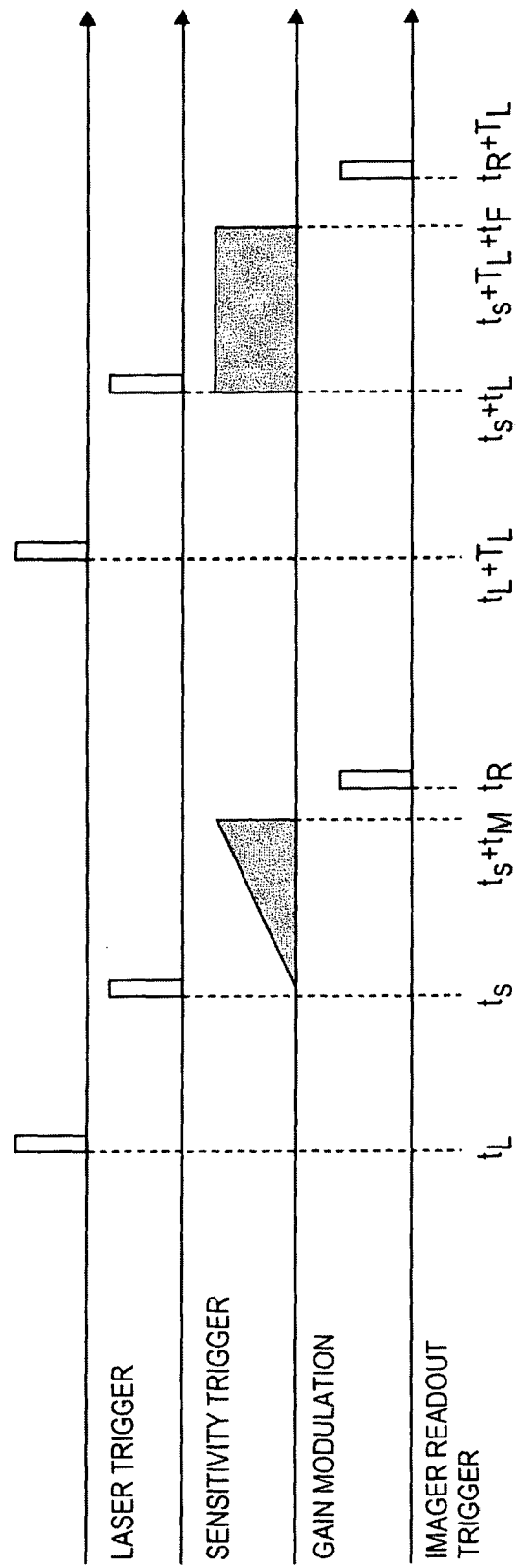
FIG. 11 is a system timing diagram for the implementation of an SM3D system illustrated in FIG. 2.

Referring to FIGS. 10 and 11, the timing of the various system operations associated with implementations of SM3D systems like those illustrated in FIG. 2 utilizing implementations of the SM3D image processing methods illustrated in FIGS. 6 and 7 is illustrated. The table of FIG. 10 shows the various functions performed as a function of laser pulse number. On the first laser pulse, an object range measurement is performed using the high-bandwidth detector 14 and is used to compute and subsequently set the timing for the application of the temporal gain modulation waveform at the SM3D detector 18 (or the SM3D camera sensitivity modulated gate timing) for the second laser pulse. On the second laser pulse, the SM3D detector 18 captures a sensitivity modulated image and stores the image in the image frame buffer 24. The object range is measured again by the high-bandwidth detector 14 and is used to compute and subsequently set the timing for the application of the temporal gain modulation waveform at the SM3D detector 18 for the third laser pulse.

On the third laser pulse, the SM3D detector 18 captures a constant-sensitivity (or fixed-gain) image and stores the image in the image frame buffer 24. The additional dark SM3D detector images used in the SM3D image processing methods may be collected prior to the initiation of laser pulses and are stored in the image frame buffers 24. Typically, these dark detector images do not require frequent updating. Using the SM3D image processing methods and the sensitivity-modulated, constant-sensitivity (fixed-gain), and the two dark images, the first SM3D image is computed and displayed on the image display 28. The foregoing process is repeated for laser pulses N-1 and N to form SM3D image N-3.

By observation from the table of FIG. 10, it is apparent that during operation of implementations of SM3D systems 2 like those illustrated in FIG. 2, a SM3D image is formed for every pair of laser pulses. The first laser pulse of the pair captures the 3D range image, while the second pulse captures the normalization image. Consequently, for implementations of SM3D systems like those illustrated in FIG. 2, the SM3D image frame rate, or formation rate, can be said to be equal to the laser pulse repetition frequency (PRF) divided by two.

A timing diagram for the capture of the sensitivity-modulated and constant-sensitivity (fixed-gain) images is illustrated in FIG. 11. As illustrated, the laser trigger initiates firing of the first laser pulse of a laser pulse pair at $t_L$. After a time delay, computed using the range to the object, the sensitivity trigger initiates the application of the temporal gain modulation waveform at the SM3D detector 18 at $t_S$ for a duration of $t_M$ seconds. Readout and storage of the SM3D image is subsequently initiated at time $t_R$. The laser trigger initiates firing of a second laser pulse of at $t_L+T_L$, where $T_L$ is the time between laser pulses and is also equal to the reciprocal of the PRF. After a time delay, computed using the range to the object, the sensitivity trigger is again applied to the SM3D detector 18 at $t_L+T_L+t_S$ to initiate constant-sensitivity (fixed-gain) operation for duration of $t_F$ seconds. Readout and storage of the SM3D constant-sensitivity image is subsequently initiated at time $t_R+T_L$.

Figure 12:
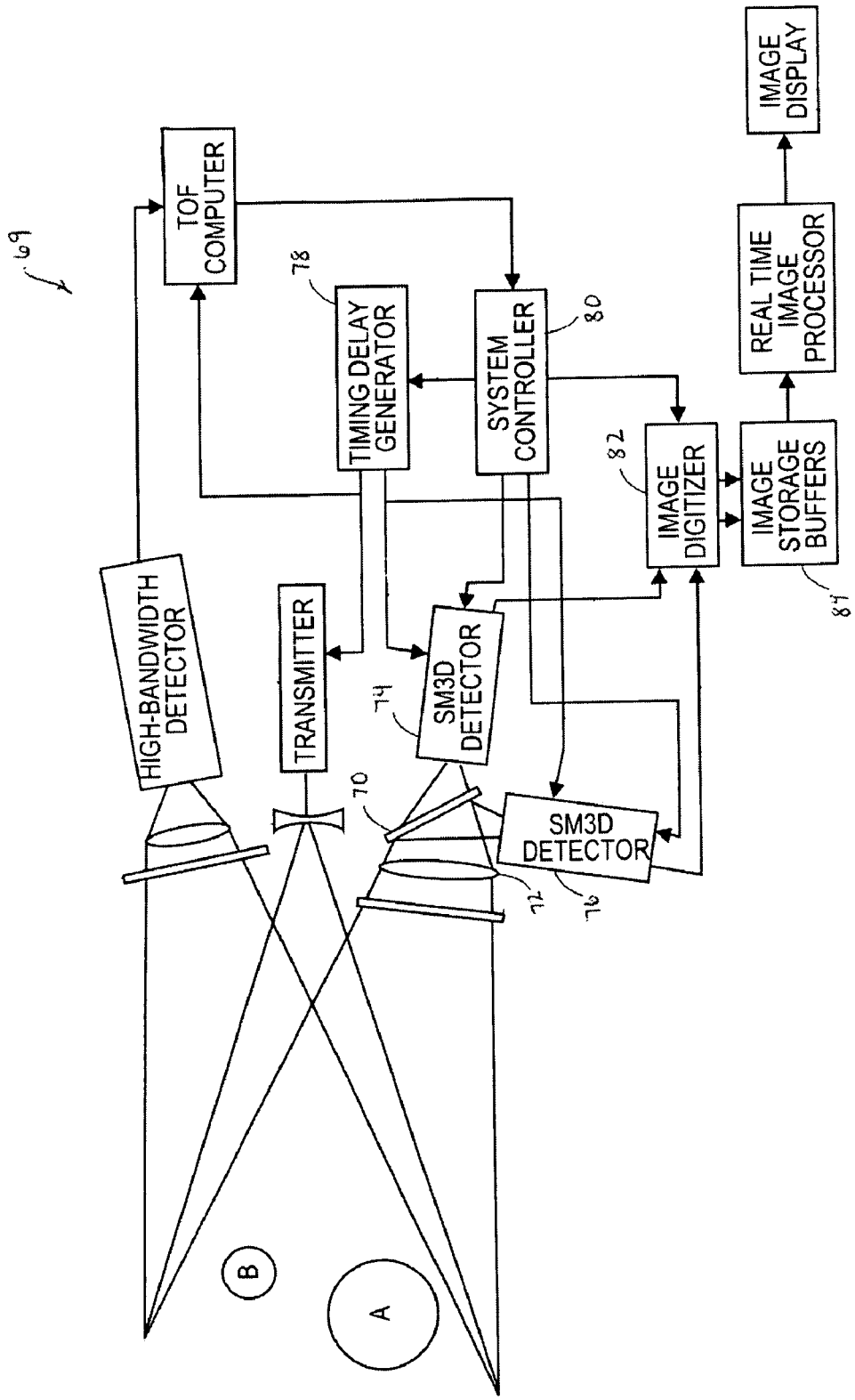
FIG. 12 is a block diagram of another implementation of an SM3D system utilizing two amplifier gain sensitivity modulated imaging detectors.
Figure 13:
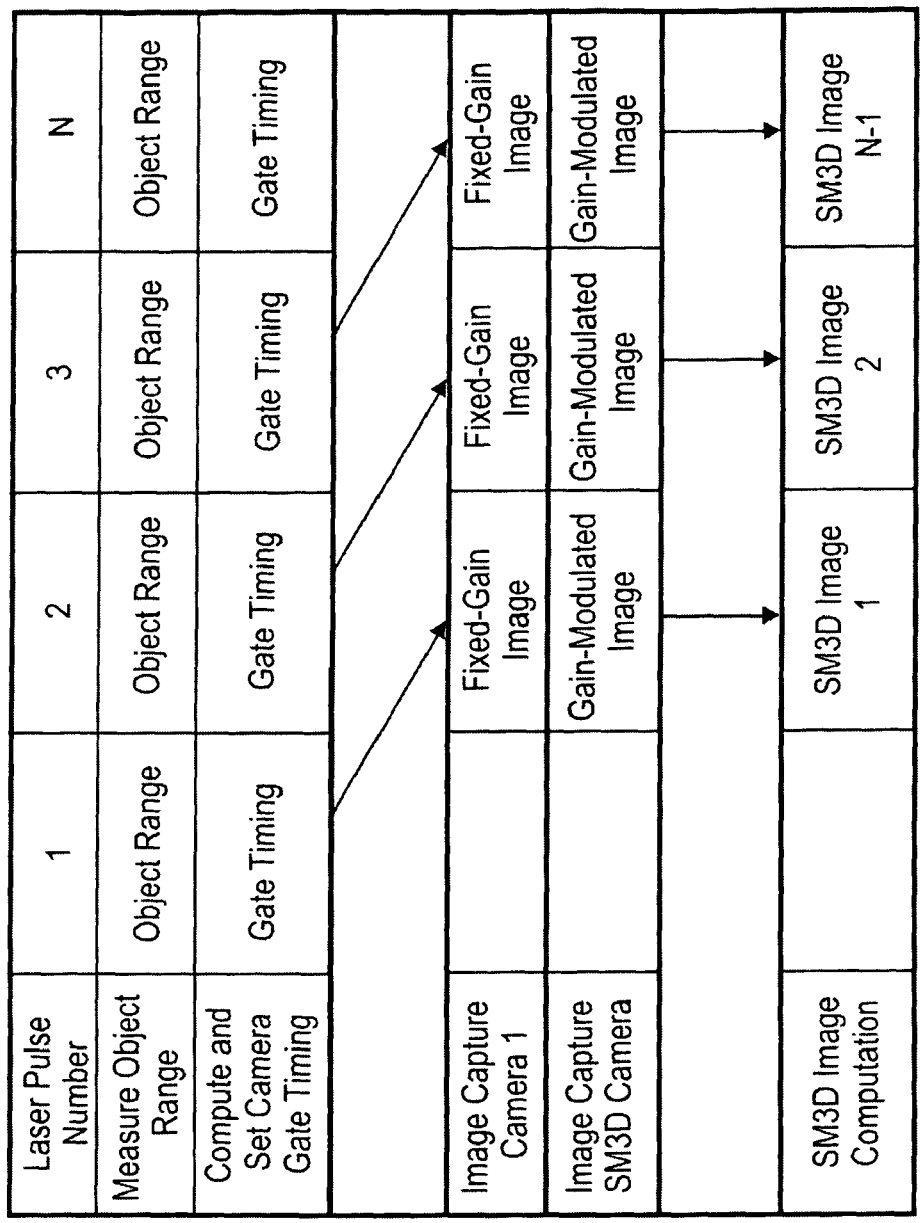
FIG. 13 is a signal processing timing diagram forth the implementation of an SM3D system illustrated in FIG. 12.
Figure 14:
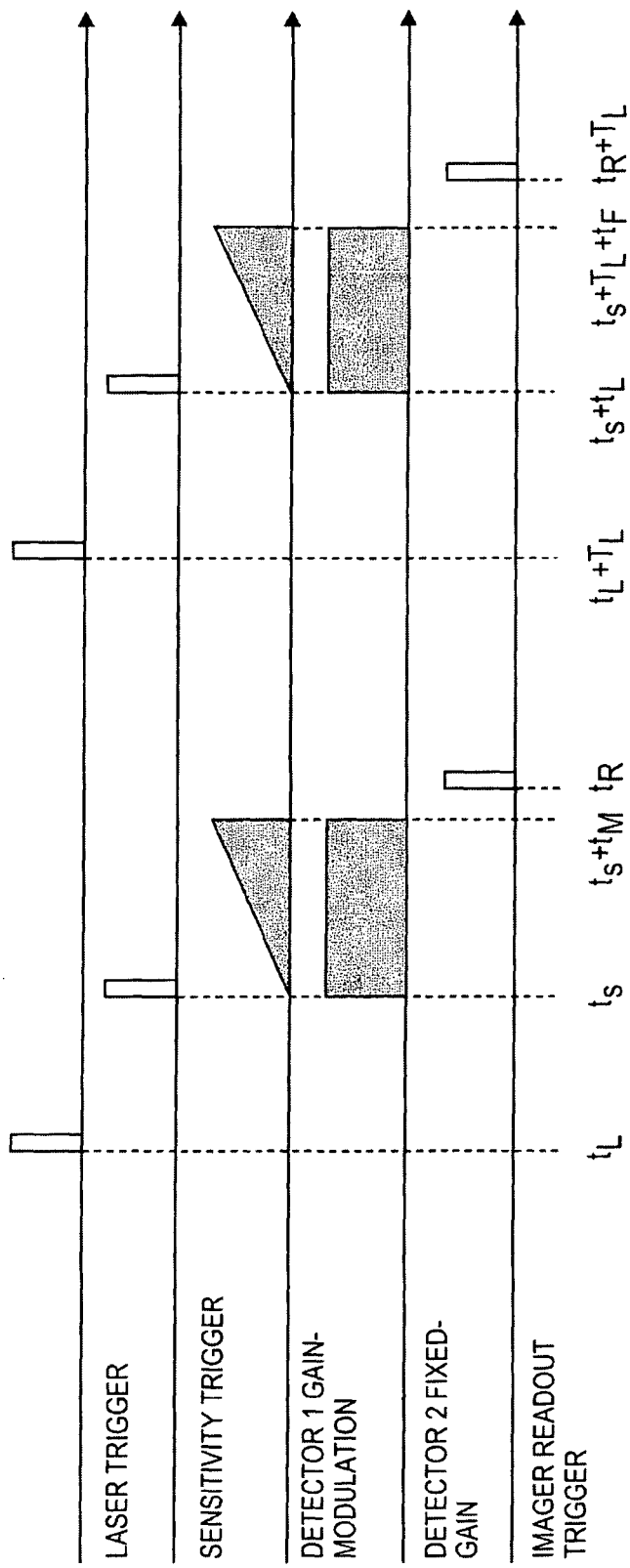
FIG. 14 is a system timing diagram for the implementation of a SM3D system illustrated in FIG. 12.

Implementations of SM3D systems utilizing amplifier gain modulation can be configured to provide SM3D image formation at a rate equal to the laser PRF, or one SM3D image per laser pulse. An implementation of an SM3D system 69 configured to do so is illustrated in FIG. 12. A beam splitter 70 is inserted in the optical path between the image-forming lens (optical imaging element) 72 and a first SM3D detector 74 at about a 45-degree angle. A second SM3D detector 76 is inserted at about a 90-degree angle to the first SM3D detector 74, and is also coupled to the timing delay generator 78 and system controller 80. The combination of the image-forming lens 72 and the beam splitter 70 forms identical images of the object at planes corresponding with both SM3D detectors 74, 76. SM3D detector 74 may be operated in the sensitivity-modulated mode, and SM3D detector 76 may be operated in the constant-sensitivity mode during operation to simultaneously generate sensitivity modulated and constant-sensitivity images from each laser pulse. The images generated by the two SM3D detectors 74, 76 are passed to the image digitizers 82 where they are digitized and subsequently stored in image storage buffers 84. FIG. 13 illustrates how the timing of the various system functions illustrated in FIG. 10 is modified because of the inclusion of the second SM3D detector 76. As illustrated, for each laser pulse both sensitivity-modulated and constant-sensitivity images are captured and stored in the image storage buffers 84. Consequently an SM3D image can be computed for every laser pulse when implementations of SM3D systems 69 configured like those illustrated in FIG. 12 are utilized. FIG. 14 illustrates the system timing diagram for the SM3D system 69 illustrated in FIG. 12. This implementation may also provide both SM3D 3D imagery and conventional grayscale imagery at the laser PRF.

Implementations of imaging detectors and SM3D detectors used in implementations of SM3D systems may include intensified and unintensified imaging detector arrays. By "intensified" is meant incorporation of an amplification element or the use of an amplification method with some portion of the signal produced by the imaging detector array. Imaging detectors may include, by non-limiting example, charge coupled (CCD) devices, microchannel plate (MCP) devices, complementary metal-oxide semiconductor (CMOS) devices, proximity-focused electron bombardment (EB) devices, electron multiplier devices, photoelectron devices, Generation II and Generation III intensified detector arrays, and any other device or system capable of converting photons to corresponding electrons.

Figure 15:
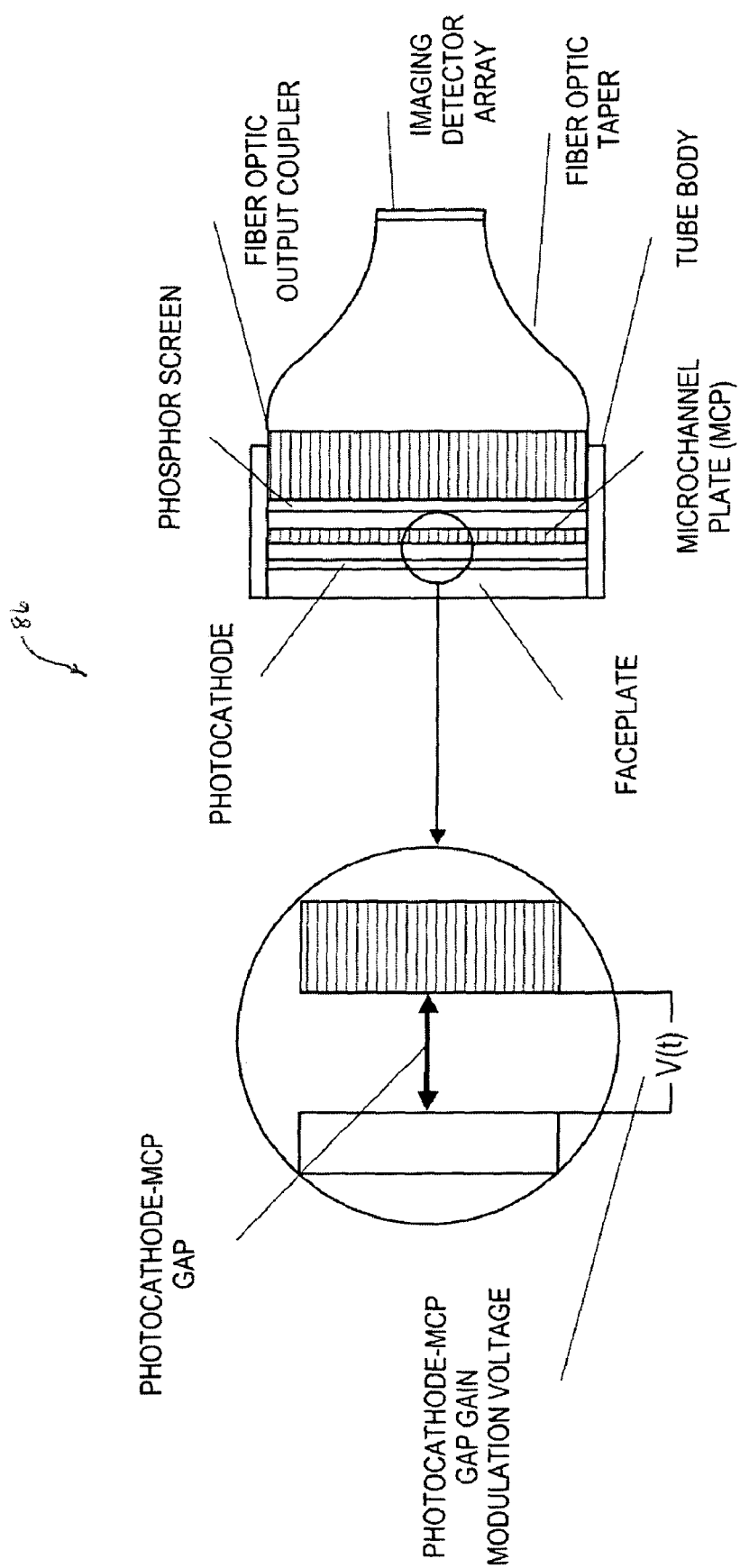
FIG. 15 is a diagram of an implementation of an image intensifier utilizing a micro-channel plate for image gain/intensification to produce receiver sensitivity modulation.

Referring to FIG. 15, an implementation of an intensified detector array 86 is illustrated. The intensified detector array 86 consists of a faceplate (which may be formed of glass) with a photocathode (PC) deposited on a surface of the faceplate, such as the surface opposite incoming light, that converts photons in photon images into corresponding photoelectron images. A micro-channel plate (MCP) electron-multiplier is located a short gap distance (photocathode-MCP gap) from the photocathode and a phosphor screen is located a short gap distance from the exit face of the MCP, or the side of the MCP that is opposite incoming photoelectrons. A fiberoptic output coupler is attached to the phosphor screen to couple phosphor generated light out of the image intensifier assembly. The output fiber optic coupler of the image intensifier is coupled to a fiber optic taper which is coupled to an integrating imaging detector array. This imaging detector array may be any integrating detector array such as, by non-limiting example, a CCD, CMOS, or electron multiplier array, or any other imaging detector array. The imaging detector may include a plurality of unit cells arranged in a plane.

During operation of implementations intensified detector arrays 86, a voltage (V(t)) may be applied across the gap distance to accelerate photoelectron images formed on the photocathode across the gap and onto the MCP. A voltage may also be applied across the MCP to provide accelerating potential for the photoelectron images across the MCP and enable electron gain in the microchannels included in the MCP, thus amplifying the photoelectron image as it passes through the MCP. Because the gap distance between the photocathode and the MCP is small, the photoelectron image can be said to be proximity focused into the MCP. An additional applied voltage applied across the MCP-phosphor screen gap may additionally serve to accelerate and proximity focus the amplified electron image exiting the MCP onto the phosphor screen where the bombarding energetic electrons cause the screen to generate light. The overall gain of implementations of intensified detector arrays 86 may be a function of the PC-MCP gap voltage, the voltage applied across the MCP, and the MCP-phosphor screen gap voltage. The exposure time of implementation of intensified detector arrays 86 may be controlled by controlling the temporal duration of the PC-MCP gap voltage. Controlling the PC-MCP gap voltage is often referred to as "gated operation" of an implementation of an intensified detector array 86. Accordingly, the sensitivity of implementations of intensified detector arrays 86 can be temporally modulated by temporally modulating the PC-MCP gap voltage.

Figure 16:
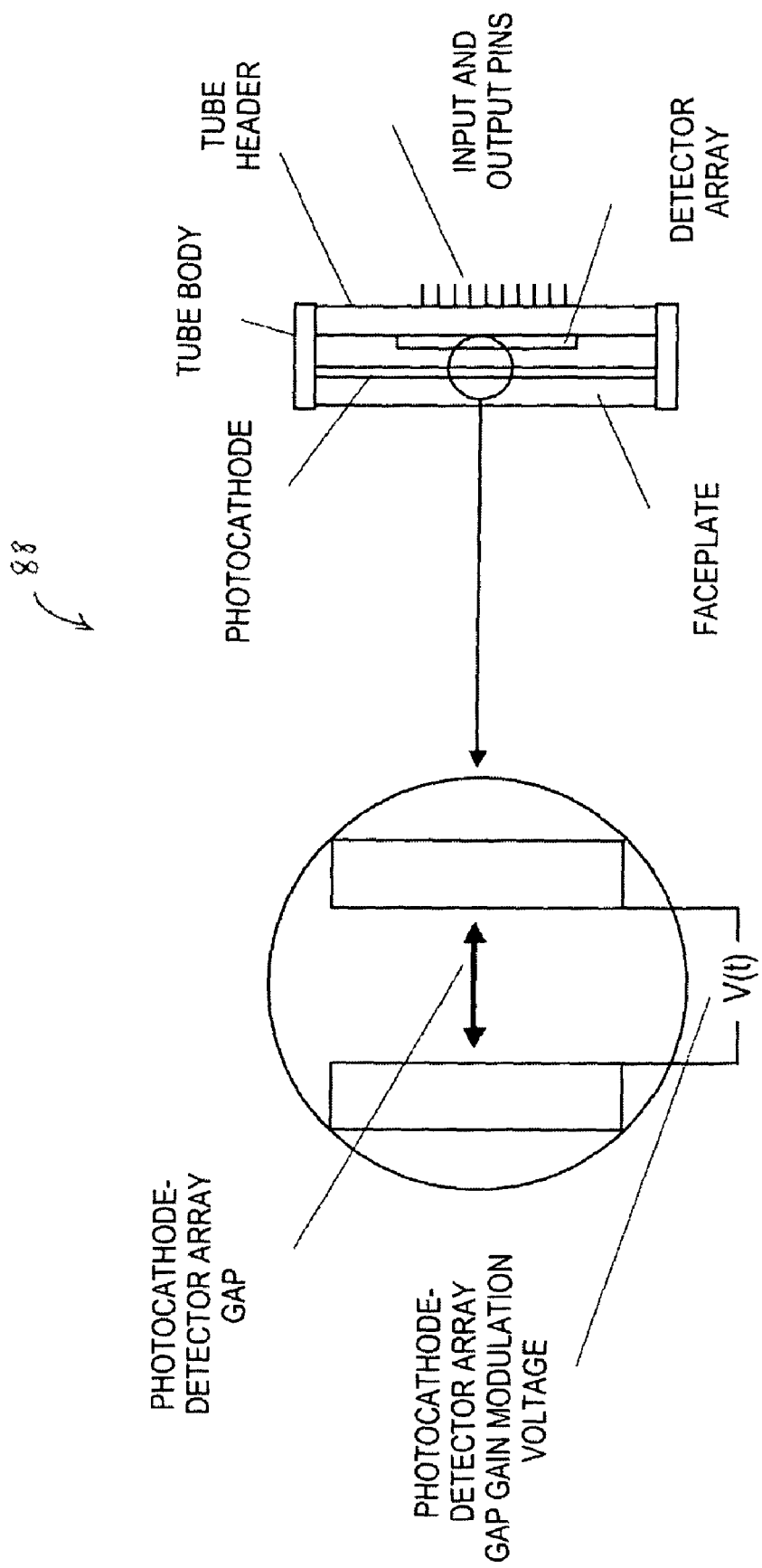
FIG. 16 is a diagram of an implementation of an image intensifier utilizing a proximity-focused diode array to produce receiver sensitivity modulation.

Referring to FIG. 16, another implementation of an intensified detector array 88 is illustrated. The intensified detector array 88 includes a proximity-focused intensifier utilizing electron bombardment (EB) for electron image intensification (gain). The intensified detector array 88 includes a photocathode (PC). A detector array is located across a short gap distance (photocathode-detector array gap) from the photocathode and is attached to a tube header. Input and output pins bring power to the detector array and carry detector array image signals out of the tube body, to which the PC and tube header are attached. The detector array may be formed of a wide variety of photoelectric materials, including, by non-limiting example, silicon, doped silicon, gallium arsenide, semiconductor materials, InGaAs PIN diode/ROIC hybrid arrays, Si APD, InGaAs APD/ROIC hybrid arrays, and any other material capable of generating a photoelectric signal.

During operation of implementations of intensified detector arrays 88, the PC converts incoming photon images into a corresponding photoelectron images. A voltage (V(t)) may be applied across the PC-detector array gap to accelerate the photoelectron image across the gap and into the detector. Because the gap is small, the photoelectron image may be proximity focused onto the detector array. When the accelerated electron image strikes the detector array, electron-hole pairs are created in the detector in quantities proportional to the accelerating PC-detector gap voltage (V(t)). For the exemplary purposes of this disclosure, for a silicon detector array, electron bombardment in silicon (EBS) generates one electron/electron-hole pair per 3.6 eV of electron energy. Similarly to the implementations of intensified detector arrays 86 illustrated in FIG. 15, the exposure time of implementations of intensified detector arrays 88 like those illustrated in FIG. 16 can be controlled by altering the temporal duration of the PC-detector gap voltage. Consequently, the sensitivity of the EB image intensifier can be temporally modulated by temporally modulating the PC-detector gap voltage.

Figure 17:
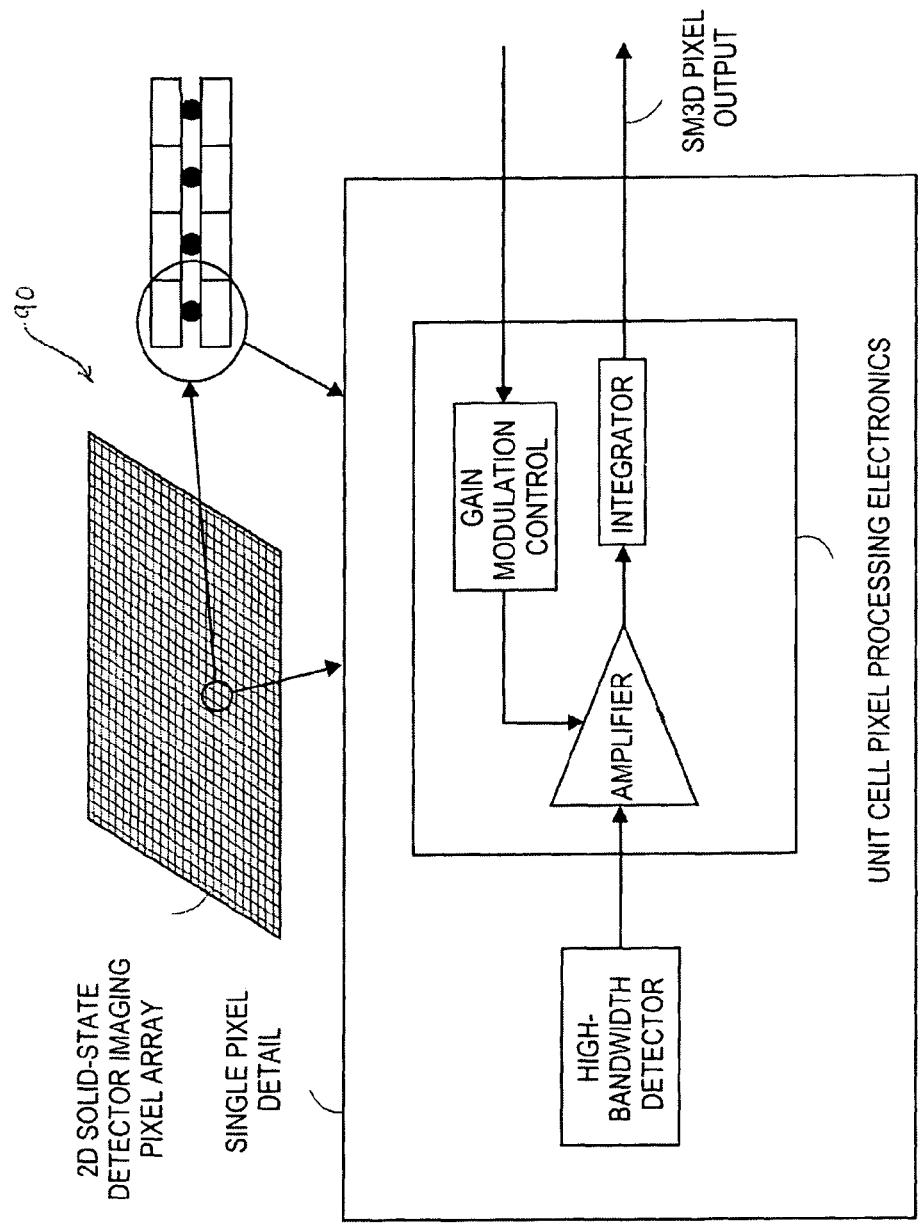
FIG. 17 is a diagram of an implementation of an diode array bump-bonded to a Readout Integrated Circuit (ROIC) including amplifier gain modulation for an implementation of an SM3D system.

Referring to FIG. 17, another implementation of an intensified detector array 90 is illustrated. These implementations of intensified detector arrays 90 are solid-state and are composed of an array of high-bandwidth detectors (detectors) on a first substrate coupled with a readout integrated circuit (ROIC) on a second substrate. While the implementation illustrated in FIG. 17 utilizes bump-bonding, any other method and/or structure for joining the high-bandwidth detectors to the ROIC may be used, such as, by non-limiting example, through-silicon vias, compression bonding, thermal compression bonding, wafer bonding, glue, tape, or any other technique of joining two substantially parallel surfaces together. In addition, in particular implementations, the high-bandwidth detectors may be formed with the ROIC circuitry on the same substrate through any of a wide variety of semiconductor process flows. The high-bandwidth detectors can be, by non-limiting example, photodiodes, avalanche photodiodes, or any other electronic device capable of receiving photons as input and producing corresponding electrons.

As illustrated, the ROIC may consist of an array of unit cells (plurality of unit cells) arranged in a plane each of which contains pixel processing electronics. In particular implementations, one unit cell on the ROIC may correspond for each detector pixel, although the ratio of unit cell to detector pixel may be any number greater than or less than one, depending on processing requirements. Each unit cell may include an amplifier having a gain which can be temporally modulated by a gain modulation control signal. The output of the amplifier is coupled to an integrator.

During operation of implementations of intensified detector arrays 90, a photon image may be received by the high-bandwidth detectors and a photoelectric signal communicated to the plurality of unit cells of the ROIC through the bump bonds. The gain modulation control signal may alter the gain of the amplifier to temporally modulate the sensitivity of the intensified detector array 90 and produce a gain modulated electronic signal. The electronic integrator may receive the gain modulated electronic signal and integrate it over a predefined period of time to produce a pixel electronic signal output. When the gain of the amplifier is temporally modulated by the gain modulation control signal, implementations of intensified detector arrays 90 are operating in sensitivity-modulated mode; when the gain of the amplifier is not modulated, the detector arrays are operating in fixed-gain mode.

Figure 18:
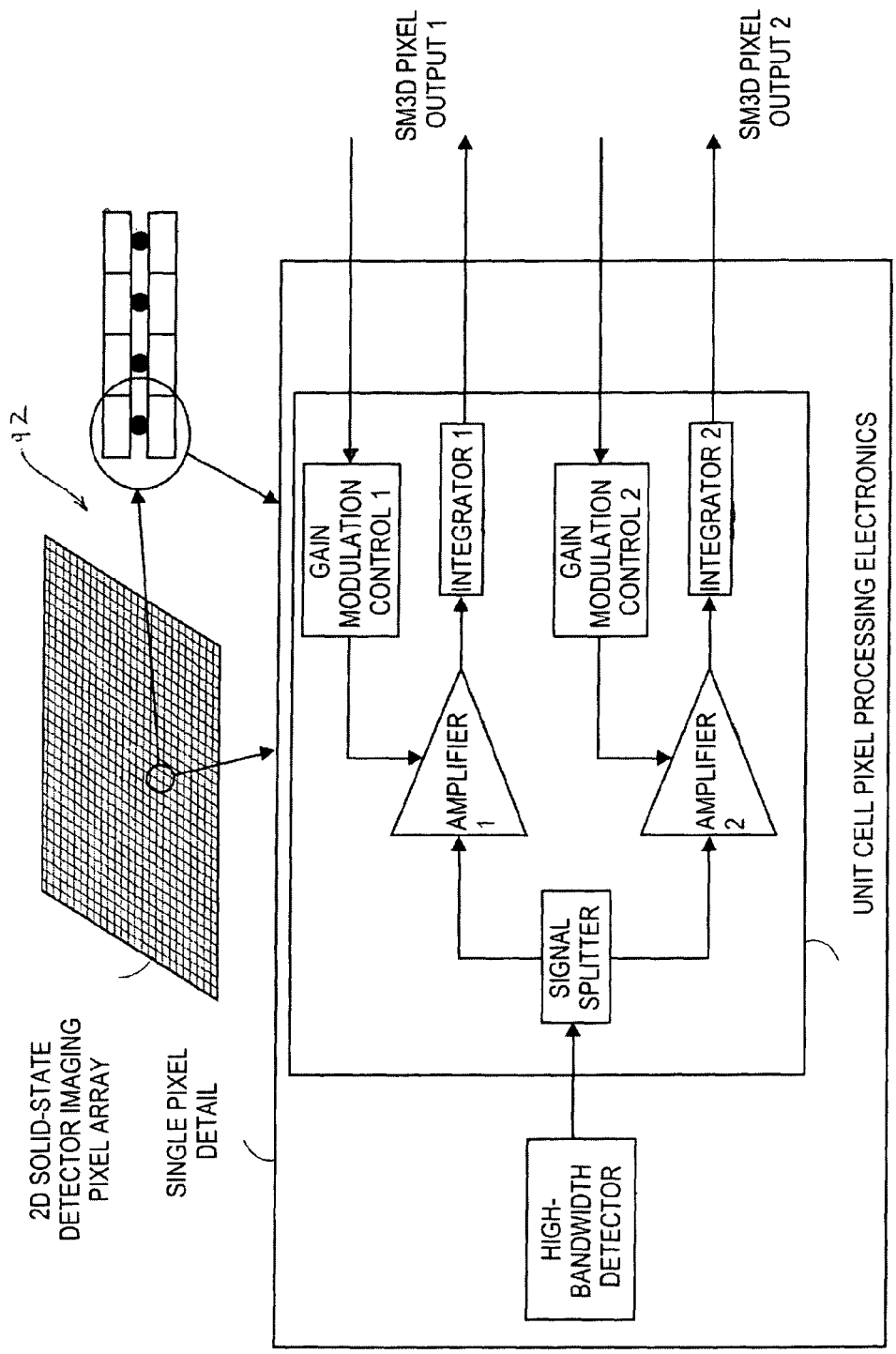
FIG. 18 is a diagram of an implementation of a diode array bump-bonded to a ROIC including two channel amplifier gain modulation for an implementation of an SM3D system.

The implementation of an intensified detector array 90 illustrated in FIG. 17 can produce one SM3D image for every two laser pulses, or at one half of the laser PRF. Referring to FIG. 18, other particular implementations of intensified detector arrays 92 can be produced to allow for SM3D image formation at a rate equal to the laser PRF, that is, one SM3D image for each laser pulse. As illustrated in FIG. 18, the ROIC unit cell includes two amplifier-integrator channels, the first channel including a first amplifier coupled with a first integrator and the second channel including a second amplifier coupled with a second integrator, each of which is controlled independently by a first gain modulation control signal and a second gain modulation control signal, respectively. The two channels are coupled to the high-bandwidth detector through a signal splitter.

During operation of the intensified detector array 92, the high-bandwidth detector output signal is divided by the signal splitter into two portions, one of which passes to the first channel and the other to the second channel. The gain of the first amplifier may be temporally modulated by the first gain modulation control signal as the split signal from the high-bandwidth detector enters, allowing the first integrator to produce a first pixel electronic output corresponding to a sensitivity modulated image. The gain of the second amplifier may be held constant as the portion of the signal from the high-bandwidth detector is processed, allowing the second integrator to produce a second electronic pixel output corresponding to a fixed-gain image. The foregoing order of temporal modulation/non-modulation of the amplifier gains may be reversed or both the gains on both amplifiers may be temporally modulated or not depending upon how the intensified detector array 92 is operated and the characteristics of the SM3D system in which it is implemented. For the exemplary purposes of this disclosure, the implementation of an intensified detector array 92 illustrated in FIG. 18 may be used in an implementation of an SM3D system 2 like that illustrated in FIG. 2. For such a single-detector system, the signal processing and system timing diagrams are presented in FIG. 19 and FIG. 20 respectively. Because of the two channel processing capability of the intensified detector array 92, an SM3D system 2 configured with only one detector can still output an SM3d image at the laser PRF. This implementation may also provide both SM3D 3D imagery and conventional grayscale imagery at the laser PRF.

It is clear the foregoing examples of detector array types that could be used to implement the SM3D detection process is not exhaustive. Any detector array that can be operated in a temporally gain-modulated mode can be implemented in an SM3D system using the principles disclosed this document.

Figure 21:
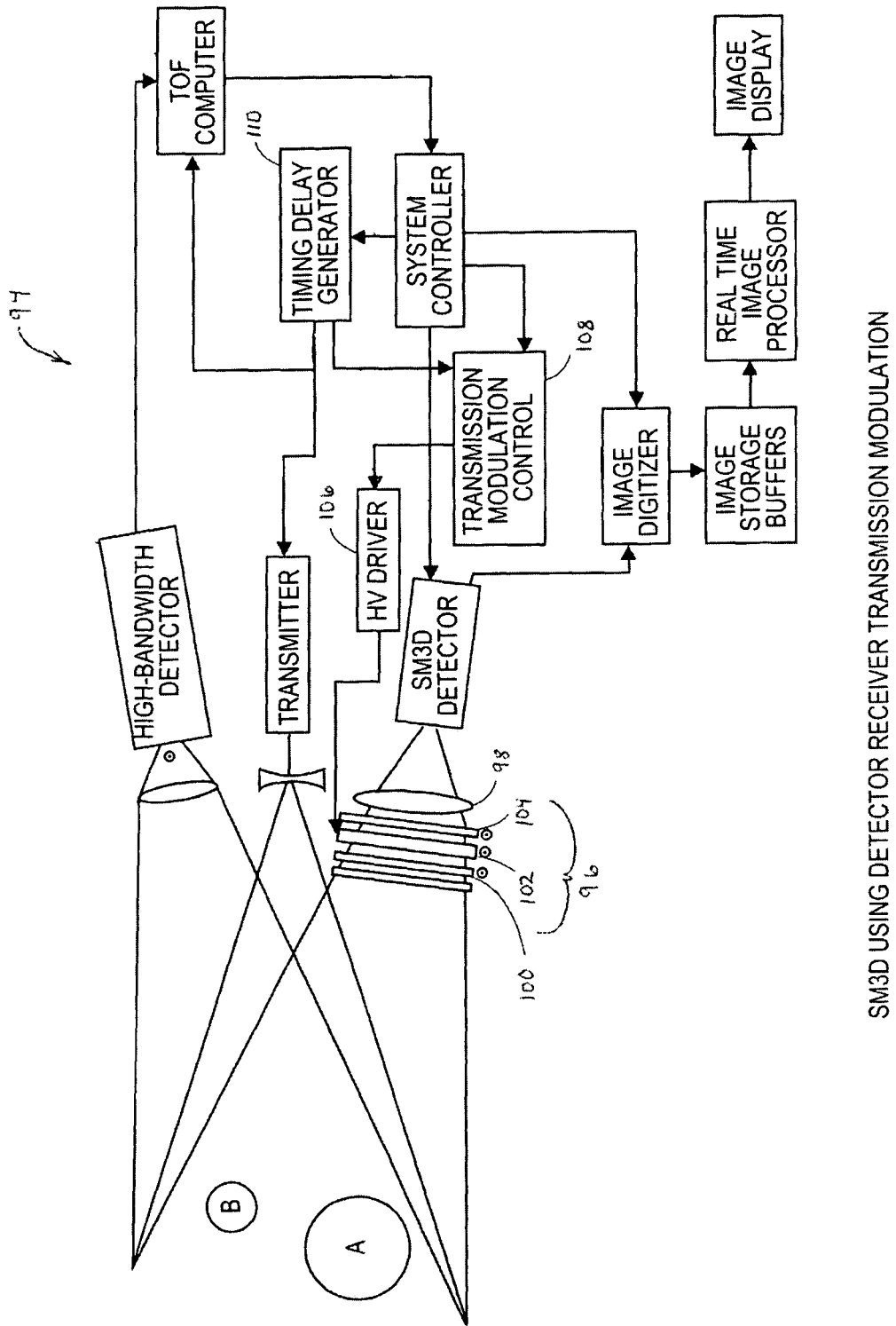
FIG. 21 is a block diagram of an implementation of an SM3D system that utilizes receiver sensitivity modulation by using transmission modulation.

Referring to FIG. 21, an implementation of a sensitivity modulated SM3D system 94 utilizing receiver temporal transmission modulation as shown in FIG. 1, section C is illustrated. Many of the components of the SM3D system 94 are analogous to the SM3D system implementations previously discussed that implemented amplifier gain modulation. However, these implementations, the sensitivity modulator of the light detection system does not involve an imaging detector capable of temporal amplifier gain modulation. Instead, the sensitivity modulator includes a transmission modulator that temporally modulates the transmission of light to the imaging detector. However, in other particular implementations, however, imaging detectors capable of temporal amplifier gain modulation may be used.

Since the use of imaging detectors capable of temporal amplifier gain modulation is not required for transmission sensitivity modulation, a wide variety of detector types could be used in implementations of an SM3D system 94. Such detectors could include, by non-limiting example, CCD arrays, CMOS arrays, InGaAs PIN diode/ROIC hybrid arrays, and InGaAs APD/ROIC hybrid arrays, photocathode-MCP tubes, and any other photoelectronic device. For the exemplary purposes of this disclosure, the transmission modulator may be an optical transmission modulator 96 placed on the side of imaging lens 98 facing the objects being imaged. The optical transmission modulator is comprised of a linear polarizer 100, a polarization rotator 102, and a second linear polarizer 104 with its optical axis aligned at 90 degrees with respect to linear polarizer 100.

Figure 19:
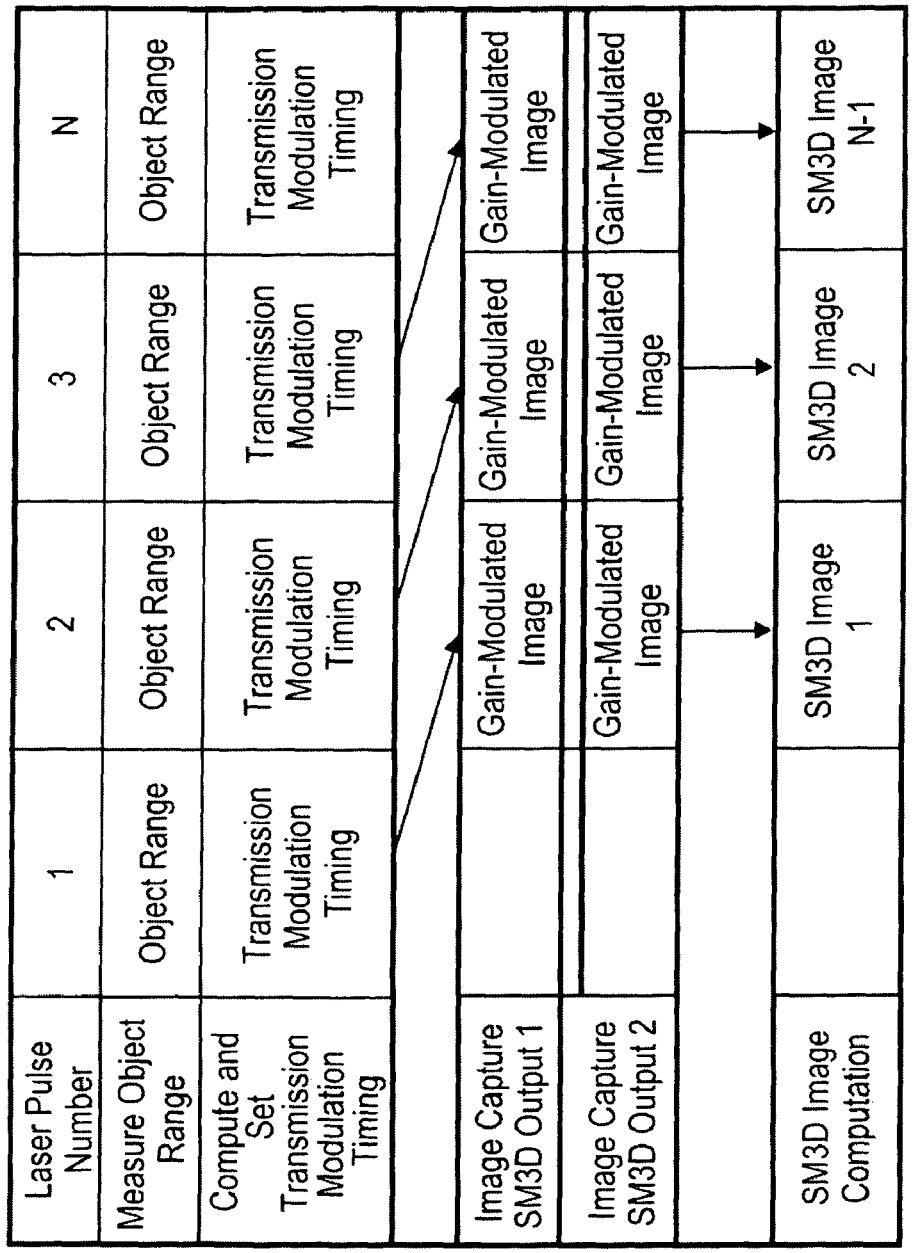
FIG. 19 is a signal processing timing diagram for an implementation of an SM3D system including an implementation of a diode array like that illustrated in FIG. 18.
Figure 20:
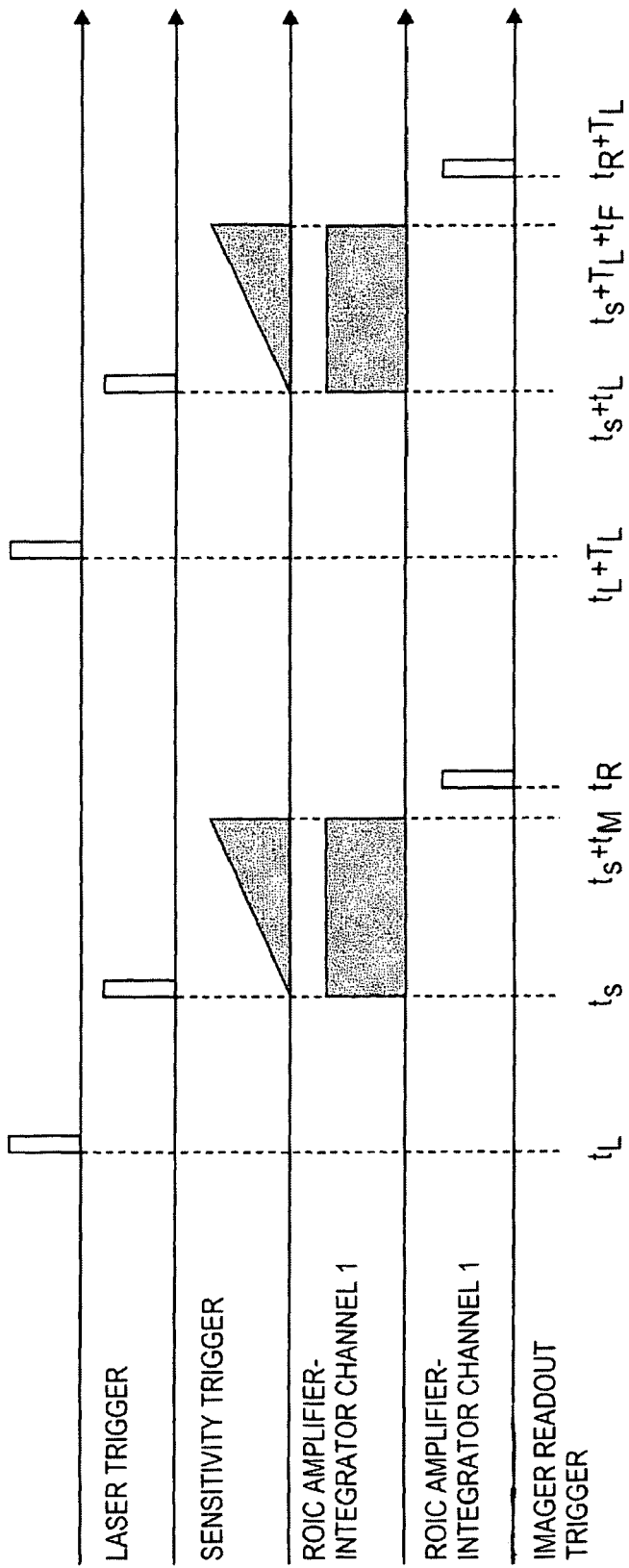
FIG. 20 is a signal timing diagram for an implementation of an SM3D system including an implementation of the diode array like that illustrated in FIG. 18.
Figure 22:
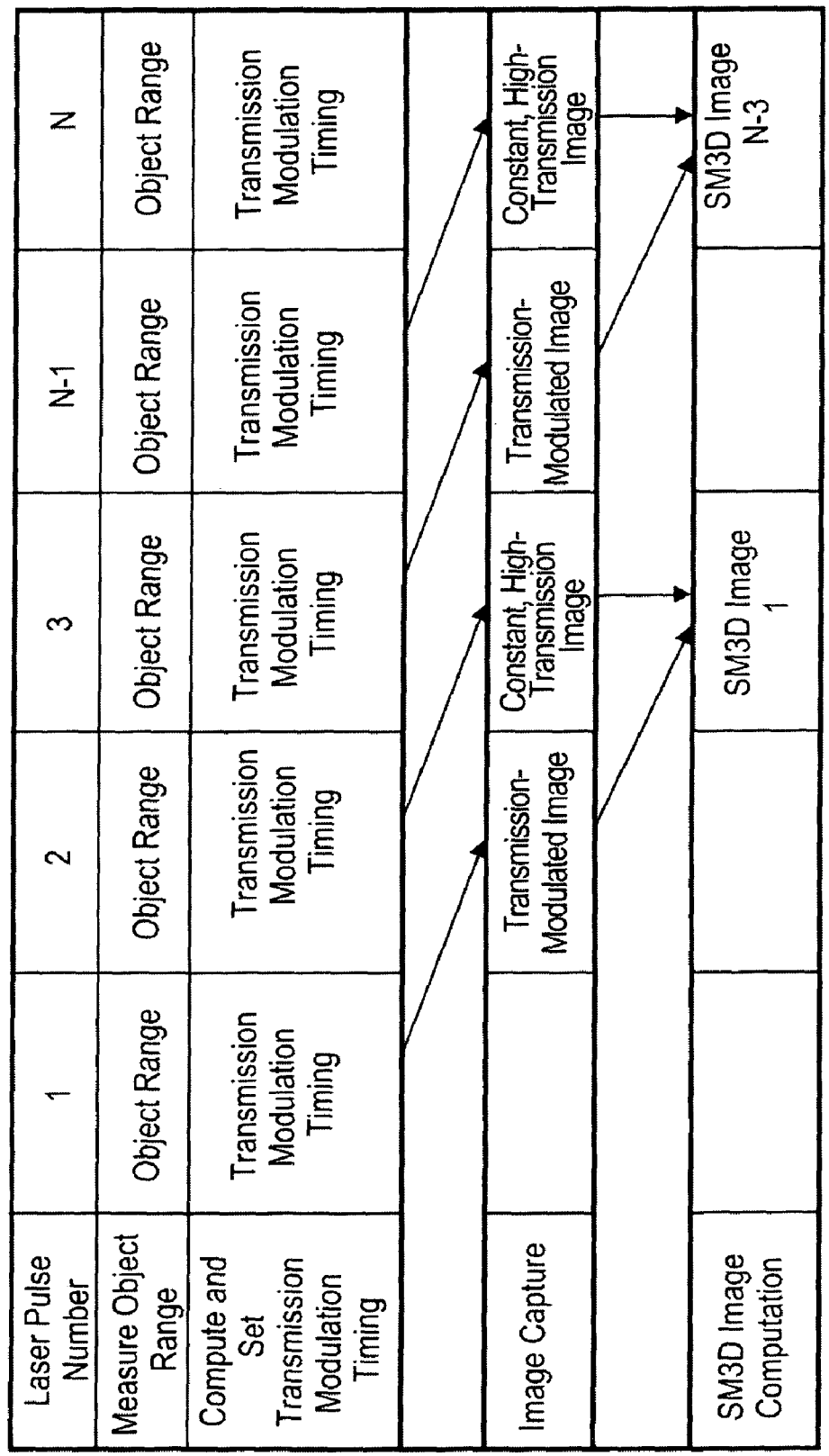
FIG. 22 is a signal processing timing diagram for the implementation of an SM3D system illustrated in FIG. 21.
Figure 23:
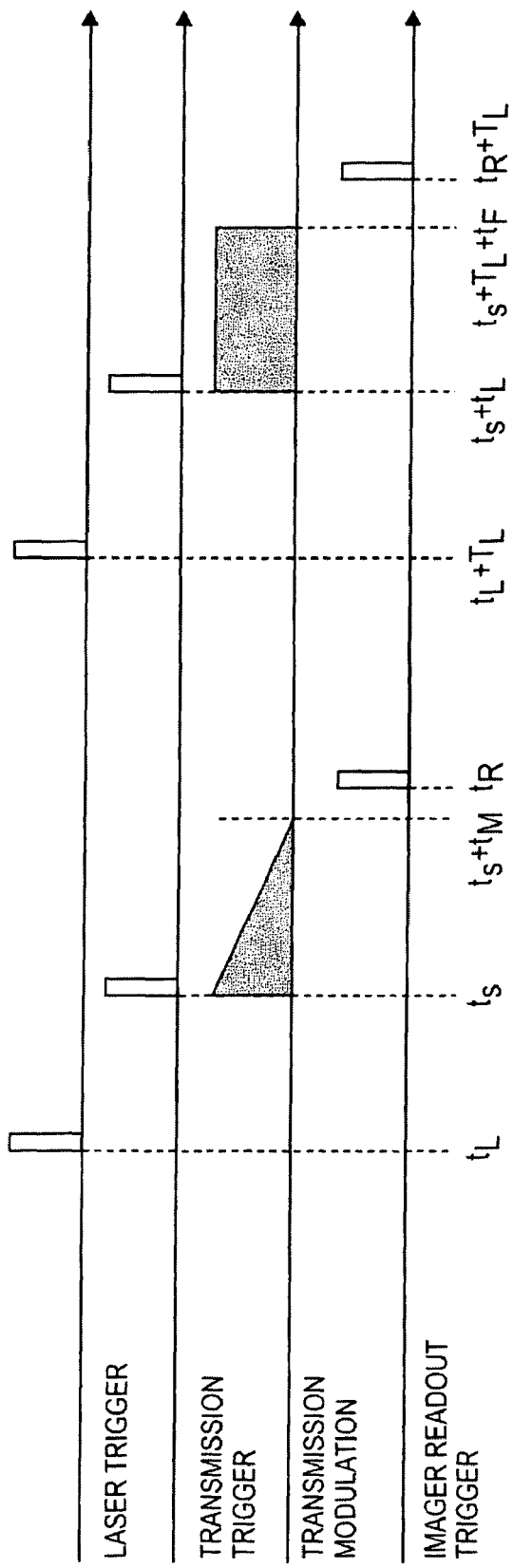
FIG. 23 is a signal timing diagram for the implementation of an SM3D system illustrated in FIG. 21.

The polarization rotator 102 can be implemented as a Pockel's cell driven with a voltage waveform from a high voltage (HV) driver 106 and transmission modulation control 108 in response to signals from the timing delay generator 110. The Pockel's cell of the polarization rotator 102 is oriented so that it provides zero degrees polarization vector rotation when the applied voltage from the HV driver 106 is zero. When the Pockel's cell is in this orientation, the optical transmission of the transmission modulator 96 is an increasing function of the rotation of the polarization rotator 102, or is proportional to the voltage applied to the Pockel's cell. By configuring the functional form of the temporal high voltage applied to the Pockel's cell of the polarization rotator 102, any of the receiver sensitivity profiles illustrated in FIGS. 3, 4, 5, 8, and 9 may be achieved. Accordingly, the system function and timing sequences illustrated in FIGS. 10 and 11 can be modified to include transmission modulation rather than gain modulation. Examples are shown in FIGS. 22 and 23 that correspond to the implementation of an SM3D system 94 illustrated in FIG. 21. Like the amplifier gain modulated SM3D system 2 illustrated in FIG. 2, the SM3D image frame rate for the transmission sensitivity modulated system of FIG. 19 is equal to the laser PRF divided by two.

Figure 24:
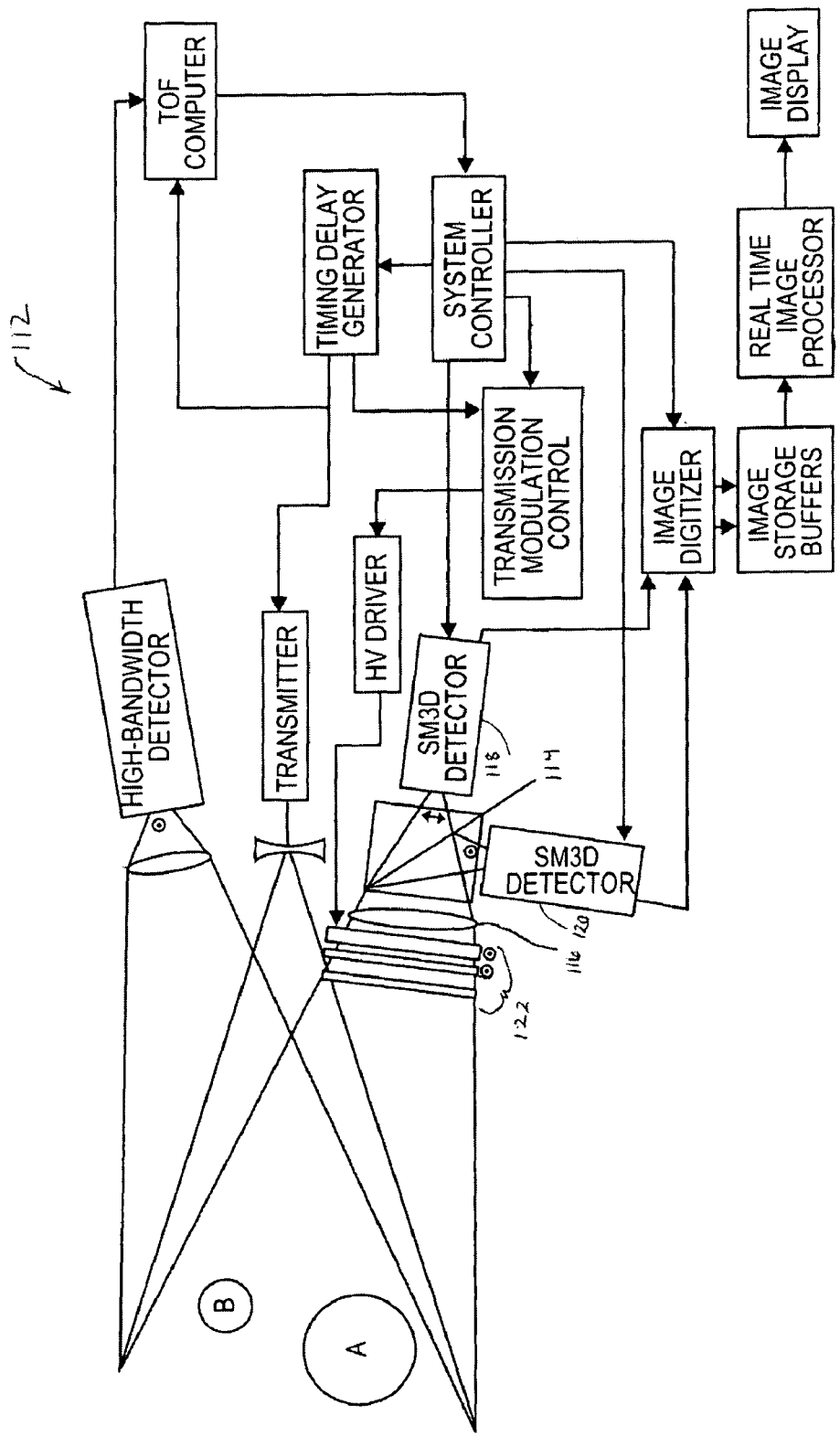
FIG. 24 is a block diagram of an implementation of an SM3D system incorporating two imaging detectors.
Figure 25:
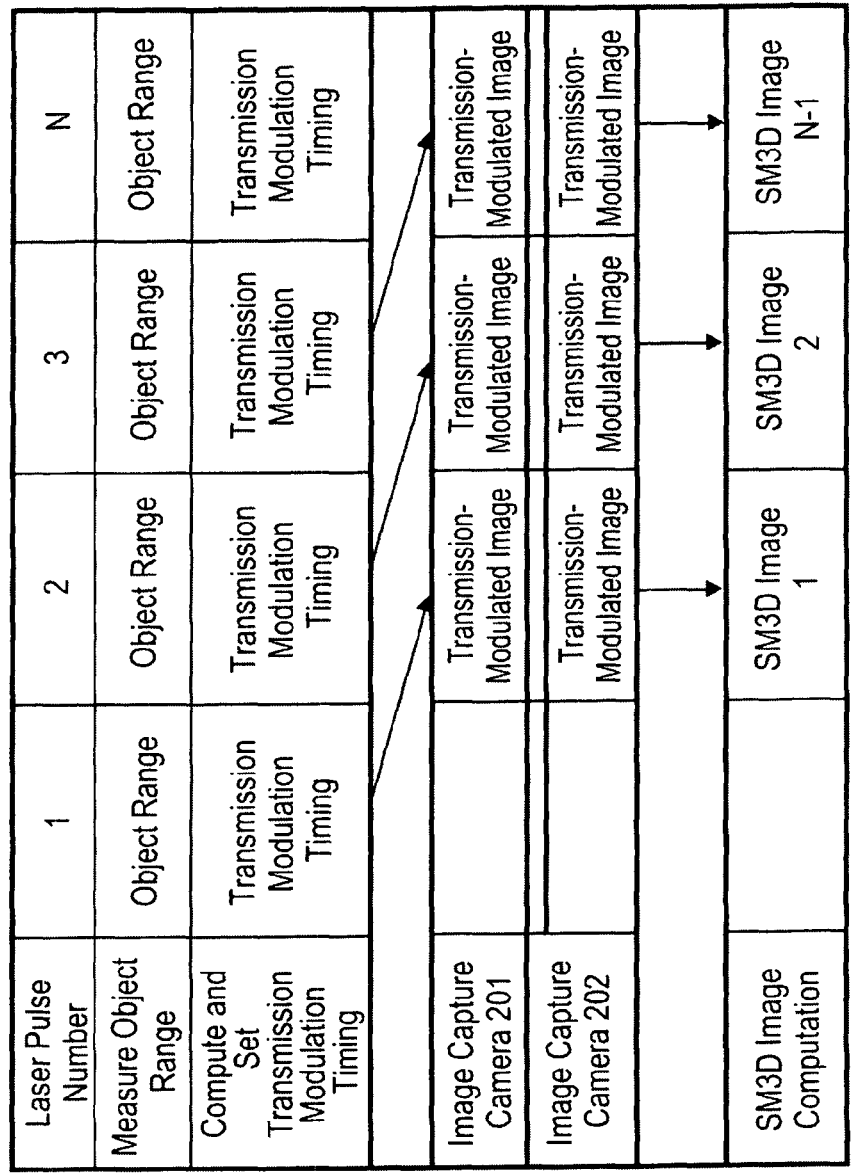
FIG. 25 is a signal processing timing diagram for the implementation of an SM3D system illustrated in FIG. 24.
Figure 26:
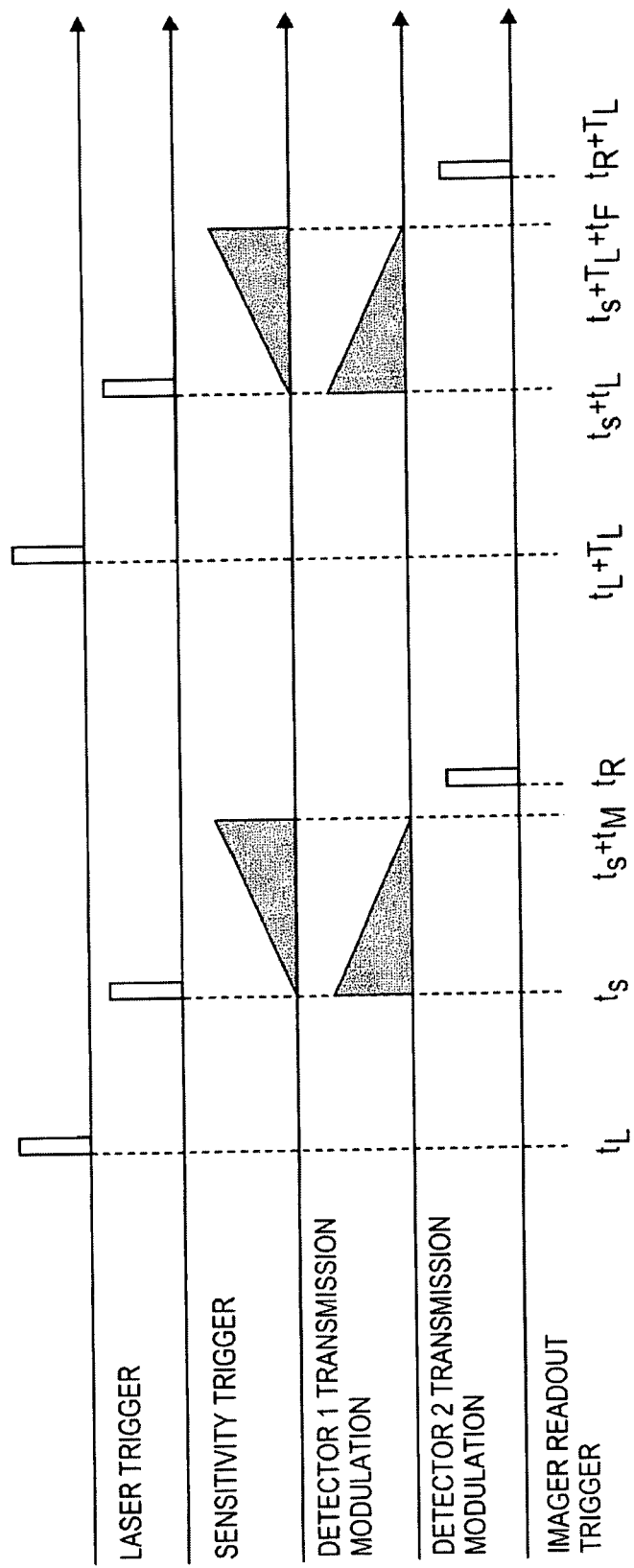
FIG. 26 is a signal timing diagram for the implementation of an SM3D system illustrated in FIG. 24.

Referring to FIG. 24, an implementation of a SM3D system 112 utilizing transmission modulation capable of providing SM3D images at the laser PRF is illustrated. A polarization beam splitting cube 114 is inserted in the optical path between the optical imaging element 116 and the imaging detector 118. A second imaging detector 120 is inserted at a 90-degree angle to the first imaging detector 118. The linear polarizer 104 of the transmission modulator 96 illustrated in FIG. 18 is removed since its function is now being performed by the polarization beam splitting cube 114. As illustrated in the system function and system timing diagrams in FIGS. 25 and 26, the use of the polarization beam splitting cube 114 allows the transmission modulator 122 of implementations of SM3D systems 112 like those in FIG. 24 to simultaneously increase the sensitivity of the first imaging detector 118 while decreasing the sensitivity of the second imaging detector 120.

In both of the foregoing receiver temporal transmission modulation implementations of SM3D systems 94, 112, each uses receiver polarization using a linear polarizer, followed by polarization rotation using a Pockel's cell, followed by a second polarizing element, to achieve temporal transmission modulation. Because the laser light reflected by many objects is depolarized, the initial receiver polarizing element reduces the overall transmission of the receiver by a factor of 0.5. This reduction reduces the amount of light passed to the imaging detectors and may increase the overall shot noise of the SM3D systems, 94, 112. Such light transmission reduction due to polarization optics does not occur with many gain-modulated implementations of SM3D systems. Because of this, many implementations of gain modulated SM3D systems may have a higher shot noise signal-to-noise-ratio (SNR) than transmission modulation implementations.

Figure 27:
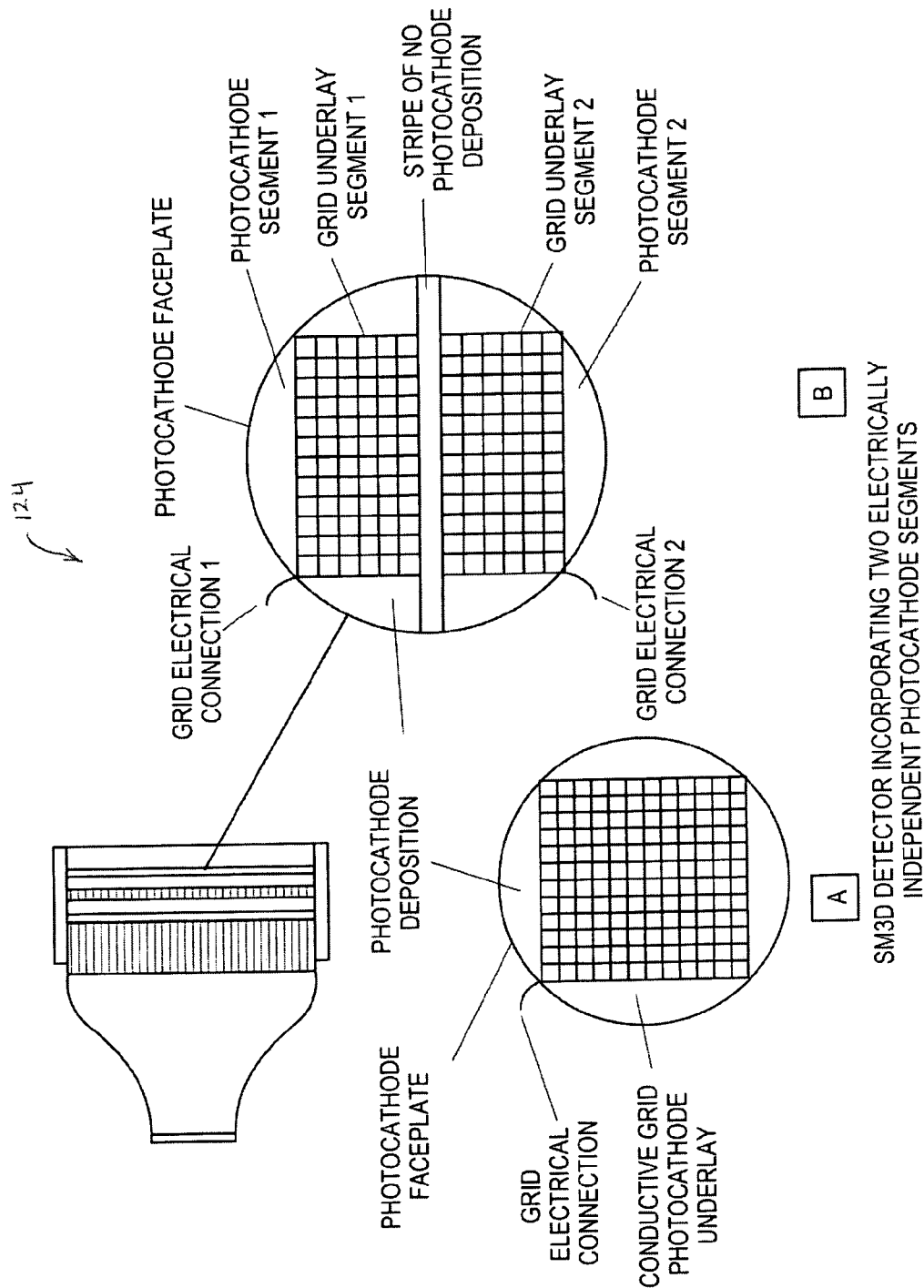
FIG. 27 illustrates implementations of image intensifiers incorporating a single and two independent electrical regions on a photocathode face plate, respectively.

The imaging detector for a particular implementation of an SM3D system can utilize an imaging detector array 86 like that illustrated in FIG. 15. In such an imaging detector array, the photon image is converted to a photoelectron image through a photocathode. Referring to FIG. 27, an implementation of an imaging detector array 124 is illustrated that includes a photocathode with two electrically independent photocathode regions. FIG. 27, section A illustrates a photocathode like that illustrated in FIG. 15, which includes a conductive grid photocathode underlay with a grid electrical connection forming a plurality of unit cells. The conductive grid photocathode underlay may provide fast temporal response across the entire photocathode to voltages applied at the grid electrical connection.

Figure 28:
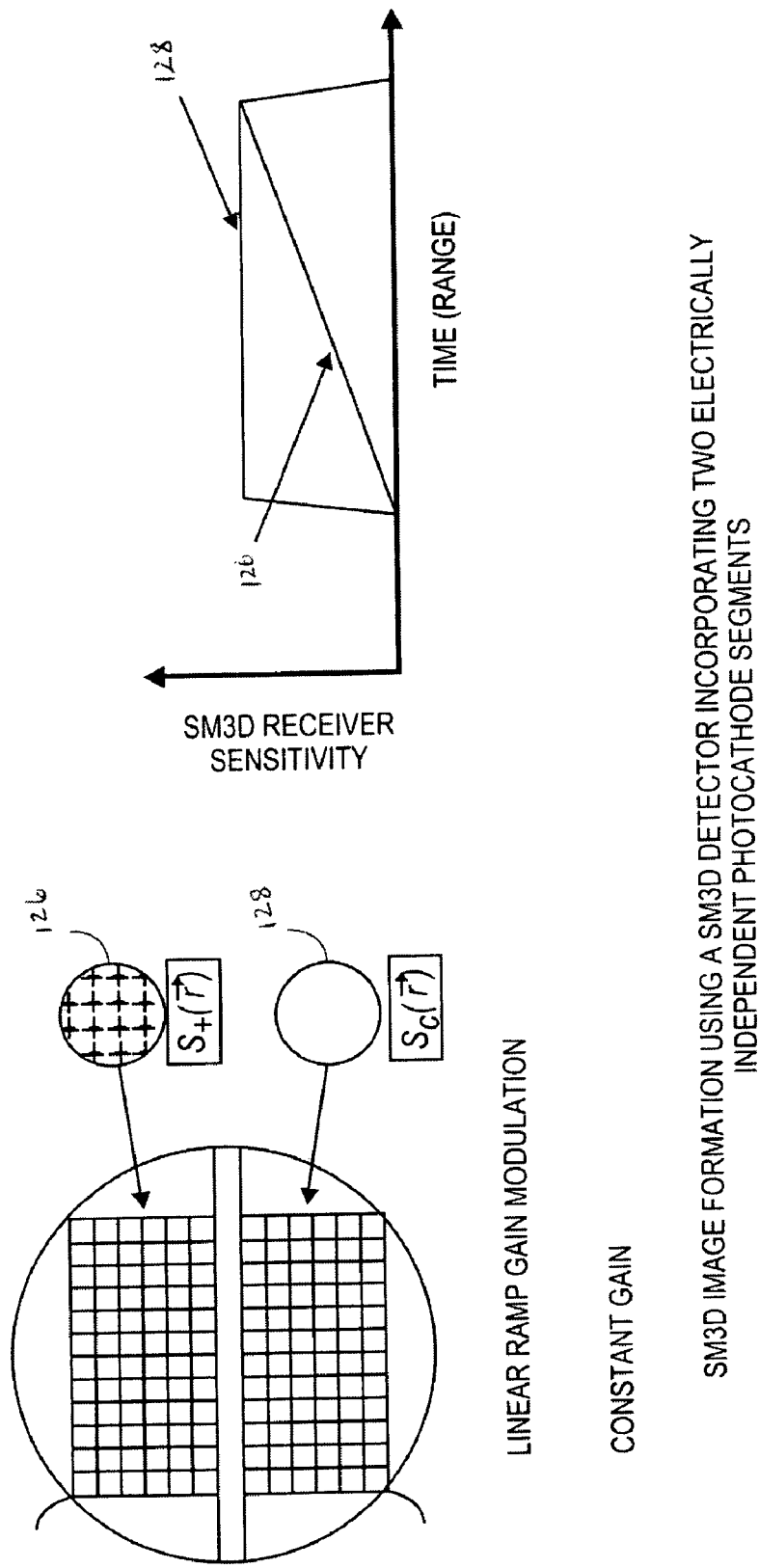
FIG. 28 is a diagram illustrating how an implementation of an image intensifier having two independent electrical regions on its photocathode face plate can be simultaneously operated to collect the linear ramp gain characteristic and the constant gain characteristic for an SM3D image.

FIG. 27, section B, illustrates a photocathode with a stripe of no photocathode deposition, which becomes an electrical isolation stripe between the two segments of the photocathode formed, segment 1 and segment 2. To connect with each of the segments, a corresponding grid electrical connection is provided. Because the two segments are electrically isolated and separately wired, each can be voltage biased independently. FIG. 28 illustrates the operation of such a photocathode. During operation, one segment 126 of the photocathode can be supplied with a positive-slope ramp voltage to generate a ramped-gain image with range coded as grayscale, while the other segment 128 can simultaneously be supplied with a constant voltage to generate a constant-gain image for normalization. Because the entire output of the photocathode is received by a single detector, both images will be received on the detector simultaneously. Such a photocathode can utilize implementations of image processing methods like those illustrated in FIGS. 6 and 7. The dark images used in those methods can be obtained while the SM3D detector is gated off.

Figure 29:
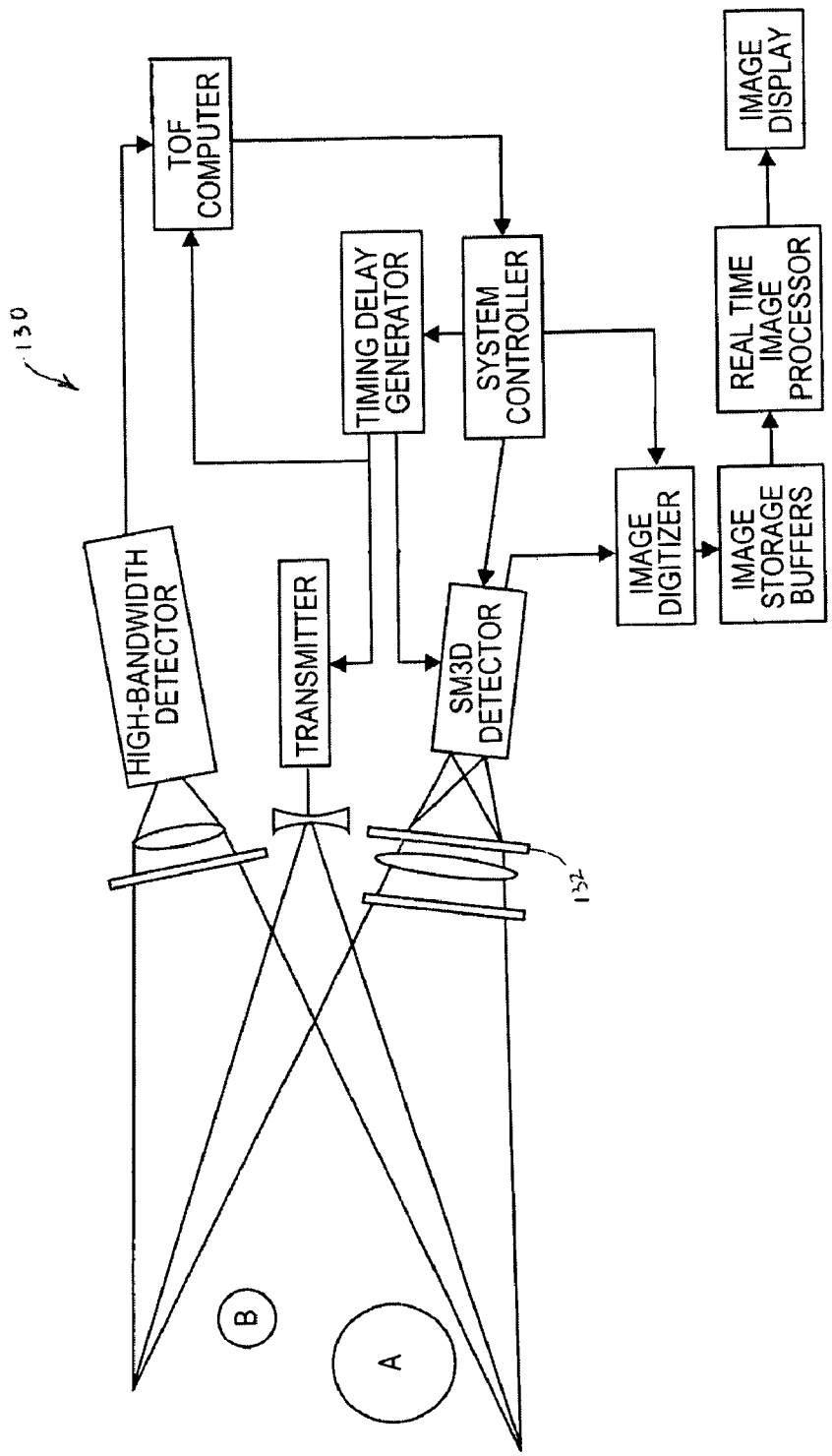
FIG. 29 is a diagram illustrating an implementation of an SM3D system including an implementation of an image intensifier having two independent electrical regions like that illustrated in FIG. 28.
Figure 30:
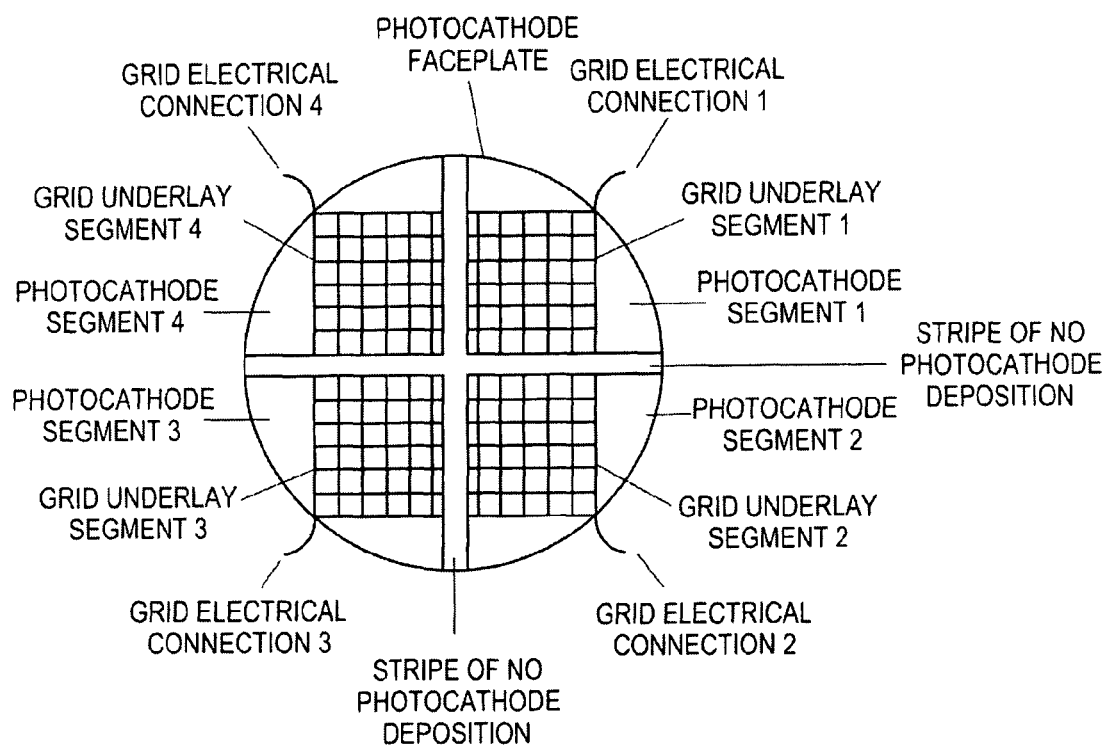
FIG. 30 illustrates an implementation of an image intensifier having four independent electrical regions on its photocathode face plate.
Figure 31:
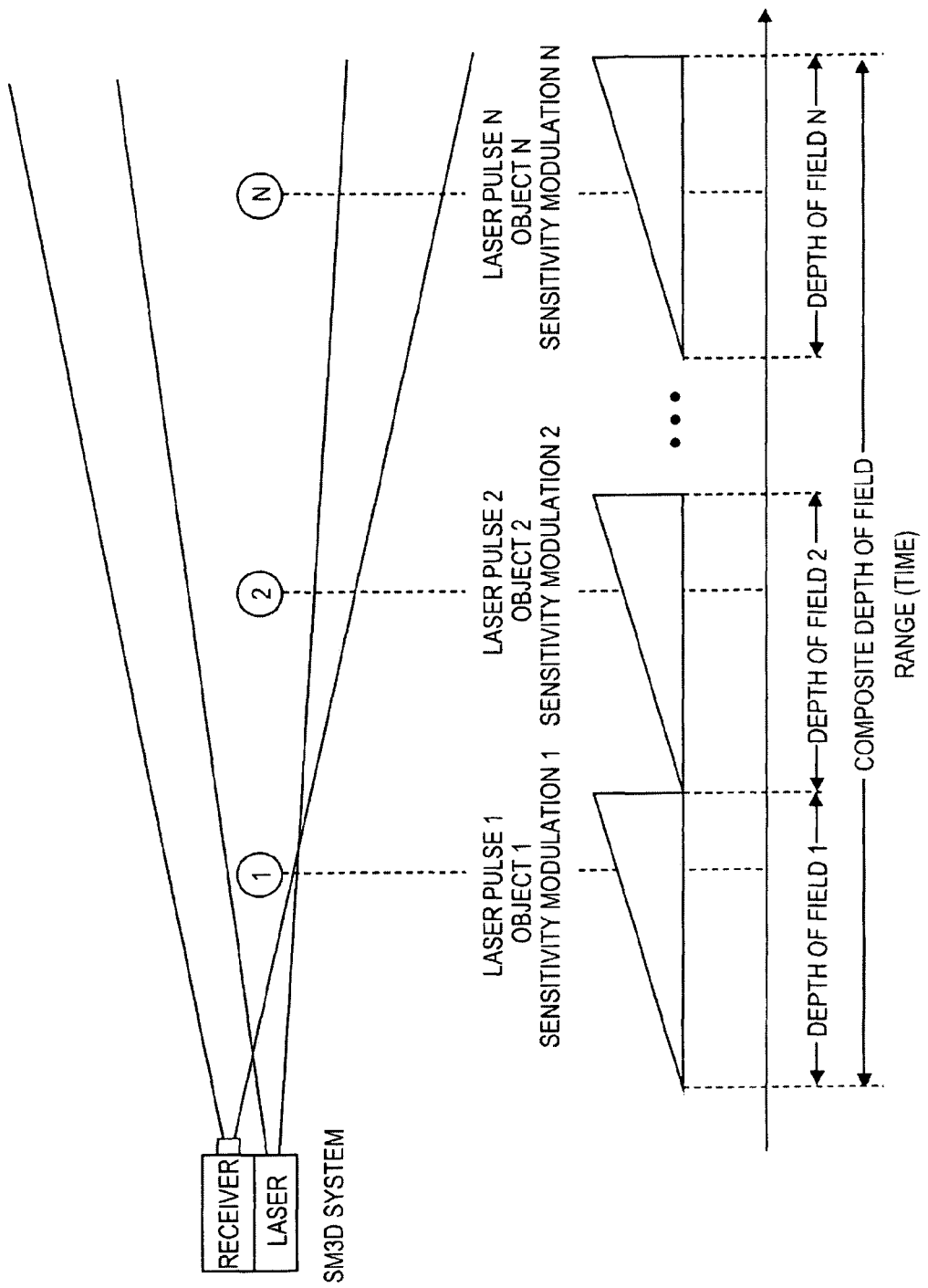
FIG. 31 illustrates a method of increasing the composite DOF by adjusting the system timing between laser pulses to provide sequential single pulse DOF regions or segments.
Figure 32:
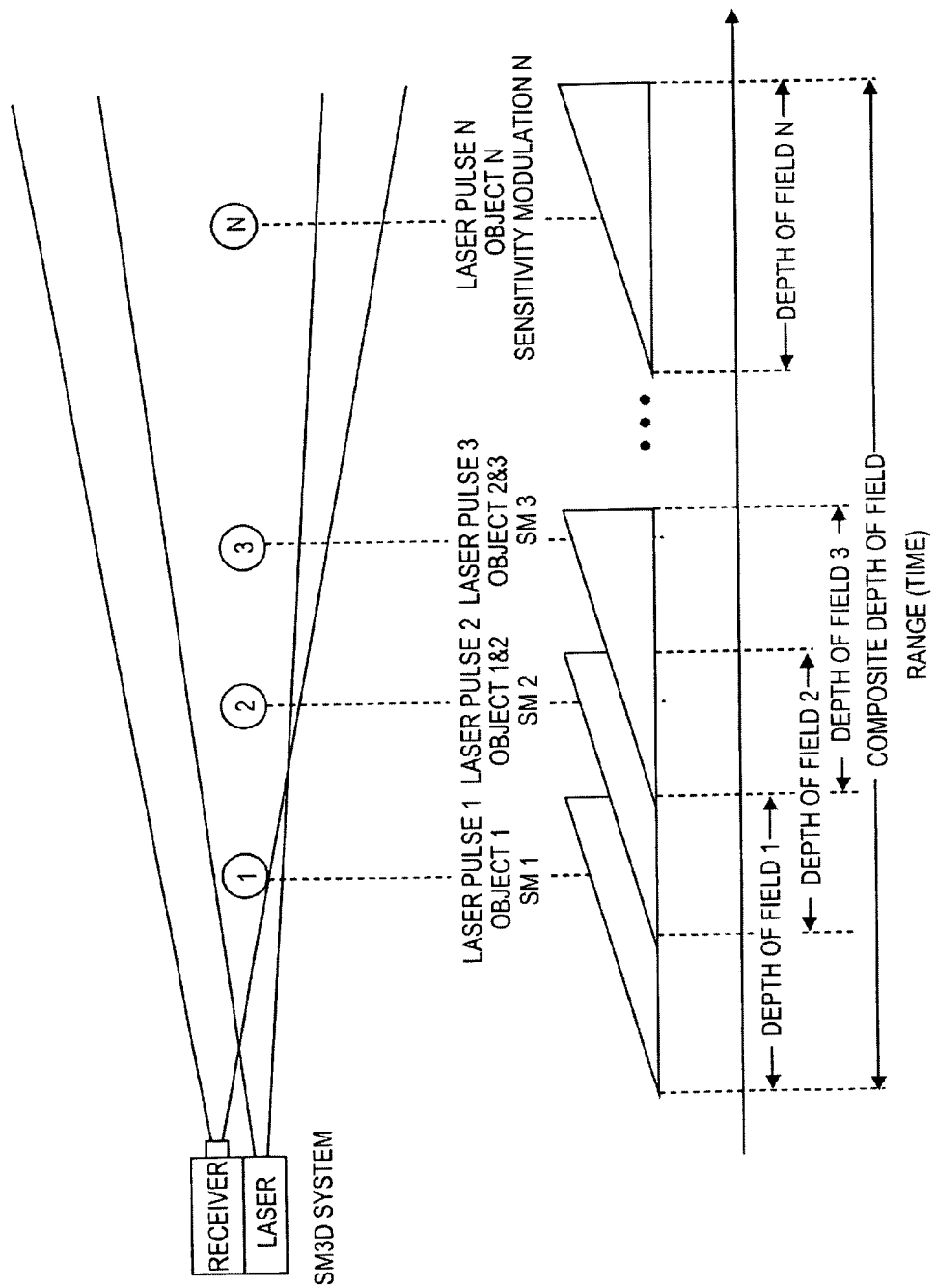
FIG. 32 illustrates a method of increasing the composite DOF by adjusting the system timing between laser pulses to provide sequentially overlapping single pulse DOF segments.

FIG. 29 illustrates an implementation of an SM3D system 130 utilizing an imaging detector with a photocathode like that illustrated in FIG. 27. The overall configuration is analogous to the SM3D system 2 illustrated in FIG. 2 with the addition of a holographic beam splitting element 132 that splits a received image into two nominally identical images, one projected to photocathode segment one and the other to photocathode segment two. The foregoing approach is not limited to only two electrically independent photocathode regions. For example, implementations of photocathodes with four electrically independent regions are illustrated in FIG. 30. Implementations of such photocathodes may be manufactured, formed, and utilized similarly to implementations of photocathodes with two electrically independent regions. When such four quadrant photocathode implementations are utilized, the holographic beam splitting element may be designed to split the received image into four nominally identical images, each aligned with a different quadrant of the four-quadrant photocathode. During operation, by appropriately controlling the gate turn-on timing of each of the four quadrants, the four-quadrant configuration can be used to provide both a) SM3D image generation and b) two sequential or sequentially over lapping depth-of-field regions, as illustrated in FIGS. 31 and 32, simultaneously at the laser PRF.

While the implementations illustrated in the foregoing drawings have been of implementations of photocathodes with up to four electrically independent regions, it must be understood that particular implementations of photocathodes may utilize any number of electrically independent regions. In addition, while the use of electrically independent regions has been illustrated with photocathodes, such electrically independent regions could be constructed and used with any imaging detector type, intensified or not, disclosed in this document using the principles disclosed herein. For the exemplary purposes of this disclosure, implementations of intensified imaging detectors having four electrically independent regions could be constructed with a proximity-focused and/or solid-state detector by combining four electrically independent detectors together. Combining the detectors could include, by non-limiting example, integrally forming four separate detectors on a single substrate using semiconductor processing and/or substrate bonding methods, coupling the detectors together with a glue or thermal bond, or any other method of coupling four electrically independent detectors together. When combined, the detectors need not necessarily all be in the same plane, but may be in some implementations.

The DOF of particular implementations of SM3D systems has been given previously as $\Delta z = \Delta t_R c/2$, where $\Delta z$ is the DOF, $\Delta t_R$ is the temporal duration of the sensitivity modulation linear ramp (the temporal duration of the sensitivity modulation region of the SM3D detector gate) and c is the speed of light. It was noted that while the DOF can be increased or decreased by increasing or decreasing the temporal duration of the sensitivity modulation linear ramp, SM3D image range precision is a decreasing function of both the DOF and the temporal duration of the sensitivity modulation region of the SM3D detector gate. FIG. 31 illustrates an implementation of a method for increasing the DOF of an implementation of a SM3D system while preserving and/or increasing precision including at least collecting multiple, sequential SM3D images, adjusting the gate timing between images, producing sequential DOF segments that cover the composite DOF of interest, and aligning the sequential DOF segments sequentially across the composite DOF. While equal DOF segments are illustrated in FIG. 31, unequal DOF segments can also be used to develop a composite DOF. Unequal DOF segments allow short, high-slope, high range-sensitivity DOF segments to be located in DOF regions where higher range sensitivity is desired. Regions where less range sensitivity is acceptable can be longer, lower-slope DOF segments. This approach allows for optimizing the number of laser pulses required to cover a composite DOF while providing high range sensitivity in certain DOF regions. In addition, there can be overlap of the DOF segments to assure that there are no holiday regions between DOF segments. FIG. 32 illustrates an implementation of a method of increasing the DOF of an implementation of an SM3D system while preserving and/or increasing precision including at least collecting multiple, sequential SM3D images, adjusting the gate timing between images, producing sequential DOF segments that cover the composite DOF of interest, aligning the sequential DOF segments so that at least some portion of the sequential DOF segments overlap across the composite DOF, and producing two SM3D images for each object of interest in the composite DOF.

Figure 34:
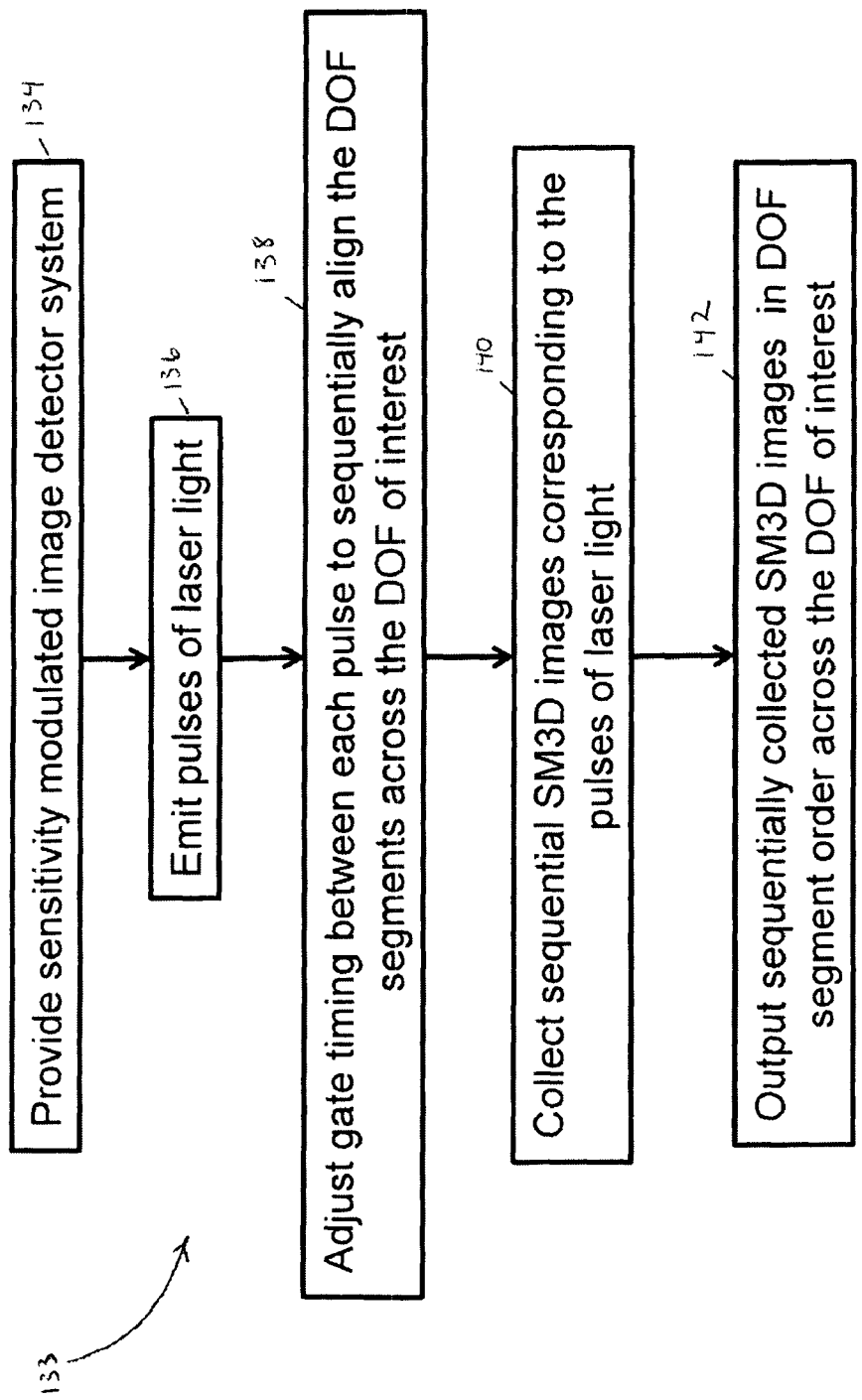
FIG. 34 is a block diagram of a method of increasing the composite DOF by utilizing sequentially collected SM3D images arranged serially in sequentially in segment order across the DOF of interest.

Referring to FIG. 34, an implementation of a method of increasing the DOF of an implementation of an SM3D system 133 is illustrated. The method may include providing a sensitivity modulated image detector system (step 134), emitting pulses of laser light (step 136), adjusting the gate timing between each pulse to sequentially align the DOF segments across the DOF of interest (step 138), collecting sequential SM3D images corresponding to the pulses of laser light (step 140), and outputting sequentially collected SM3D images in DOF segment order across the DOF of interest (step 142). Implementations of the method may also include applying any of the methods of image processing disclosed in this document, whether for error correction or object detection.

Implementations of SM3D systems can be used in a wide variety of applications, including, by non-limiting example, buried land mine detection, aerial reconnaissance, ocean surveillance for detecting underwater objects of interest, and any other application and/or environment where object detection is required. For example, for the exemplary purposes of this disclosure, ocean surveillance for the detection of underwater objects of interest can be accomplished using a SM3D LIDAR system coupled to an airborne platform. The object shape information provided by the SM3D images can help distinguish the object of interest from other objects and phenomena that can produce false alarms. For example, the light focusing effects of ocean surface waves can produce bright spots in conventional 2D LIDAR imagery that are a source of false alarms when searching for underwater mines. In addition, objects whose size and reflectance are similar to those of the object of interest, but whose shape is significantly different, can also generate false alarms in 2D LIDAR imagery. Ocean wave refraction of laser light reflected by an underwater object will also cause both 2D and 3D LIDAR images to suffer break-up and distortion, as portions of the image are distorted and shifted in x and y relative to their true positions.

Referring to FIG. 33, implementations of Relative-Range Probability Density Function (RRPDF) 3D image processing methods allow the 3D shape of an object to be estimated in the presence of image break-up and distortion. Without being bound by any theory, implementations of RRPDF image processing methods calculate the RRPDF using the relative ranges of each of the pixels forming an image of the surface of an object. Because the RRPDF, being a statistical calculation, is substantially invariant to whether any of the pixels forming the image were translated relative to their true positions and/or ranges, the RRPDF of the image can be matched with any number of known RRPDFs of known objects. Without being bound by any theory, this is because, as is illustrated in FIG. 33, the RRPDF of any object remains substantially the same shape provided that the translation distance between the translated pixels is a substantially small fraction of the distance between the SM3D system and the object. As an example of what a particular objects RRPDF function would resemble, for a spherical object the RRPDF is given by $RRPDF(z)=2z/R^2$ where R is the sphere radius.

Referring to FIG. 33, section A, a diagram of a hemispherical object with relative-range-histogram $RRPDF_1(z)$ is illustrated. FIG. 33, section B shows the same diagram of the hemispherical object split into two segments that are displaced with respect to one another (like the displacement that would appear to have occurred by the distorting effect of an ocean ripple). The RRPDF for this fractured object is $RRPDF_2(z)$ and by inspection, $RRPDF_1(z) \approx RRPDF_2(z)$. In practice, calculated RRPDF functions of distorted images will not actually be displaced like the one illustrated in section B, but will resemble the actual RRPDF regardless of the distortion and/or translation of the pixels in the received image. The displacement illustrated in section B is accordingly for illustrative purposes only.

Implementations of RRPDF 3D image processing methods may be particularly useful in situations where the x,y locations of all of the pixels that comprise the object are randomly altered. In such situations, it would be impossible to recognize the object in a conventional 2D image. However, because the RRPDF calculated from the image is nearly invariant to translation of the pixels, the calculated RRPDF could be compared to the RRPDFS of any number of known object types until a match is found and the object shown in the image identified. Accordingly, the RRPDF, computed using an SM3D image, may be used to estimate the shape of an underwater object whose pixel locations have been shifted by the refractive effects of waves on the air-water interface.

Figure 35:
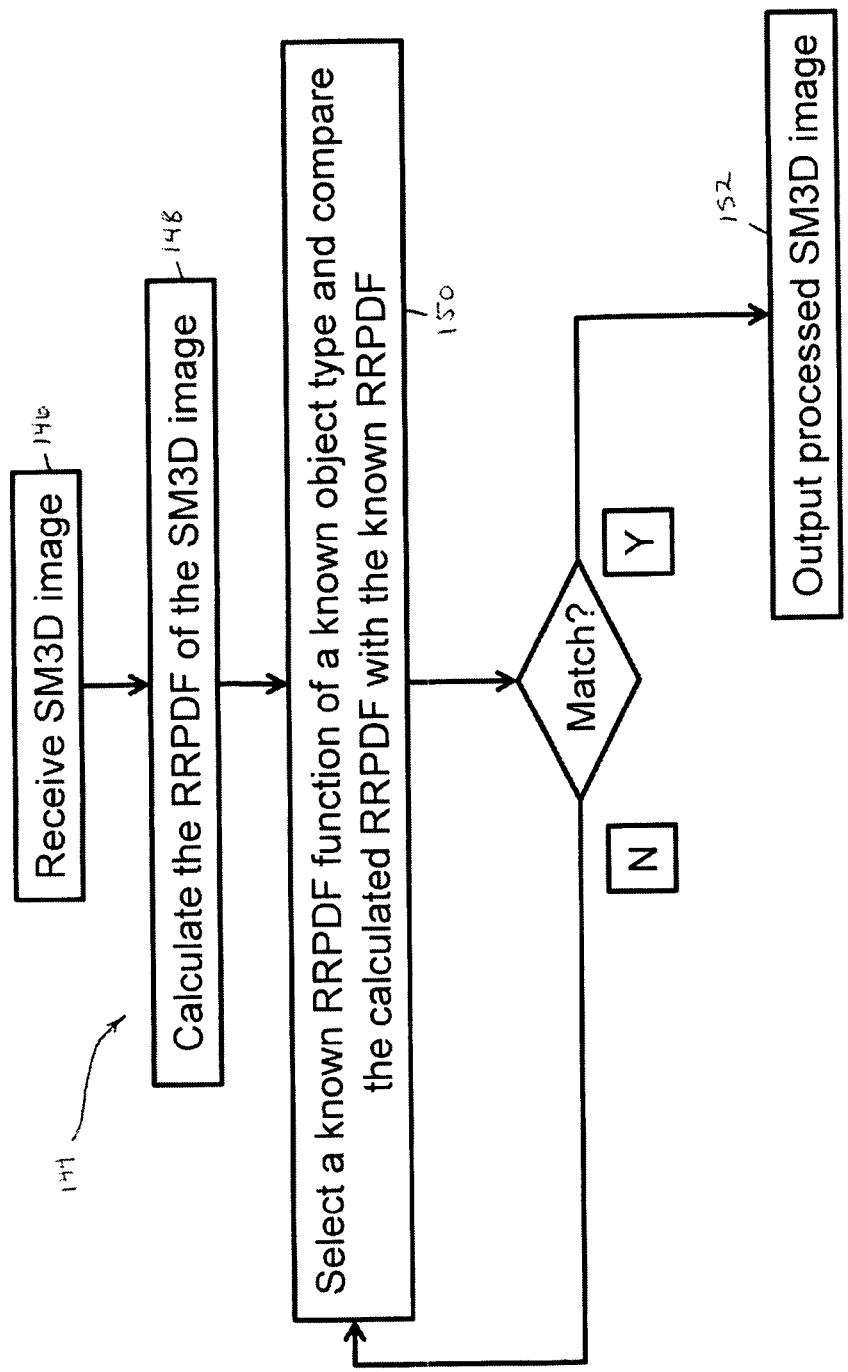
FIG. 35 is a block diagram of a method of matching a potentially distorted SM3D image to a known object type by using RRPDF comparison.

Referring to FIG. 35, an implementation of an RRPDF 3D image processing method 144 is illustrated. The method may include receiving an SM3D image (step 146), calculating the RRPDF of at least one object in the SM3D image (step 148), selecting the RRPDF of a known object (step 150), comparing the calculated RRPDF with the known RRPDF (step 150), and, if the calculated RRPDF and known RRPDF correspond, outputting the SM3D image (step 152). The SM3D image outputted may, in particular implementations of the method, include corrections made using a result of the calculated RRPDF. If the calculated RRPDF and known RRPDF do not match, then implementations of the method may include selecting the RRPDF of a known object different from the first known object selected and performing the comparison again. The comparison part of the method may be performed iteratively until a match is found or all of a plurality of known and/or desired object RRPDFs have been used. The match criteria may or may not be predetermined or statistically derived around the time of processing.

The ability of implementations of SM3D systems like those disclosed in this document to generate gray-scale encoded 3D range images of objects allows such systems to utilize implementations of methods of SM3D image processing that allow for increased visibility and signal-to-noise detection of objects whose reflectance is close to the reflectance of the surrounding local background, but whose 3D shape is different from that of the background. In conventional imaging systems, an object whose reflectance is close to the reflectance of the local background will produce a low-contrast image making it difficult for the system to detect the object. In the limiting case where the reflectance of the object and the background are equal, the object contrast will also be zero and a conventional imaging system will be unable to detect the object using conventional images. Since implementations of SM3D systems encode range as grayscale, however, and SM3D image may contain detectable grayscale variations associated with object shape, even for a zero-contrast object. SM3D systems that utilize filters matched to the SM3D grayscale representation of object shape can provide improved in object detectability.

An implementation of a method of SM3D image processing that allows for increased visibility and signal-to-noise detection may include collecting an SM3D image, processing the SM3D image using any of the grayscale encoding methods disclosed in this document, applying a filter matched to the SM3D grayscale representation of object shape, and detecting at least one object within the SM3D image. In other implementations of the method, applying multiple filters or processing multiple images across a desired composite DOF (like those disclosed in this document) may be included.

Many of the implementations of SM3D systems disclosed in this document may generate both conventional 2D gray-scale images as well as gray-scale encoded 3D range images. The joint production of 2D and 3D images allows SM3D systems to utilize methods of joint image processing that may optimize object detection. Feature-based and matched filtering algorithms can be applied to both the SM3D image and the 2D image to provide detection signal-to-noise contributions from both object shape and object contrast and reflectance information. As was previously discussed, for objects that have very low reflectance contrast with their backgrounds, the detection contribution from the 2D grayscale imagery will be low. In the limiting case of a zero-contrast object, the object will not be detectable in a conventional 2D grayscale image. However, the object shape information provided by the SM3D image can provide the additional signal-to-noise contribution needed to allow for the detection of such a zero-contrast object. A synergistic effects may be also achievable through joint processing, allowing improved detection of objects that was achievable than through 2D or SM3D image processing alone.

Figure 36:
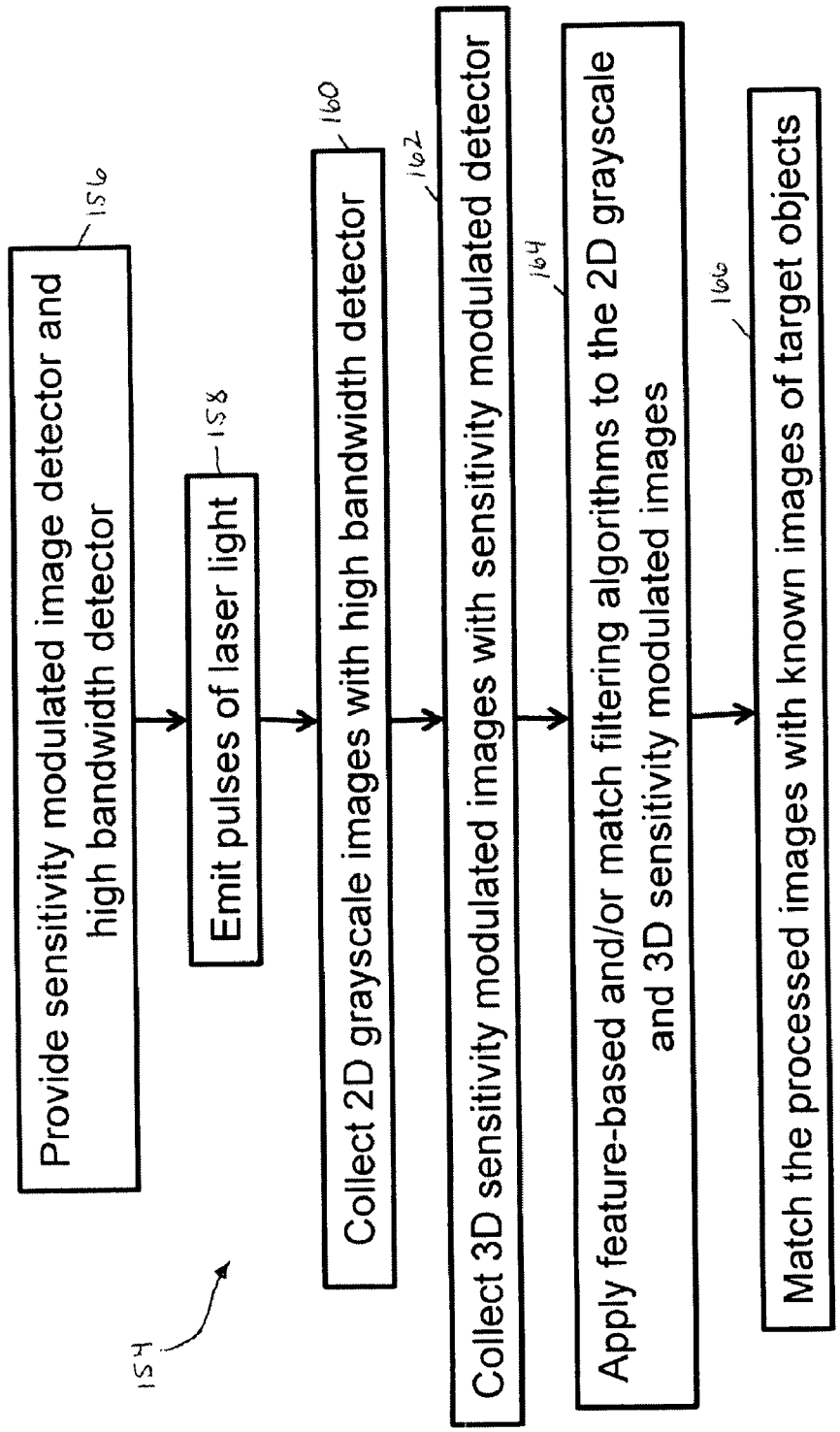
FIG. 36 is a block diagram of a method of detecting an object by utilizing feature-base and/or match filtering algorithms with two dimensional (2D) and SM3D images.

Referring to FIG. 36, an implementation of a method of joint image processing 154 is illustrated. The method may include providing a sensitivity modulated image detector and a high bandwidth detector (step 156), emitting pulses of laser light (step 158), collecting 2D grayscale images with the high bandwidth detector (step 160), collecting 3D sensitivity modulated images with the SM3D detector (step 162), applying feature-based and/or matched filtering algorithms to the 2D grayscale and 3D images (step 164), and matching the processed images with known images of target objects (step 166). Implementations of the method may also use processing multiple images and/or processing multiple images collected across a desired DOF and any of the other image processing methods disclosed in this document.

Implementations of imaging systems can be constructed to collect information regarding the spatial structure of object surface micro-vibrations. A technique used to collect this information is shearography. Shearography systems may include a camera which views a laser illuminated diffuse reflecting object surface through a shearing interferometer. When two sequential shearing speckle images are subtracted, each recorded under a different state of object surface deformation, speckle fringes result that reveal the spatial structure of object surface dynamic vibrations. As an example of one important application for this technology, shearography systems can be used to detect the presence of acoustically stimulated buried land mines. The range-gated shearography method described in this document, when coupled with an intensified imaging array detector, may enable shearography buried land mine detection at long ranges from remote sensor platforms operating in the presence of a dynamic diffusive medium such as fog, smoke, other battlefield obscurants, and sea water. Relevant teachings regarding the theory and operation of speckle interferometry, shearography and shearography systems may be found in U.S. Pat. No. 4,139,302 to Hung et al., entitled "Method and Apparatus for Interferometric Deformation Analysis," issued Feb. 13, 1979 and in U.S. Pat. No. 4,913,547 to Moran, entitled "Optically Phased-Locked Speckle Pattern Interferometer," issued Apr. 3, 1990, the disclosures of which are hereby incorporated entirely herein by reference.

Figure 37:
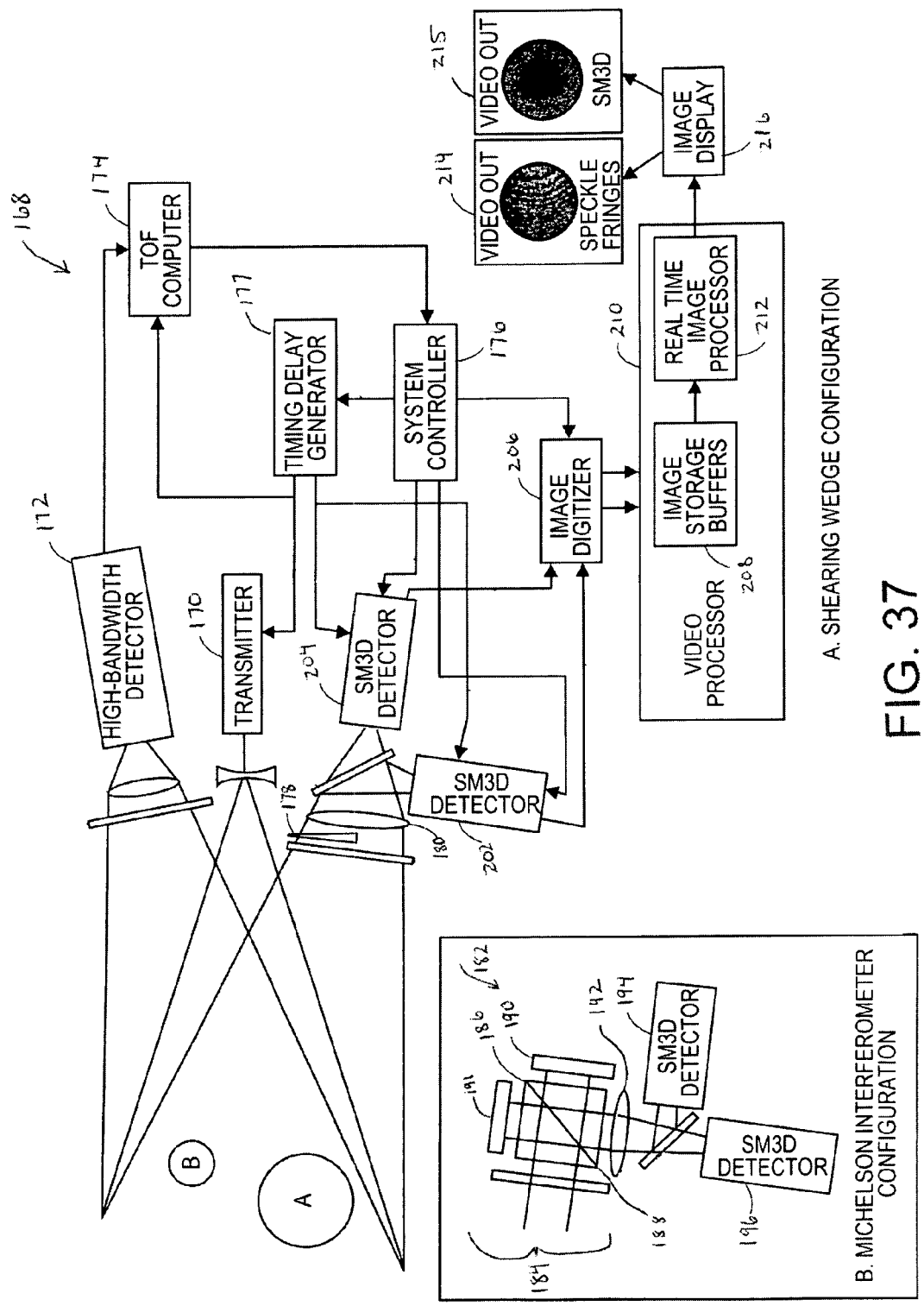
FIG. 37 is a block diagram of two implementations of a range-gated shearography system, illustrating in section A, an implementation with a two-imaging detector shearing wedge interferometer and in section B, an implementation with a two-imaging detector Michelson interferometer.

Referring to FIG. 37, section A, an implementation of a range-gated shearography system 168 is illustrated. The implementation includes a transmitter 170 that emits laser light toward a group of objects of interest (A and B). A ranging detector (high-bandwidth detector 172) is coupled to a time-of-flight (TOF) computer 174 and a system controller 176. A glass shearing wedge 178 is placed over half of a receiver optic's 180 entrance pupil. The glass shearing wedge 178 forms the shearing interferometer element. While a glass shearing wedge 178 is illustrated in FIG. 37, section A, any interferometer configuration that produces two images that are displaced or sheared with respect to one another, such as a Michelson interferometer or a holographic optical element, could also be used.

Figure 38:
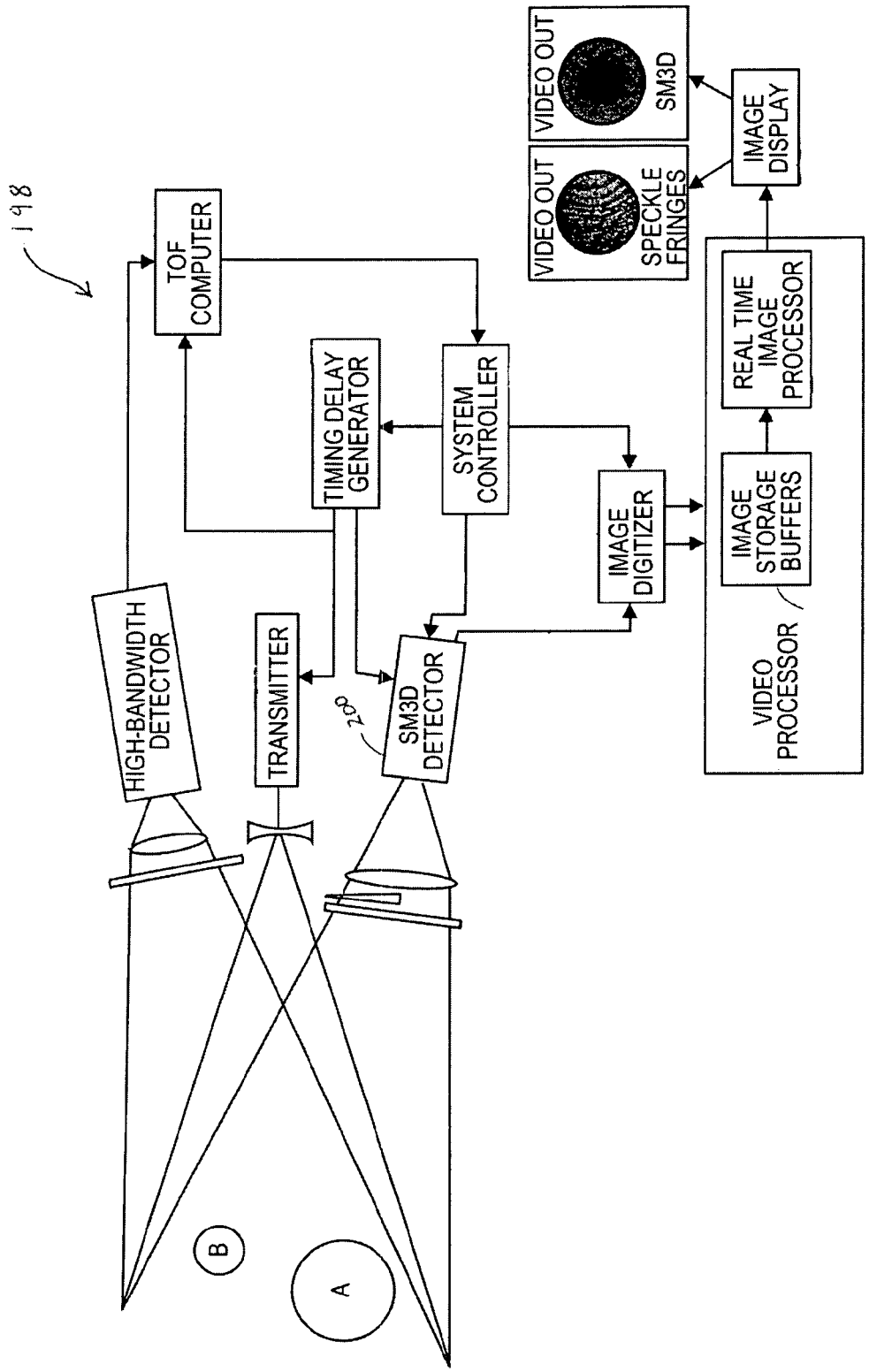
FIG. 38 is a block diagram of an implementation of a range-gated shearography system with a single imaging detector and a shearing wedge interferometer.

Referring To FIG. 37, section B, an implementation of a range-gated shearography system 182 including a Michelson interferometer 184 is illustrated. The Michelson interferometer 184 is formed using a beam splitting cube 186 that includes an internal mirror 188, combined with two mirrors 190 and 191. The mirror 191 is tilted with respect to the normal of mirror 190 to generate a sheared wavefront when reflected laser light is received by the Michelson interferometer 184. The sheared wavefront from mirror 190 and the unsheared wavefront from internal mirror 188 exit the Michelson interferometer 184 and are focused by the lens 192 onto the two imaging detectors (sensitivity modulated three-dimensional (SM3D) detectors) 194 and 196. While the implementations of range-gated shearography systems 168, 182 illustrated in FIG. 37 use two imaging detectors, in other implementations, like the one illustrated in FIG. 38 (198), only one imaging detector 200 may be utilized.

While the range-gated shearography systems 168, 182 illustrated in FIG. 37 utilize SM3D detectors, any imaging detector type could be used, such as, by non-limiting example, multiplier phototubes, avalanche photodiode detectors, streak tube detectors, microchannel plate intensified charge coupled devices, read-out integrated circuit (ROIC) arrays, charge coupled detectors (CCD), intensified and unintensified imaging detectors, SM3D detectors, and any other device or system capable of converting a photon image into photoelectrons. Relevant disclosure regarding the structure and use of these various detector types can be found in U.S. Provisional Patent Application 60/899,469, entitled "Sensitivity-Modulated Three-Dimensional Imaging and Intensified Range-Gated Shearography" to Steven E. Moran filed on Feb. 6, 2007, the disclosure of which was previously incorporated by reference. Relevant teachings regarding the structure and use of SM3D detectors may be found in U.S. patent application Ser. No. 12/026,503 entitled "Light Detection and Ranging Systems and Related Methods," to Steven E. Moran, filed on Feb. 5, 2008, the disclosure of which was previously incorporated herein by reference.

Imaging detectors like SM3D detectors are intensified imaging detectors, and amplify the electronic signal produced by the received reflected laser photons. The use of intensified imaging detectors may be particularly useful in range-gated shearography systems because of their high sensitivity and resulting image enhancing qualities.

When reflected laser light from at least one of the objects is received by the shearing interferometer (whether a glass shearing wedge 178, a Michelson interferometer 184, or another shearing interferometric system), the interferometer forms two identical speckle images of the object surface on the imaging detector 194 which are laterally shifted, or sheared, by an amount defined by the parameters of the shearing interferometer. If the temporal coherence length of the laser exceeds the optical path length difference between two "arms" of the interferometer, the two speckle images will interfere, forming a first speckle pattern or first composite image (the result of adding the two speckle images) which differs from the two input speckle images in both its brightness distribution and spatial structure.

Heuristically, each image speckle, which is nominally the size of the Airy disc for the imaging system, can be viewed as one arm of a micro-interferometer. The size of the Airy disk is approximately $1.22 \lambda F (1/(1-f/d_o))$, where F is the imaging system F-number, $\lambda$ is the wavelength of the laser illumination, f is the lens focal length, and $d_o$ is the distance from the lens principal plane to the rough surface. The amplitude and phase of the field within a given speckle is nominally a constant over the speckle linear dimension. When two speckles from different image locations are added, as in the shearing interferometer, the two arms of the micro-interferometer correspond to the speckle fields associated with two image points which are separated by the shear distance.

Referring to FIG. 37, section A, an implementation of a range-gated shearography system 168 may operate by the transmitter 170 emitting laser light toward the objects of interest. Resulting reflected laser light from the objects of interest enters the high-bandwidth detector 172 which transmits a signal to the TOF computer 174. The TOF computer 174 computes the time of flight of the reflected laser light by receiving from the system controller 176 the time the transmitter 170 emitted the laser light and using the signal from the high-bandwidth detector 172. With the time-of-flight information, the range-gated shearography system 168 calculates the range or range interval that includes the distance from the system 168 to at least one of the objects in the field of view. The range-gated shearography system 168 then communicates the range to the imaging detectors 202, 204.

In particular implementations, one of the characteristics of the imaging detectors 202, 204 may be their operation within a specific depth-of-field (DOF) region. In other words, the detectors may be configured to collect data within a predefined window of range values based on the values of certain input parameters. While the DOF of various imaging detectors is influenced by many factors and enhanced by many methods and structures, many implementations of imaging detectors allow configuration within a specific DOF region, range interval, or predefined window of range values. The values of and the physical location of the particular DOF region may be determined by the range-gated shearography system 168.

Accordingly, when the range-gated shearography system 168 communicates the range to the imaging detectors 202, 204 either through the system controller 176 or another system component, the imaging detectors 202, 204 may be set to receive and or process reflected laser light from within or from a particular DOF region or range interval. The process of determining the range interval at which the imaging detectors 202, 204 should be operated may be called "range-gating." "Range-gating" an implementation of a shearography system, then, describes the process of finding the range to at least one object of interest, calculating the range interval, and communicating the range interval to at least one imaging detector 202. Once the at least one imaging detector in the range-gated shearography system has been set to collect images from within the range interval, the at least one imaging detector 202 may begin collecting shearographic images.

Referring to FIG. 37, section A, the shearographic images collected may include a first speckle pattern formed which is digitized by an image digitizer 206 and stored in frame buffers 208 that reside in the video processor 210. Because of the action of various natural and/or anthropogenic sources, by the time the next speckle pattern is received and stored, the object's surface may be deformed from its state in the first speckle pattern. The deformation can be the result of surface vibrational motion, thermal stressing, or mechanical loading. A first composite image is then formed by adding the first and second speckle patterns, digitizing the image, and storing it in the frame buffers 208. A second composite image is formed by repeating the process of adding two sheared speckle images on the imaging detector 202. The second composite image is then digitized and stored in frame buffers 208.

When the first composite image is subtracted for the second composite image using the real-time image processor 212, speckle fringes or contours result, as is illustrated by a speckle contour image 214 of the object, which is a sphere. The speckle contour image 214 reveals the spatial structure of the micro-displacements of the object surface. The resulting speckle contour image 14 is displayed on the image display 216.

In particular implementations of range-gated shearography systems, the transmitter 170 may emit pulses of laser light, rather than producing light continuously. In these implementations, depending upon the implementations of imaging detectors 202, 204 used, shearographic images may be generated either with each laser pulse (at the laser pulse repetition frequency (PRF)) or with every two laser pulses (at half the PRF). In particular implementations, the "live" fringes of a moving surface can be generated using a method of processing real time digitized composite video at the laser PRF by sequentially subtracting the real-time video from the digitized composite image from previously digitized and stored video frames which reside in the image storage buffers 208.

Figure 39:
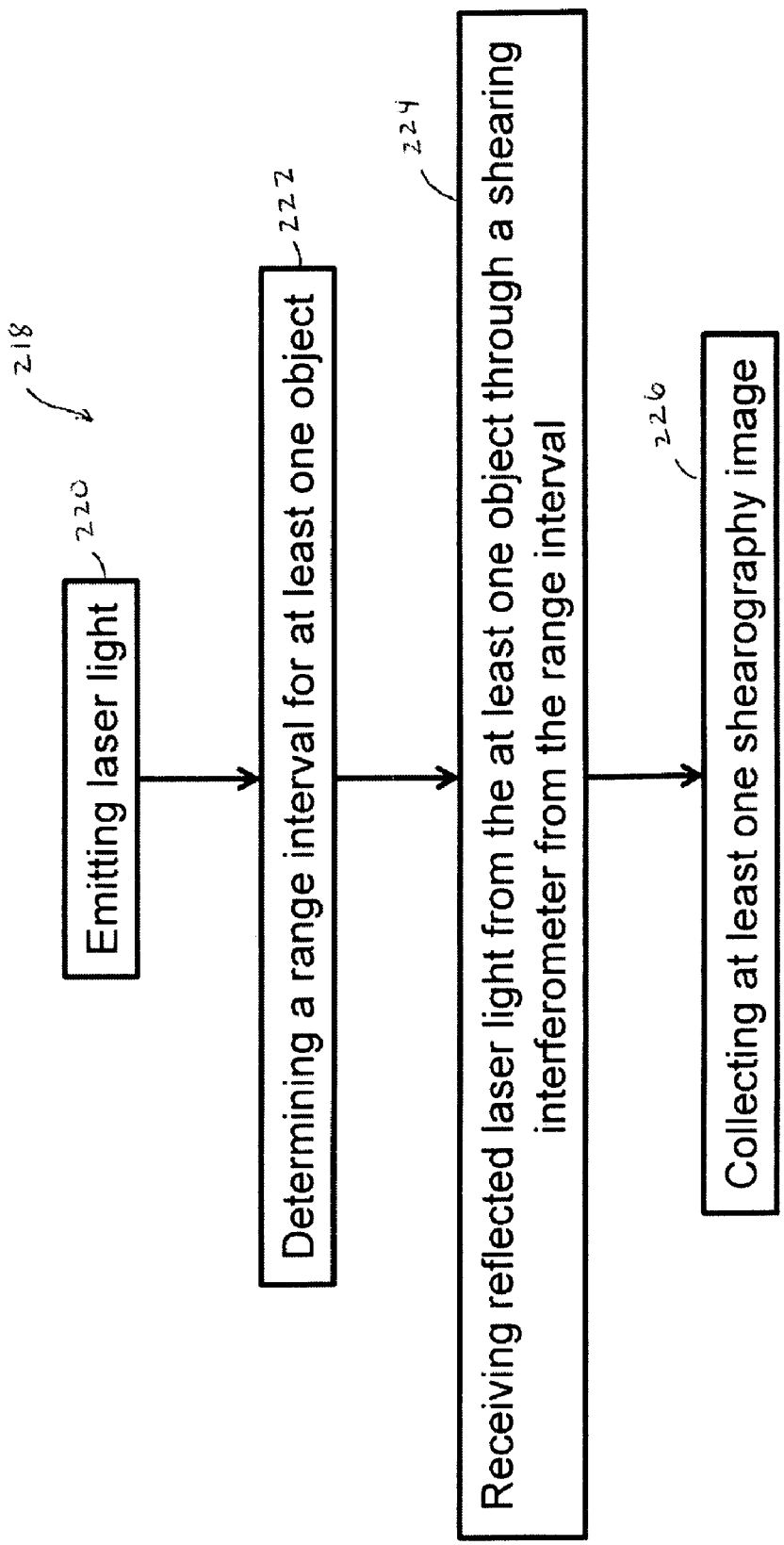
FIG. 39 is a flow diagram of an implementation of a method of range-gating a shearography system.

Implementations of range-gated shearography systems may utilize a method of range-gating a shearography system. Referring to FIG. 39, a particular implementation of a method of range-gating a shearography system 218 is illustrated. The method 218 may include emitting laser light (step 220), determining a range interval for at least one object (step 222), receiving reflected laser light from the at least one object through a shearing interferometer from the range interval (step 224), and collecting at least one shearography image (step 226). Implementations may also include the steps of intensifying received reflected laser light and emitting pulses of laser light. The step of intensifying received reflected laser light may include, by non-limiting example, intensifying the received light itself, intensifying a photoelectronic image corresponding to the received light, or any other method of intensifying light or a light-related image.

Implementations of range-gated shearography systems may include imaging detectors that are intensified, such as, by non-limiting example, SM3D imaging detectors, intensified charged coupled detectors, or any other detector capable of intensifying a photoelectric signal generated from a photon image. In particular implementations, intensification may provide the sensitivity necessary for operation of the shearography system at lower laser illumination levels and/or longer ranges despite scattering and absorbing media such as sea water, smoke, haze and fog. Since the backscattered light from the scattering medium contains little information regarding the surface shape or spatial vibrational structure, it is a source of noise to the system. Implementations of range-gated shearography systems that include both intensified imaging detectors and operate in a range-gated mode may decrease the impact of scattering media and improve the signal-to-noise ratios of the resulting shearography imagery.

Referring again to FIG. 37, section A, an implementation of an imaging system 168 is illustrated. As illustrated, the imaging system 168 includes a laser light transmitter 170, an imaging detector 202, and a shearing interferometer 178 coupled to the imaging detector 202. A timing system that includes a TOF computer 174, a system controller 176, and a timing delay generator 177 is also included which is coupled to the imaging detector 202 and the laser light transmitter 170. A ranging detector 172 is coupled to the timing system at the TOF computer 174. In the implementation illustrated in FIG. 37, section A, a sensitivity modulator is coupled with the imaging detector 202 in the form of an SM3D detector, which includes a gain modulator that is configured to temporally modulate the gain of the SM3D detector. The various components of the system may be structured and used in any of the ways previously disclosed in this document.

As illustrated in FIG. 37, section A, implementations of an imaging system 168 may include a pulsed laser. While the previous paragraph has referred to only imaging detector 202, as illustrated in the figure, a second imaging detector 204 may be included in particular implementations of an imaging system 168. The second imaging detector 204 may be coupled to the timing system, may be an SM3D detector and include a gain modulator like the first imaging detector 202. Use of two imaging detectors 202, 204 may be particularly useful when the generation of both SM3D images 215 and shearography images 214 is desired at the laser PRF. In these cases, one of the imaging detectors 202 may be run in constant-gain (or negative ramped gain) mode, and the other imaging detector 204 may be run in ramped gain (positive or negative ramped) mode. In implementations of imaging systems utilizing just a single SM3D detector, the single SM3D detector may alternately switch from ramped to constant gain modes during image collection. The high-bandwidth detector (range imaging detector) 172, in combination with the timing system (as has been previously described), serves to range-gate the shearography portion of the system and allow the SM3D detector 202 to operate in sensitivity modulated mode. The implementation illustrated in FIG. 37, section A, can produce SM3D images and shearography images at the laser PRF. The implementation of an imaging system 198 illustrated in FIG. 38, having only one SM3D detector 200, can produce SM3D images and shearography images at one half of the laser PRF.

A wide variety of systems capable of generating SM3D, 2D grayscale, and shearographic images are possible. For example, implementations of imaging systems could be constructed using a Michelson interferometer (like the one illustrated in FIG. 37, section B). Implementations could be constructed utilizing a transmission modulator configured to temporally modulate the transmission of light to the imaging detectors. In these implementations, the imaging detectors would not necessarily have to be SM3D detectors, but as was previously discussed, could be any of a wide number of conventional imaging detectors. Implementations could also include a mixture of SM3D and conventional imaging detectors to allow the generation of SM3D images and 2D grayscale images, particularly in imaging systems having more than one imaging detector. Any of a wide number of laser light sources could be utilized as well, including, by non-limiting example, continuous-wave, pulsed, frequency-modulated, and any other laser type. A wide variety of laser frequencies could be utilized as well, depending upon desired system requirements, such as, by non-limiting example, visible, invisible, infrared, ultraviolet, extreme ultraviolet, eye safe, or any other light frequency capable of being generated in a coherent manner. Using the principles disclosed in this document, numerous implementations of imaging systems can be constructed to meet any of a wide variety of desired operating conditions, specifications, and requirements.

Figure 40:
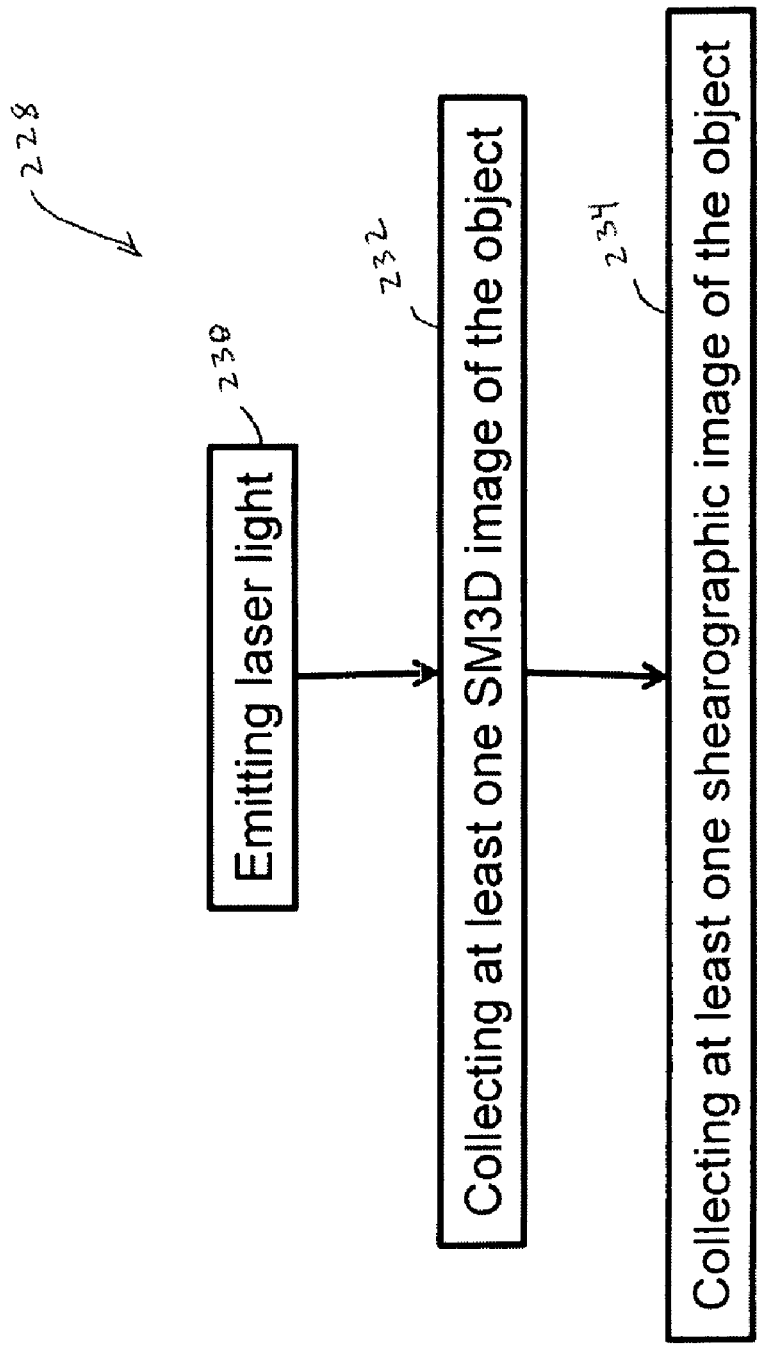
FIG. 40 is a flow diagram of an implementation of a method of imaging an object.

Implementations of imaging systems may utilize implementations of a method of imaging an object 228, an implementation of which is illustrated in FIG. 40. The method 228 may include emitting laser light toward an object (step 230), collecting at least one SM3D image of the object (step 232), and collecting at least one shearographic image of the object (step 234). Implementations of the method may include collecting at least one 2D grayscale image and jointly processing the at least one SM3D image, the at least one shearographic image, and the at least one 2D grayscale image. Joint processing may include using any of a wide variety of algorithms and methods to resolve an object, which may include, by non-limiting example, feature-based, matched filtering, image overlay, visual inspection, or any other method of determining an object boundary, size, or any other desired property of an object. Implementations may also use a calculated RRPDF in an implementation of joint processing with any of the SM3D, shearographic, or 2D grayscale images or with any of their jointly processed byproducts. Use of the RRPDF may aid in deciphering distorted 3D images and allow them to be utilized in implementations of joint image processing algorithms.

Figure 41:
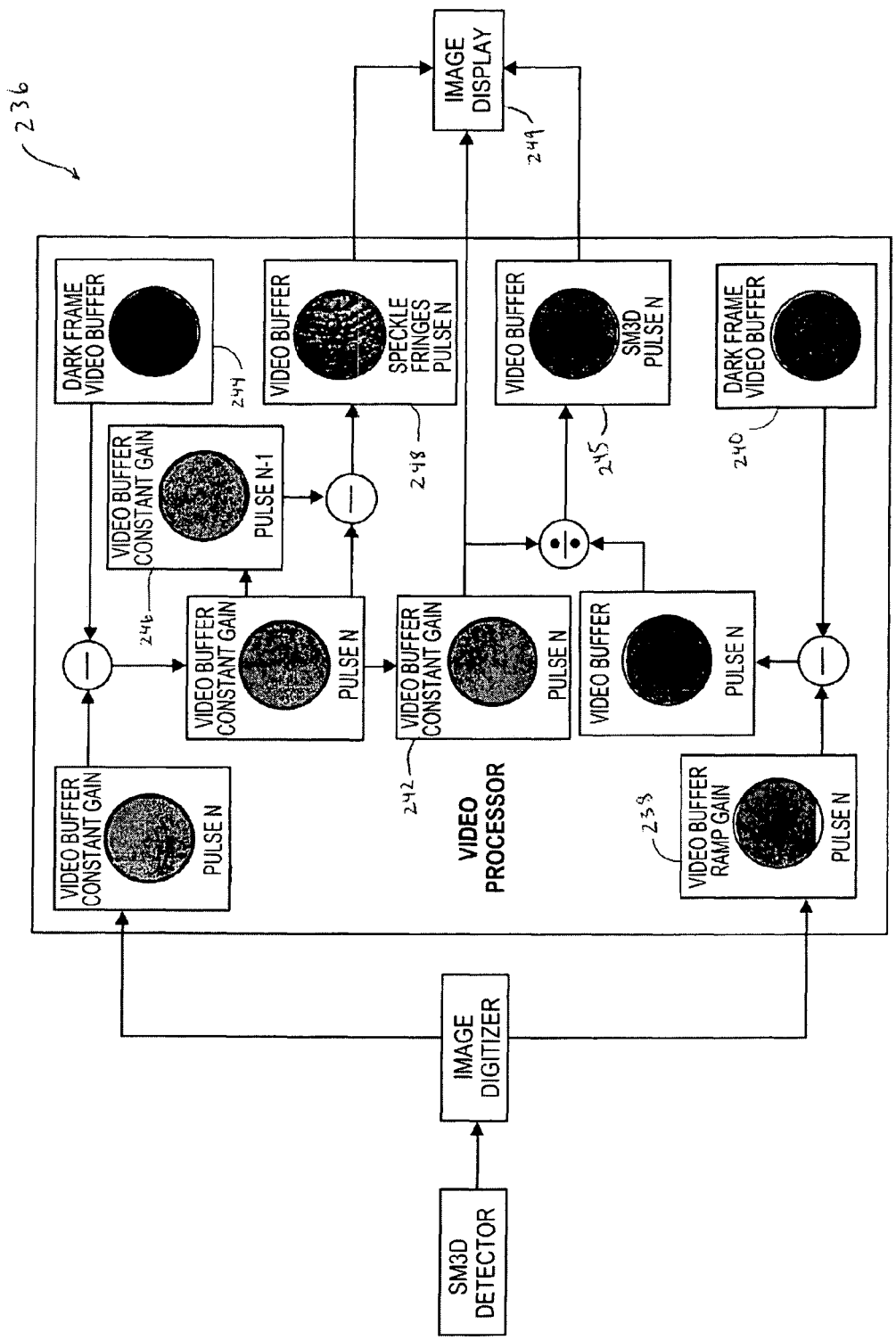
FIG. 41 is a block diagram of an first implementation of jointly producing an SM3D image, a 2D grayscale image, and a shearography image.
Figure 42:
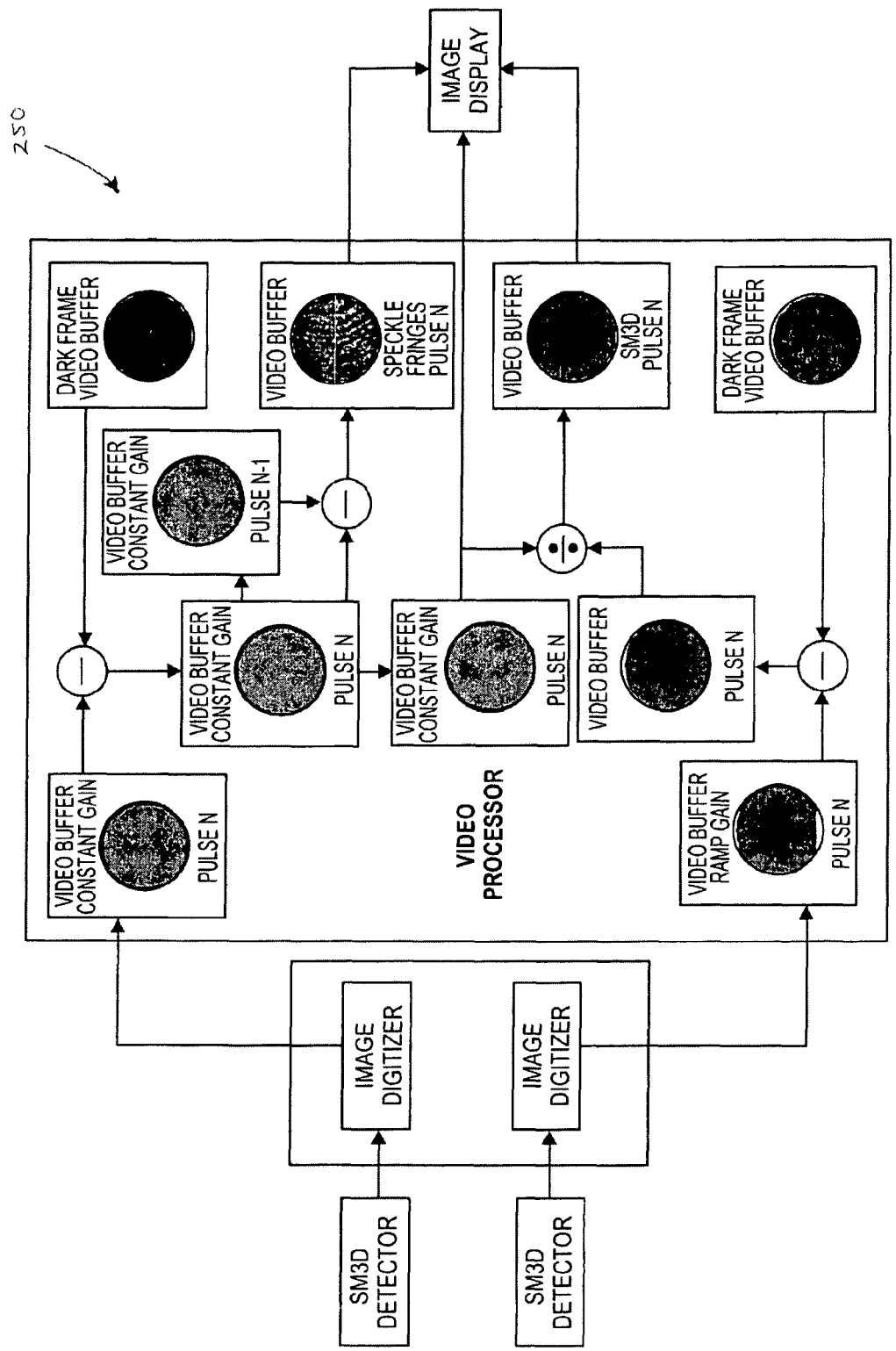
FIG. 42 is a block diagram of a second implementation of jointly producing an SM3D image, a 2D grayscale image, and a shearography image.

Referring to FIG. 41, an implementation of a method of jointly generating SM3D images, 2D grayscale images, and shearographic images 236 is illustrated. As illustrated, the joint processing method 236 includes receiving any of a ramped gain SM3D image 238, a first constant gain SM3D image 246, a second constant gain SM3D image 242, or a dark frame SM3D image 240, 244 from an SM3D detector and storing each image in a frame buffer of the frame buffers 208. In FIGS. 41 and 42, the image directly above the second constant gain SM3D image 242 is the same identical image. As the processing of images proceeds, particularly when pulsed lasers are used, the second constant gain SM3D image 242 takes the place of the first constant gain SM3D image 246 as the laser continues to generate pulses.

With the stored images, any of the various image processing algorithms outlined in this document may be applied (for example, the error-correcting algorithms of FIGS. 6 and 7) to remove errors. In the implementation illustrated, the SM3D ramped gain image 238 is being processed using the dark frame image 240, and by being divided by a second corrected constant gain image 242, which has also been adjusted by subtracting the dark frame image 244 from it. The correction process could proceed according to the methods outlines in either FIG. 6 or FIG. 7, depending upon whether the SM3D ramped gain image was collected under positive ramped gain or negative ramped gain conditions. In addition, particular implementations could utilize negative ramped gain images rather than constant gain images for error correction and/or shearographic image generation. The result of the method ensures that every second corrected and first constant gain image 242, 246, respectively and every SM3D ramped gain image 238 may be dark frame corrected before the image division step takes place that results in the creation of a corrected ramped gain SM3D image 245.

The implementation of a joint processing method 236 produces shearographic images by subtracting the constant gain SM3D images collected through the shearing interferometer from a previous laser pulse 246 (a first constant gain SM3D image) from the most recent corrected constant gain SM3D image 242 (the second corrected constant gain SM3D image). The first constant gain SM3D image 246 may or may not have been error corrected like the most recent second corrected constant gain SM3D image 242. The subtraction produces a shearography (shearographic) image 248 containing speckle fringes. In the implementation of a joint processing method 236, 2D grayscale images are produced by taking the second corrected constant gain image 242 (which is a 2D grayscale image) and outputting it to the image display 249. The implementation of a joint processing method 236 illustrated in FIG. 41 has the capability of generating an SM3D image, a shearographic image, and a 2D grayscale image at half the laser PRF. The implementation of a joint processing method 250 illustrated in FIG. 42 includes the capability of generating an SM3D image, a shearographic image, and a 2D grayscale image at the laser PRF because the method 250 includes receiving two images of any type at a time from two SM3D detectors and storing them in the image buffers.

It will be understood that implementations are not limited to the specific components disclosed herein, as virtually any components consistent with the intended operation of a method and/or system implementation for imaging systems may be utilized. Accordingly, for example, although particular imaging detectors, shearing interferometers, and optics may be disclosed, such components may comprise any shape, size, style, type, model, version, class, grade, measurement, concentration, material, weight, quantity, and/or the like consistent with the intended operation of a method and/or system implementation for an imaging system may be used.

In places where the description above refers to particular implementations of imaging systems, it should be readily apparent that a number of modifications may be made without departing from the spirit thereof and that these implementations may be applied to other imaging systems.

The invention claimed is:

1. A method of imaging an object, the method comprising:
   emitting laser light toward an object;
   simultaneously collecting at least two sensitivity-modulated three-dimensional (SM3D) images of the object;
   determining a range interval for the object;
   receiving reflected laser light from the object through a shearing interferometer from the range interval; and
   collecting at least one shearographic image of the object.

2. The method of claim 1, further comprising collecting at least one two-dimensional (2D) grayscale image.

3. The method of claim 2, further comprising jointly processing the at least two SM3D images, the at least one shearographic image, and the at least one 2D grayscale image.

4. The method of claim 1, further comprising jointly processing the at least two SM3D images and the at least one shearographic image.

5. The method of claim 4, wherein jointly processing further comprises applying at least one feature-based or matched filtering algorithm to at least one of the SM3D images and the at least one shearographic image.

6. The method of claim 1, further comprising calculating a Relative-Range Probability Density Function (RRPDF) of the object comprised in the SM3D image and matching the calculated RRPDF with a known RRPDF of a known object.

7. The method of claim 6, further comprising correcting distortion of at least one of the SM3D images using the RRPDF.

8. The method of claim 7, further comprising jointly processing at least one of the SM3D images, the at least one shearographic image, the at least one 2D grayscale image, and the calculated RRPDF of the object.

* * * * *